United States Patent
Gemba et al.

(10) Patent No.: US 8,309,273 B2
(45) Date of Patent: Nov. 13, 2012

(54) POLYMER ELECTROLYTE FUEL CELL AND FUEL CELL STACK INCLUDING THE SAME

(75) Inventors: Miho Gemba, Osaka (JP); Yoichiro Tsuji, Osaka (JP); Shinsuke Takeguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 461 days.

(21) Appl. No.: 12/531,414

(22) PCT Filed: Mar. 17, 2008

(86) PCT No.: PCT/JP2008/000613
§ 371 (c)(1),
(2), (4) Date: Sep. 15, 2009

(87) PCT Pub. No.: WO2008/126358
PCT Pub. Date: Oct. 23, 2008

(65) Prior Publication Data
US 2010/0086819 A1    Apr. 8, 2010

(30) Foreign Application Priority Data

Mar. 15, 2007  (JP) ................................ 2007-066860

(51) Int. Cl.
*H01M 8/04* (2006.01)
*H01M 4/64* (2006.01)
*H01M 8/24* (2006.01)
*H01M 2/38* (2006.01)

(52) U.S. Cl. ........ 429/514; 429/512; 429/517; 429/518; 429/452; 429/456; 429/457

(58) Field of Classification Search ........................ None
See application file for complete search history.

(56) References Cited

U.S. PATENT DOCUMENTS 4,910,100 A * 3/1990 Nakanishi et al. ............ 429/423
(Continued)

FOREIGN PATENT DOCUMENTS

DE    100 54 444 A1    5/2001
(Continued)

OTHER PUBLICATIONS

Extended European Search Report issued in European Patent Application No. EP 08720498.8 dated Aug. 4, 2011.

*Primary Examiner* — Barbara Gilliam
*Assistant Examiner* — Jennifer Rea
(74) *Attorney, Agent, or Firm* — McDermott Will & Emery LLP

(57) ABSTRACT

A polymer electrolyte fuel cell includes: a membrane-electrode assembly (10) having a polymer electrolyte membrane (1) and a pair of electrodes (4, 8) sandwiching a portion of the polymer electrolyte membrane (1) which portion is located inwardly of a peripheral portion of the polymer electrolyte membrane (1); an electrically-conductive first separator (30) disposed to contact the membrane-electrode assembly (10) and formed such that a groove-like first reactant gas channel (37) is formed on one main surface thereof so as to bend; and an electrically-conductive second separator (20) disposed to contact the membrane-electrode assembly (10) and formed such that a groove-like second reactant gas channel (27) is formed on one main surface thereof so as to bend, wherein the first reactant gas channel (27) is formed such that a width of a portion of the first reactant gas channel (27) which portion is formed at least a portion (hereinafter referred to as an uppermost stream portion 8C of the first separator 30) located between a portion where the first reactant gas channel (27) extending from an upstream end thereof first contacts the electrode 8 and a portion where the second reactant gas channel (27) extending from an upstream end thereof first contacts the electrode 4 is smaller than a width of a portion of the first reactant gas channel (27) which portion is formed at a portion other than the uppermost stream portion 8C of the first separator 30.

20 Claims, 35 Drawing Sheets

U.S. PATENT DOCUMENTS

| | | | |
|---|---|---|---|
| 6,071,635 A * | 6/2000 | Carlstrom, Jr. | 429/413 |
| 6,348,280 B1 * | 2/2002 | Maeda et al. | 429/457 |
| 6,372,373 B1 * | 4/2002 | Gyoten et al. | 429/461 |
| 6,866,955 B2 * | 3/2005 | Lee et al. | 429/438 |
| 6,878,477 B2 * | 4/2005 | Frank et al. | 429/435 |
| 6,884,536 B1 * | 4/2005 | Hatoh et al. | 429/433 |
| 7,067,213 B2 * | 6/2006 | Boff et al. | 429/457 |
| 7,838,139 B2 * | 11/2010 | Turpin et al. | 429/417 |
| 2003/0059662 A1 | 3/2003 | Debe et al. | |
| 2003/0077501 A1 | 4/2003 | Knights et al. | |
| 2003/0157387 A1 | 8/2003 | Hase et al. | |
| 2003/0219635 A1 * | 11/2003 | Lee et al. | 429/13 |
| 2004/0067405 A1 * | 4/2004 | Turpin et al. | 429/38 |
| 2004/0229105 A1 | 11/2004 | Miura | |
| 2005/0064272 A1 * | 3/2005 | Frank et al. | 429/38 |
| 2006/0024556 A1 * | 2/2006 | Ishioka et al. | 429/37 |
| 2006/0234107 A1 * | 10/2006 | Leger et al. | 429/38 |
| 2007/0264555 A1 | 11/2007 | Nishida et al. | |
| 2007/0298311 A1 | 12/2007 | Zeng et al. | |

FOREIGN PATENT DOCUMENTS

| | | |
|---|---|---|
| JP | 62-090871 | 4/1987 |
| JP | 06-267564 | 9/1994 |
| JP | 2002-216805 | 8/2002 |
| JP | 2003-217615 | 7/2003 |
| JP | 2004-055220 | 2/2004 |
| JP | 2004-273150 | 9/2004 |
| JP | 2006-114387 | 4/2006 |
| JP | 2006-210212 | 8/2006 |
| JP | 2007-207730 | 8/2007 |
| WO | WO 02/078108 A1 | 10/2002 |
| WO | WO 2006/054756 A1 | 5/2006 |

* cited by examiner

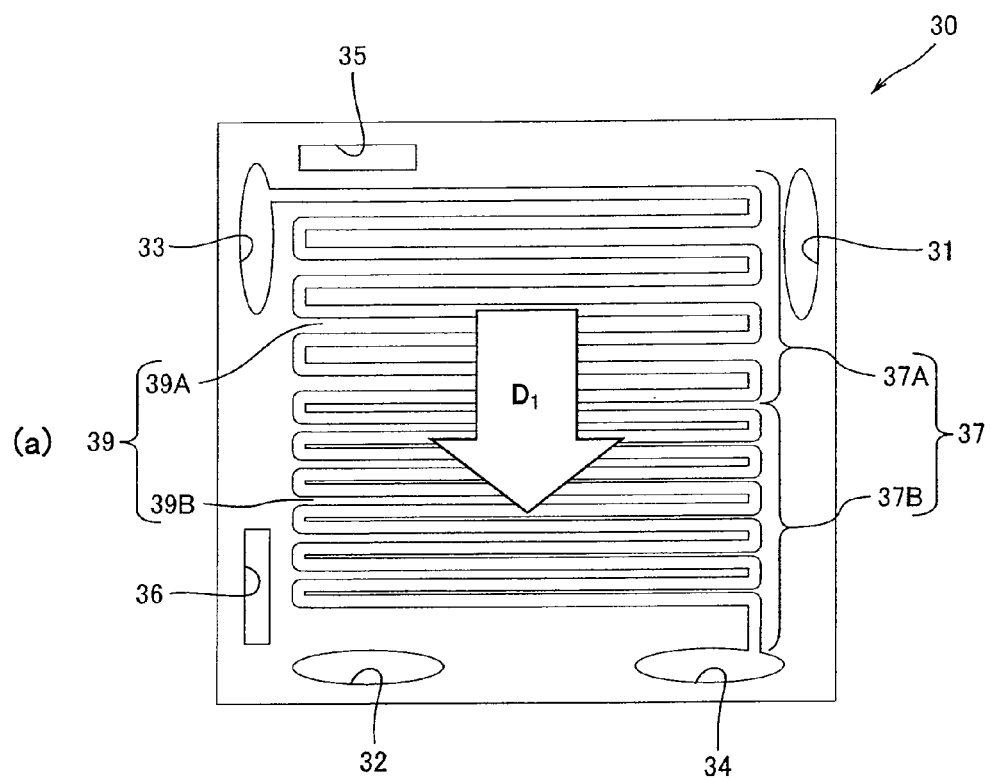
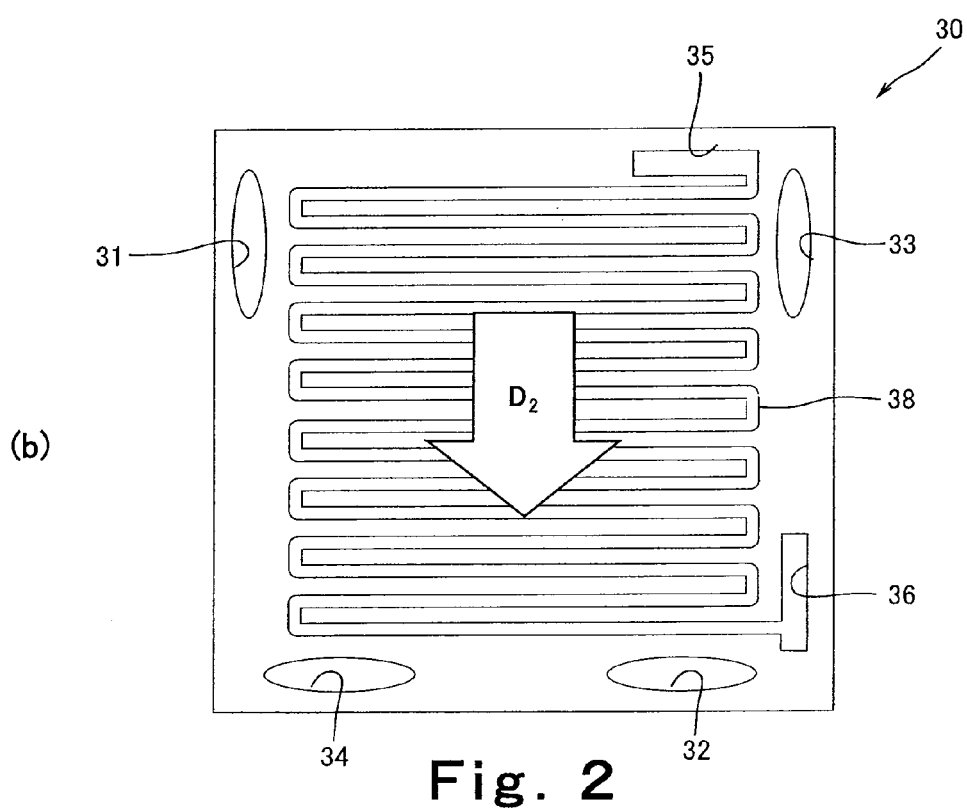
Fig. 2

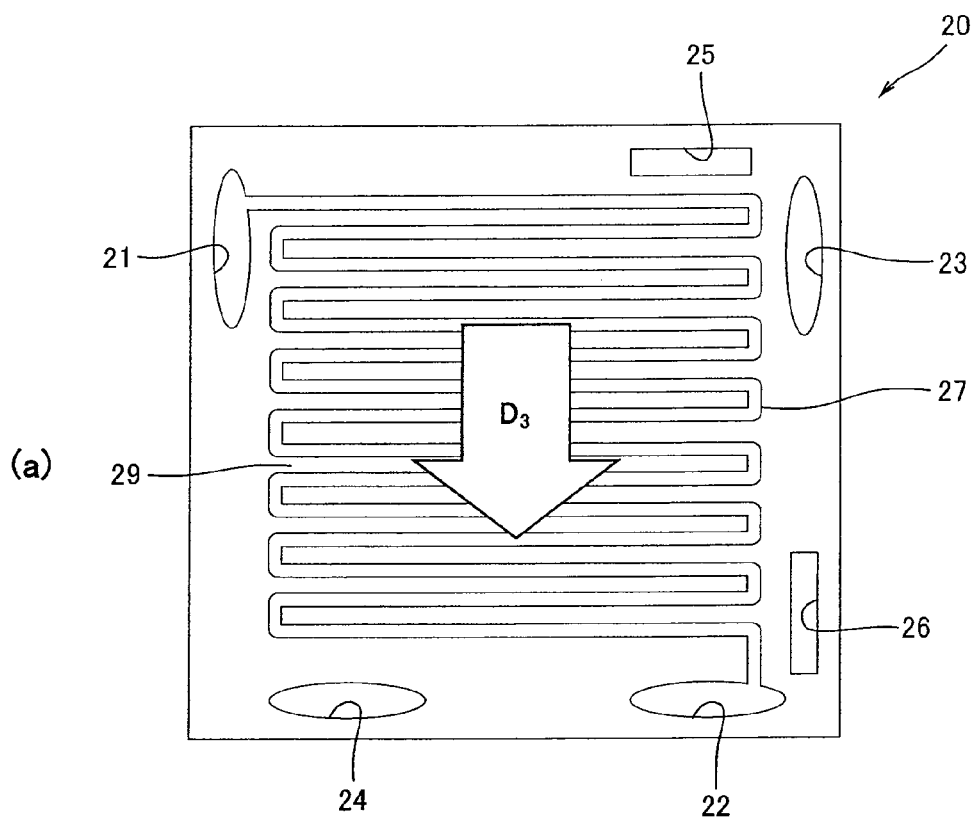
(a)
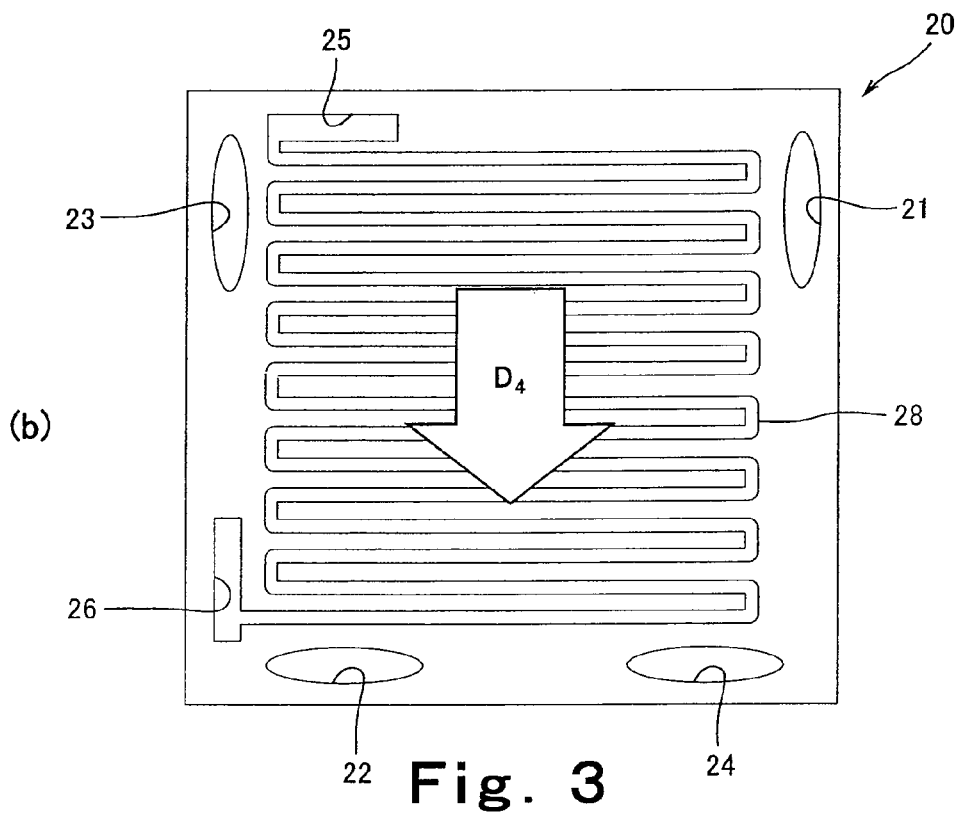
(b)
Fig. 3

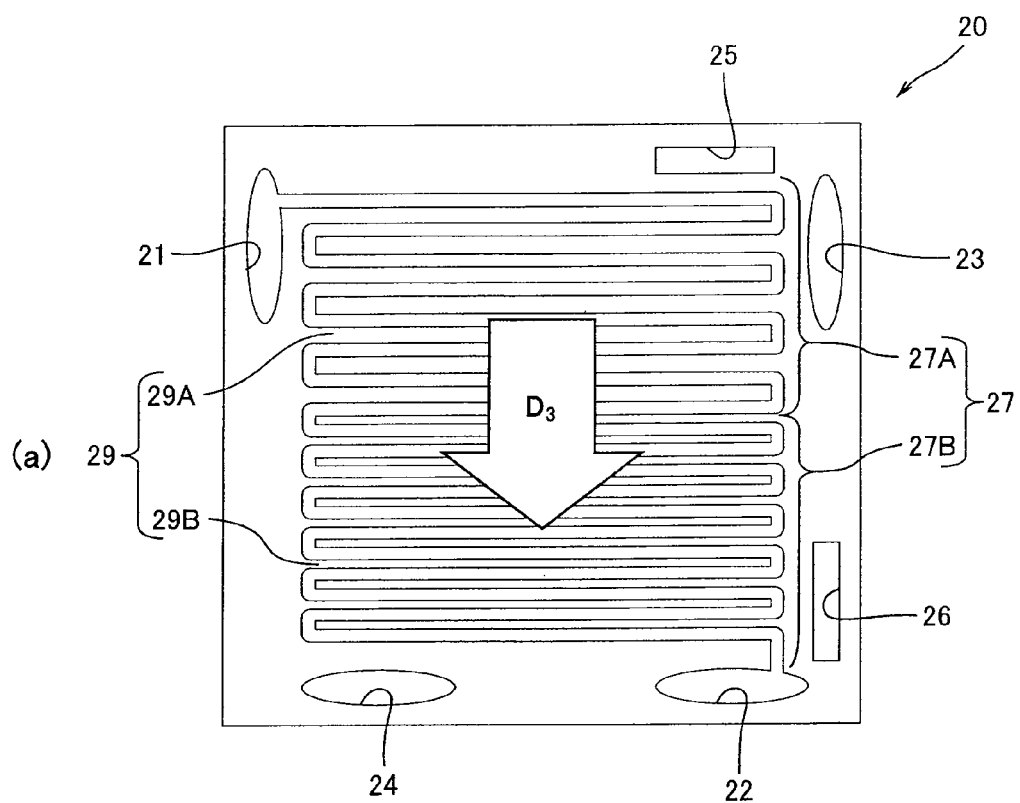
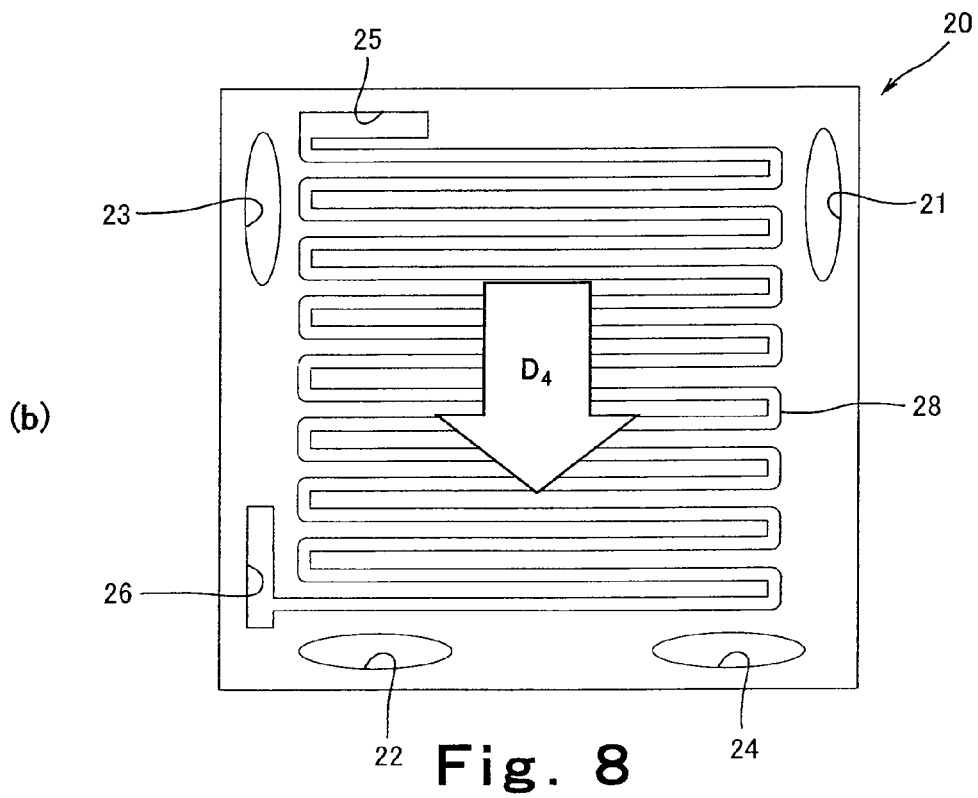
Fig. 8

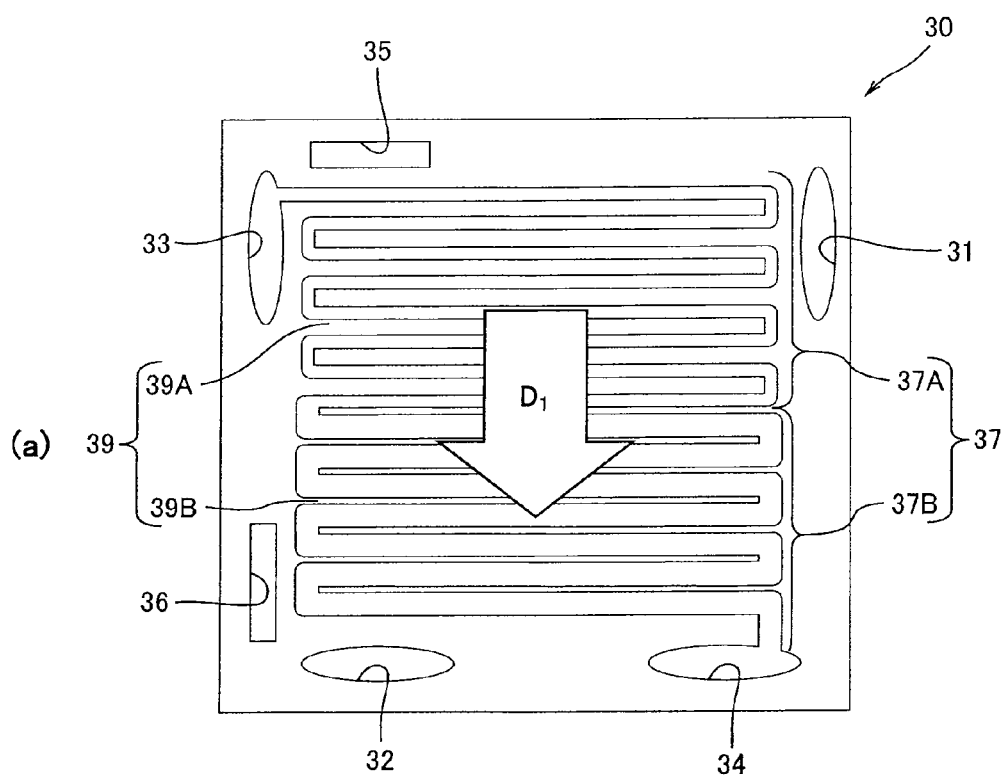
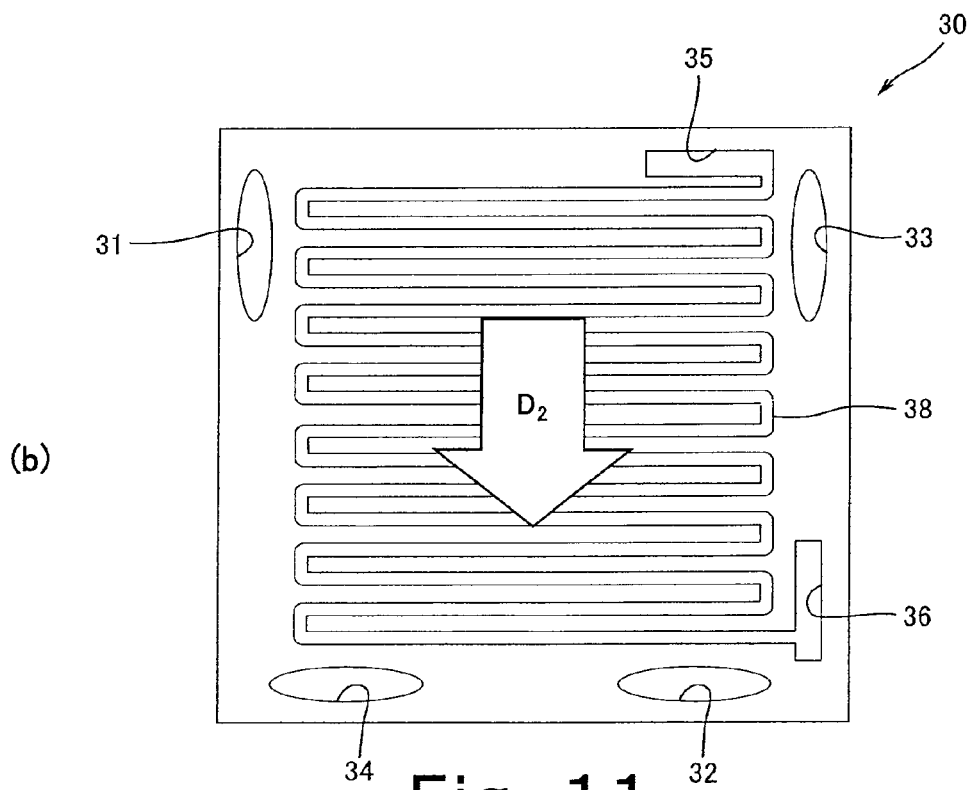
Fig. 11

(a) 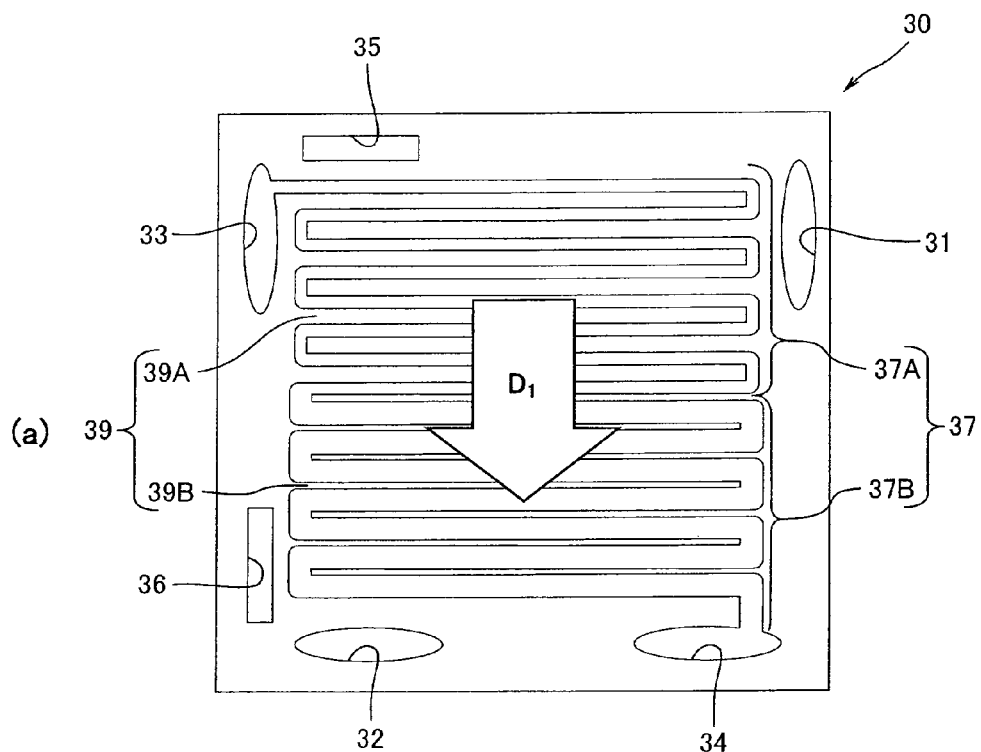
(b) 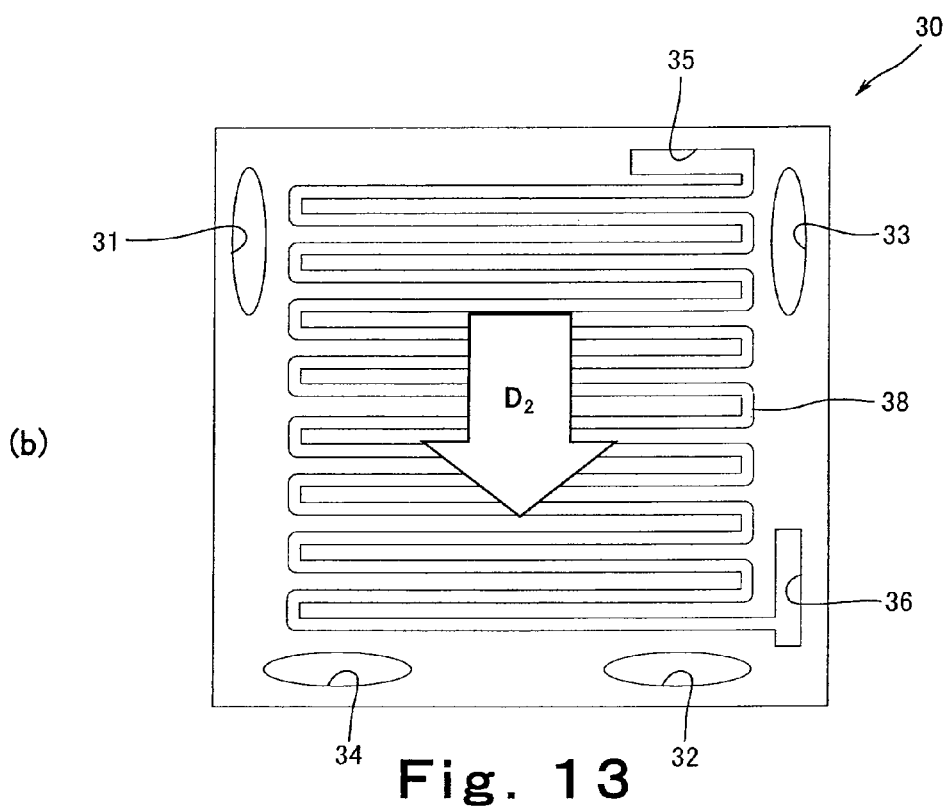
Fig. 13

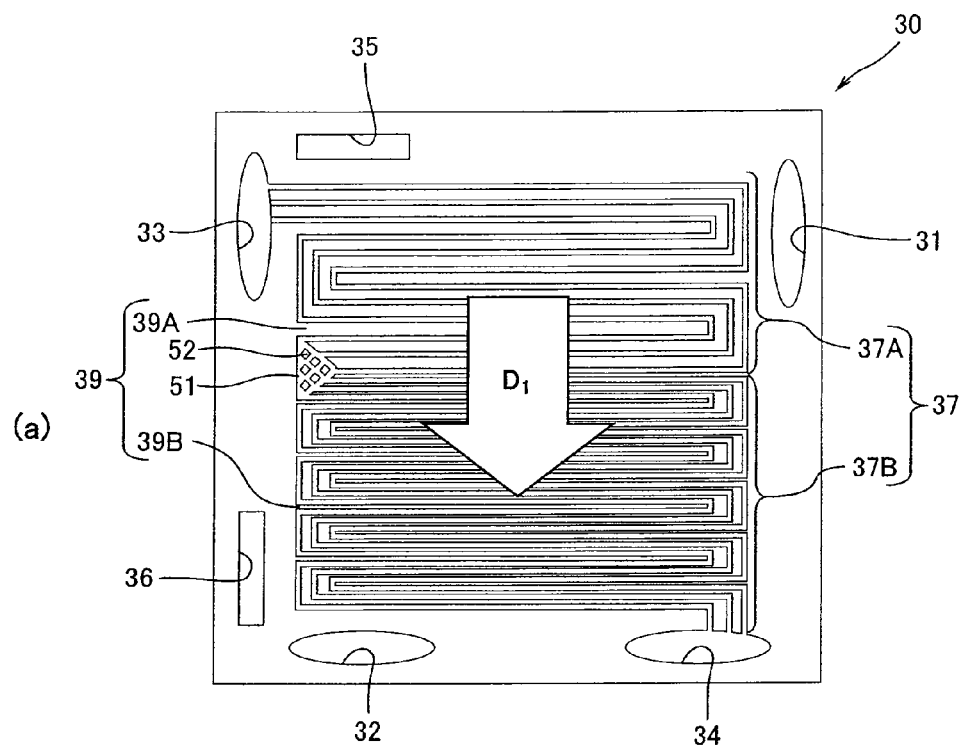
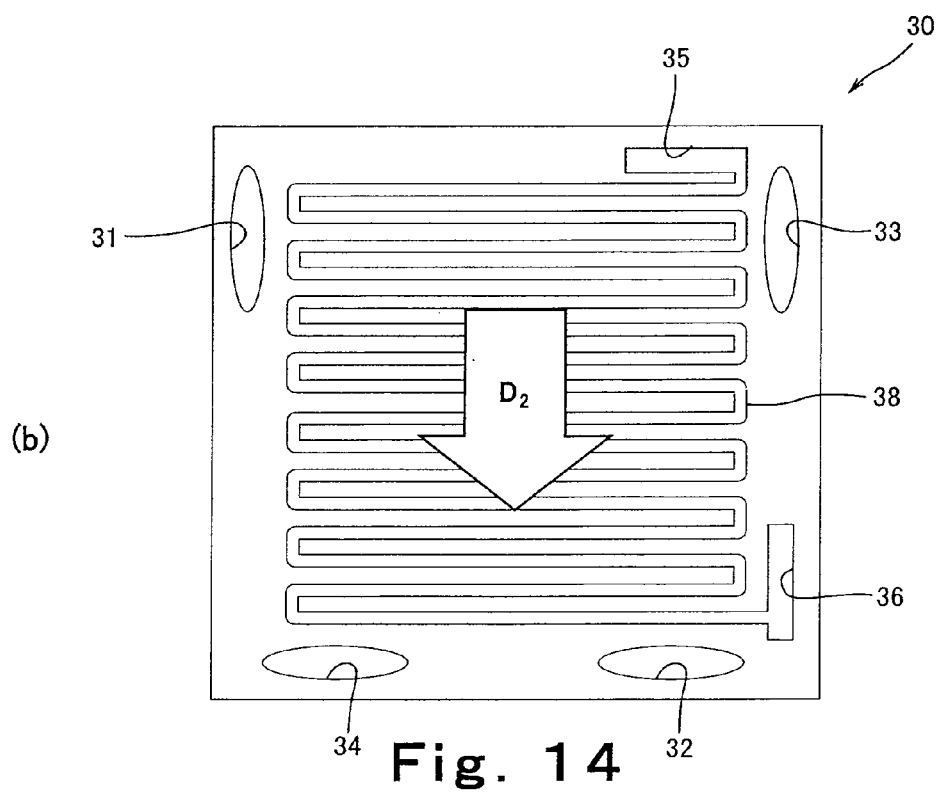
Fig. 14

POLYMER ELECTROLYTE FUEL CELL AND FUEL CELL STACK INCLUDING THE SAME

RELATED APPLICATIONS

This application is the U.S. National Phase under 35 U.S.C. §371 of International Application No. PCT/JP2008/000613, filed on Mar. 17, 2008, which in turn claims the benefit of Japanese Application No. 2007-066860, filed on Mar. 15, 2007, the disclosures of which Applications are incorporated by reference herein.

TECHNICAL FIELD

The present invention relates to the configuration of a polymer electrolyte fuel cell and the configuration of a fuel cell stack including the polymer electrolyte fuel cell.

BACKGROUND ART

In recent years, a fuel cell is attracting attention as a clean energy source. One example of the fuel cell is a polymer electrolyte fuel cell. The polymer electrolyte fuel cell (hereinafter referred to as "PEFC") includes a membrane-electrode assembly, and an anode separator and a cathode separator disposed to sandwich the membrane-electrode assembly and respectively contact an anode and a cathode. The membrane-electrode assembly includes the anode and the cathode (each of which is referred to as "electrode") each constituted by a gas diffusion layer and a catalyst layer. The gas diffusion layer has fine holes that are flow paths of a reactant gas. A fuel gas channel is formed on one main surface of the anode separator. An oxidizing gas channel is formed on one main surface of the cathode separator. A fuel gas (hydrogen) supplied through the fuel gas channel to the anode is ionized ($H^+$), flows through the gas diffusion layer and catalyst layer of the anode, further flows through the polymer electrolyte membrane via water, and moves to the cathode. The hydrogen ion having reached the cathode generates water through the following electric power generating reaction in the catalyst layer of the cathode.

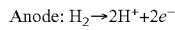
Anode: $H_2 \rightarrow 2H^+ + 2e^-$

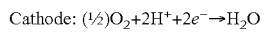
Cathode: $(½)O_2 + 2H^+ + 2e^- \rightarrow H_2O$

Total Reaction: $H_2 + (½)O_2 \rightarrow H_2O$

The water (generated water) generated as above flows to the oxidizing gas channel of the cathode separator as steam or liquid. Moreover, a part of the water generated in the cathode moves to the anode (so-called "back diffusion"). Therefore, as each of the oxidizing gas and the fuel gas (each of which is referred to as "reactant gas") flows from an upstream portion to downstream portion of each of the oxidizing gas channel and the fuel gas channel, a partial pressure of steam in each of the oxidizing gas and the fuel gas increases. With this, especially when the fuel cell is driven at high temperature and high humidity (for example, the dew point of the reactant gas is set to be the same as the temperature inside the fuel cell stack), flooding occurs by clogging of the generated water in the downstream portion of the oxidizing gas channel or the fuel gas channel or by clogging of the generated water in the fine holes of the gas diffusion layer opposed to the oxidizing gas channel or the fuel gas channel.

Disclosed as one example of a technology for suppressing the occurrence of the flooding is a fuel cell in which at least one of the depth and width of the oxidizing gas channel is gradually reduced from an upstream channel region to downstream channel region of the oxidizing gas channel (see Patent Document 1 for example). In accordance with such fuel cell, the flow velocity of the oxidizing gas flowing through the downstream channel region of the oxidizing gas channel increases, so that the generated water clogged in the oxidizing gas channel can be discharged.

Patent Document 1: Japanese Laid-Open Patent Application Publication 6-267564

DISCLOSURE OF THE INVENTION

Problems to be Solved by the Invention

However, in accordance with the configuration of Patent Document 1, when the fuel cell is driven at high temperature and high humidity, the generated water clogged in the fine holes of the gas diffusion layer cannot be removed, so that the flooding is not adequately suppressed.

Moreover, in accordance with the configuration of Patent Document 1, when the fuel cell is driven at high temperature and low humidity (for example, the dew point of the reactant gas is set to be lower than the temperature inside the fuel cell stack), the above reaction is not adequately carried out in the upstream portion of the reactant gas channel, so that the water may not be generated, a portion of the polymer electrolyte membrane which portion is opposed to the upstream portion of the reactant gas channel may dry, and the membrane may deteriorate.

The present invention was made to solve the above problems, and an object of the present invention is to provide a polymer electrolyte fuel cell capable of adequately suppressing the flooding when the polymer electrolyte fuel cell is driven at high temperature and high humidity, and a fuel cell stack including the polymer electrolyte fuel cell. Another object of the present invention is to provide a polymer electrolyte fuel cell capable of suppressing the deterioration of the polymer electrolyte membrane when the polymer electrolyte fuel cell is driven at high temperature and low humidity, and a fuel cell stack including the polymer electrolyte fuel cell.

Means for Solving the Problems

It is known that during the operation of the fuel cell, the water (water in liquid form and gas form) content of a portion of a gas diffusion electrode (hereinafter referred to as "electrode") which portion faces the reactant gas channel is lower than the water content of a portion of the electrode which portion contacts a rib portion formed between adjacent portions of the reactant gas channel. FIG. 15 is a schematic diagram showing the water content of the electrode during the operation of the fuel cell.

As a result of diligent studies to solve the above problems of the prior art, the present inventors have found the following points. To be specific, as shown in FIG. 15, the present inventors have found that the water existing in a portion 202A of an electrode 202 which portion contacts a rib portion 204 formed between adjacent portions of a reactant gas channel 203 diffuses to a portion 202B of the electrode 202 which portion faces the reactant gas channel 203, and the water content of a portion of the electrode 202 which portion is located in the vicinity of a boundary between the rib portion 204 and the reactant gas channel 203 becomes higher than that of a center portion of the portion 202B of the electrode 202. In other words, the present inventors have found that the water content of a portion of the electrode 202 decreases as the portion is away from the portion 202A of the electrode 202 which portion contacts the rib portion 204. Then, the present inventors have found that adopting the below-described configuration is highly effective to achieve the objects of the present invention. Thus, the present invention has been achieved.

To be specific, a polymer electrolyte fuel cell according to the present invention includes: a membrane-electrode assembly including a polymer electrolyte membrane and a pair of electrodes sandwiching a portion of the polymer electrolyte membrane which portion is located inwardly of a peripheral portion of the polymer electrolyte membrane; an electrically-conductive first separator having a plate shape, disposed to contact the membrane-electrode assembly, and formed such that a groove-like first reactant gas channel is formed on one main surface thereof contacting the electrode so as to bend; and an electrically-conductive second separator having a plate shape, disposed to contact the membrane-electrode assembly, and formed such that a groove-like second reactant gas channel is formed on one main surface thereof contacting the electrode so as to bend, wherein the first reactant gas channel is formed such that when viewed from a thickness direction of the first separator, a width of a portion of the first reactant gas channel which portion is formed at least a portion (hereinafter referred to as an uppermost stream portion of the first separator) located between a portion where the first reactant gas channel extending from an upstream end thereof first contacts the electrode and a portion where the second reactant gas channel extending from an upstream end thereof first contacts the electrode is smaller than a width of a portion of the first reactant gas channel which portion is formed at a portion other than the uppermost stream portion of the first separator.

As described above, the water content of a portion of the electrode which portion faces the first reactant gas channel is lower than the water content of a portion of the electrode which portion contacts the rib portion. However, in the present invention, the first reactant gas channel is formed such that the width of the portion of the first reactant gas channel which portion is formed at the uppermost stream portion of the first separator is smaller than the width of the portion of the first reactant gas channel which portion is formed at a portion other than the uppermost stream portion of the first separator. On this account, the portion (hereinafter referred to as an uppermost stream portion of the electrode) whose water content is low and which faces the channel formed at the uppermost stream portion of the first separator is small in size. Therefore, especially when the polymer electrolyte fuel cell according to the present invention is driven at high temperature and low humidity, the drying of the uppermost stream portion of the electrode can be suppressed, and therefore, the drying of a portion of the polymer electrolyte membrane which portion is opposed to the uppermost stream portion of the first reactant gas channel can be suppressed, so that the deterioration of the polymer electrolyte membrane can be suppressed.

Meanwhile, the width of a portion of the first reactant gas channel which portion is formed at a portion other than the uppermost stream portion of the first separator is larger than the width of a portion of the first reactant gas channel which portion is formed at the uppermost stream portion of the first separator. Therefore, the water content of the portion (hereinafter referred to as a downstream portion of the electrode) facing the channel formed at a portion other than the uppermost stream portion of the first separator becomes low. With this, especially when the polymer electrolyte fuel cell according to the present invention is driven at high temperature and high humidity, the flooding at the downstream portion of the electrode (to be precise, the gas diffusion layer constituting the electrode) can be suppressed.

Moreover, in the polymer electrolyte fuel cell according to the present invention, the second reactant gas channel may be formed such that when viewed from a thickness direction of the second separator, a width of a portion of the second reactant gas channel which portion is formed at least a portion (hereinafter referred to as an uppermost stream portion of the second separator) located between the portion where the second reactant gas channel extending from the upstream end thereof first contacts the electrode and the portion where the first reactant gas channel extending from the upstream end thereof first contacts the electrode is smaller than a width of a portion of the second reactant gas channel which portion is formed at a portion other than the uppermost stream portion of the second separator.

With this, especially when the polymer electrolyte fuel cell according to the present invention is driven at high temperature and low humidity, the drying of the portion of the polymer electrolyte membrane which portion is opposed to the channel formed at the uppermost stream portion of the second separator can be suppressed. Moreover, especially when the polymer electrolyte fuel cell according to the present invention is driven at high temperature and high humidity, the flooding at the downstream portion of the electrode can be suppressed.

Moreover, in the polymer electrolyte fuel cell according to the present invention, the first reactant gas channel may be formed such that when viewed from the thickness direction of the first separator, a width of a portion (hereinafter referred to as an uppermost stream portion) of the first reactant gas channel which portion extends at least from the portion where the first reactant gas channel extending from the upstream end thereof first contacts the electrode to a portion where the first reactant gas channel overlapping the second reactant gas channel first separates from the second reactant gas channel is smaller than a width of a portion of the first reactant gas channel which portion is a portion other than the uppermost stream portion of the first reactant gas channel.

As described above, the water content of a portion of the electrode which portion faces the first reactant gas channel is lower than the water content of a portion of the electrode which portion contacts the rib portion. However, in the present invention, the width of the uppermost stream portion of the first reactant gas channel is smaller than the width of a portion other than the uppermost stream portion of the first reactant gas channel. On this account, the portion (hereinafter referred to as an uppermost stream portion of the electrode) whose water content is low and which faces the uppermost stream portion of the first reactant gas channel is small in size. Therefore, especially when the polymer electrolyte fuel cell according to the present invention is driven at high temperature and low humidity, the drying of the uppermost stream portion of the electrode can be suppressed, and therefore, the drying of a portion of the polymer electrolyte membrane which portion is opposed to the uppermost stream portion of the first reactant gas channel can be suppressed, so that the deterioration of the polymer electrolyte membrane can be suppressed.

Meanwhile, the width of the portion other than the uppermost stream portion of the first reactant gas channel is larger than the width of the uppermost stream portion of the first reactant gas channel. Therefore, the water content of the portion (hereinafter referred to as a downstream portion of the electrode) facing the portion other than the uppermost stream portion of the first reactant gas channel becomes low. With this, especially when the polymer electrolyte fuel cell according to the present invention is driven at high temperature and high humidity, the flooding at the downstream portion of the electrode (to be precise, the gas diffusion layer constituting the electrode) can be suppressed.

Moreover, in the polymer electrolyte fuel cell according to the present invention, the second reactant gas channel may be formed such that when viewed from a thickness direction of the second separator, a width of a portion (hereinafter referred to as an uppermost stream portion) of the second reactant gas channel which portion extends at least from the portion where the second reactant gas channel extending from the upstream end thereof first contacts the electrode to a portion where the second reactant gas channel overlapping the first reactant gas channel first separates from the first reactant gas channel is smaller than a width of a portion of the second reactant gas channel which portion is a portion other than the uppermost stream portion of the second reactant gas channel.

With this, especially when the polymer electrolyte fuel cell according to the present invention is driven at high temperature and low humidity, the drying of the portion of the polymer electrolyte membrane which portion is opposed to the uppermost stream portion of the second reactant gas channel can be suppressed. Moreover, especially when the polymer electrolyte fuel cell according to the present invention is driven at high temperature and high humidity, the flooding at the downstream portion of the electrode can be suppressed.

Moreover, in the polymer electrolyte fuel cell according to the present invention, a depth of the uppermost stream portion of the first reactant gas channel may be larger than a depth of a portion other than the uppermost stream portion of the first reactant gas channel.

Moreover, in the polymer electrolyte fuel cell according to the present invention, a depth of the uppermost stream portion of the second reactant gas channel may be larger than a depth of a portion other than the uppermost stream portion of the second reactant gas channel.

Moreover, in the polymer electrolyte fuel cell according to the present invention, a cross-sectional area of the uppermost stream portion of the first reactant gas channel may be substantially the same as a cross-sectional area of a portion other than the uppermost stream portion of the first reactant gas channel.

Moreover, in the polymer electrolyte fuel cell according to the present invention, a cross-sectional area of the uppermost stream portion of the second reactant gas channel may be substantially the same as a cross-sectional area of a portion other than the uppermost stream portion of the second reactant gas channel.

Moreover, in the polymer electrolyte fuel cell according to the present invention, among rib portions each formed between adjacent portions of the first reactant gas channel, a rib portion formed by the uppermost stream portion may have a width larger than a width of the other rib portion.

With this configuration, in the portion other than the uppermost stream portion of the first reactant gas channel, the contact area between the rib portion of the first separator and the electrode becomes small. Therefore, the heat generated by the electric power generating reaction is less likely to be transferred to the first separator. With this, the heat release to the first separator is suppressed, so that the portion other than the uppermost stream portion of the first reactant gas channel is increased in temperature. Therefore, although the generated water is accumulated and the steam partial pressure increases at the portion other than the uppermost stream portion of the first reactant gas channel, the dew condensation of the water generated by the electric power generating reaction is less likely to occur, and the occurrence of the flooding is suppressed at not only the portion other than the uppermost stream portion of the first reactant gas channel but also a portion of the gas diffusion layer of the electrode which portion faces the portion other than the uppermost stream portion of the first reactant gas channel.

Meanwhile, in the uppermost stream portion of the first reactant gas channel, current concentration may occur since the amount of the reactant gas related to a battery reaction is large, and in accordance with the conventional configuration, a battery voltage may decrease due to the increase in a contact resistance. However, as in the polymer electrolyte fuel cell of the present invention, by increasing the contact area between the rib portion and the electrode in the uppermost stream portion of the first reactant gas channel, the contact resistance is reduced, and the decrease in the battery voltage is suppressed.

The area of the rib portion per unit area may be changed (reduced) from the uppermost stream portion to the downstream portion of the first reactant gas channel.

Moreover, in the polymer electrolyte fuel cell according to the present invention, among rib portions each formed between adjacent portions of the second reactant gas channel, a rib portion formed by the uppermost stream portion may have a width larger than a width of the other rib portion.

With this configuration, in the portion other than the uppermost stream portion of the second reactant gas channel, the contact area between the rib portion of the second separator and the electrode becomes small. Therefore, the heat generated by the electric power generating reaction is less likely to be transferred to the first separator. With this, the heat release to the second separator is suppressed, so that the portion other than the uppermost stream portion of the second reactant gas channel is increased in temperature. Therefore, although the generated water is accumulated and the steam partial pressure increases at the portion other than the uppermost stream portion of the second reactant gas channel, the dew condensation of the water generated by the electric power generating reaction is less likely to occur, and the occurrence of the flooding is suppressed at not only the portion other than the uppermost stream portion of the second reactant gas channel but also a portion of the gas diffusion layer of the electrode which portion faces the portion other than the uppermost stream portion of the second reactant gas channel.

Meanwhile, in the uppermost stream portion of the second reactant gas channel, current concentration may occur since the amount of the reactant gas related to the battery reaction is large, and in accordance with the conventional configuration, the battery voltage may decrease due to the increase in the contact resistance. However, as in the polymer electrolyte fuel cell of the present invention, by increasing the contact area between the rib portion and the electrode in the uppermost stream portion of the second reactant gas channel, the contact resistance is reduced, and the decrease in the battery voltage is suppressed.

The area of the rib portion per unit area may be changed (reduced) from the uppermost stream portion to the downstream portion of the second reactant gas channel.

Moreover, in the polymer electrolyte fuel cell according to the present invention, a groove-like cooling fluid channel may be formed on the other main surface of the first separator and/or the other main surface of the second separator, and each of a dew point of a first reactant gas flowing through the first reactant gas channel and a dew point of a second reactant gas flowing through the second reactant gas channel may be lower than a temperature of a cooling fluid flowing through the cooling fluid channel.

Moreover, in the polymer electrolyte fuel cell according to the present invention, each of the first separator and the second separator may be provided with a first reactant gas supplying manifold hole and a second reactant gas supplying manifold hole which are formed to penetrate therethrough in a thickness direction and be opposed to each other.

Moreover, in the polymer electrolyte fuel cell according to the present invention, the first reactant gas channel and the second reactant gas channel may be formed to realize parallel flow.

Moreover, in the polymer electrolyte fuel cell according to the present invention, the first reactant gas channel and/or the second reactant gas channel may be formed in a serpentine shape.

Moreover, in the polymer electrolyte fuel cell according to the present invention, the first reactant gas channel and/or the second reactant gas channel may be formed in a spiral shape.

Moreover, in the polymer electrolyte fuel cell according to the present invention, the width of the entire uppermost stream portion of the first reactant gas channel may be smaller than a with of an entire portion (hereinafter referred to as a remaining portion) other than the uppermost stream portion of the first reactant gas channel.

Moreover, in the polymer electrolyte fuel cell according to the present invention, the width of the entire remaining portion of the first reactant gas channel may be constant.

Moreover, in the polymer electrolyte fuel cell according to the present invention, the width of the entire uppermost stream portion of the first reactant gas channel may be constant.

Moreover, in the polymer electrolyte fuel cell according to the present invention, the width of the entire uppermost stream portion of the second reactant gas channel may be smaller than a width of an entire portion other than the uppermost stream portion of the second reactant gas channel.

Moreover, in the polymer electrolyte fuel cell according to the present invention, the width of the entire remaining portion of the second reactant gas channel may be constant.

Further, in the polymer electrolyte fuel cell according to the present invention, the width of the entire uppermost stream portion of the second reactant gas channel may be constant.

Moreover, a fuel cell stack according to the present invention is configured such that a plurality of the polymer electrolyte fuel cells according to claim 1 are stacked and fastened.

The above object, other objects, features and advantages of the present invention will be made clear by the following detailed explanation of preferred embodiments with reference to the attached drawings.

Effects of the Invention

The polymer electrolyte fuel cell and the fuel cell stack of the present invention are configured as above. Therefore, when the polymer electrolyte fuel cell or the fuel cell stack is driven at high temperature and high humidity, the clogging of the generated water in not only the reactant gas channel but also the gas diffusion layer can be prevented, so that the occurrence of the flooding can be adequately suppressed. Moreover, in accordance with the polymer electrolyte fuel cell and the fuel cell stack of the present invention, when the polymer electrolyte fuel cell or the fuel cell stack is driven at high temperature and low humidity, the drying of the polymer electrolyte membrane can be suppressed, so that the deterioration of the polymer electrolyte membrane can be suppressed.

BRIEF DESCRIPTION OF THE DRAWINGS

FIG. 2 are diagrams showing the configurations of both main surfaces of a cathode separator used in the fuel cell of FIG. 1. FIG. 1(a) is a plan view showing the main surface on which an oxidizing gas channel is formed. FIG. 2(b) is a plan view showing the main surface on which a cooling fluid channel is formed.

FIG. 3 are diagrams showing the configurations of both main surfaces of an anode separator used in the fuel cell of FIG. 1. FIG. 3(a) is a plan view showing the main surface on which a fuel gas channel is formed. FIG. 3(b) is a plan view showing the main surface on which a cooling fluid channel is formed.

FIG. 5(a) is a plan view showing the main surface on which the oxidizing gas channel is formed. FIG. 5(b) is a plan view showing the main surface on which the cooling fluid channel is formed.

FIG. 6(a) shows the temperature distributions of respective portions in the cross section of the fuel cell of Embodiment 1. FIG. 6(b) shows the temperature distributions of respective portions in the cross section of the fuel cell of Comparative Example.

FIG. 8 are diagrams showing the configurations of both main surfaces of the anode separator used in the fuel cell of FIG. 7. FIG. 8(a) is a plan view showing the main surface on which the fuel gas channel is formed. FIG. 8(b) is a plan view showing the main surface on which the cooling fluid channel is formed.

FIG. 11 are diagrams showing the configurations of both main surfaces of the cathode separator used in the fuel cell of FIG. 10. FIG. 11(a) is a plan view showing the main surface on which the oxidizing gas channel is formed. FIG. 11(b) is a plan view showing the main surface on which the cooling fluid channel is formed.

FIG. 13 are diagrams showing the configurations of both main surfaces of the cathode separator used in the fuel cell of FIG. 12. FIG. 13(a) is a plan view showing the main surface on which the oxidizing gas channel is formed. FIG. 13(b) is a plan view showing the main surface on which the cooling fluid channel is formed.

FIG. 14 are diagrams showing the configurations of both main surfaces of the cathode separator used in the fuel cell of Embodiment 4 of the present invention. FIG. 14(a) is a plan view showing the main surface on which the oxidizing gas channel is formed. FIG. 14(b) is a plan view showing the main surface on which the cooling fluid channel is formed.

Figure 1:
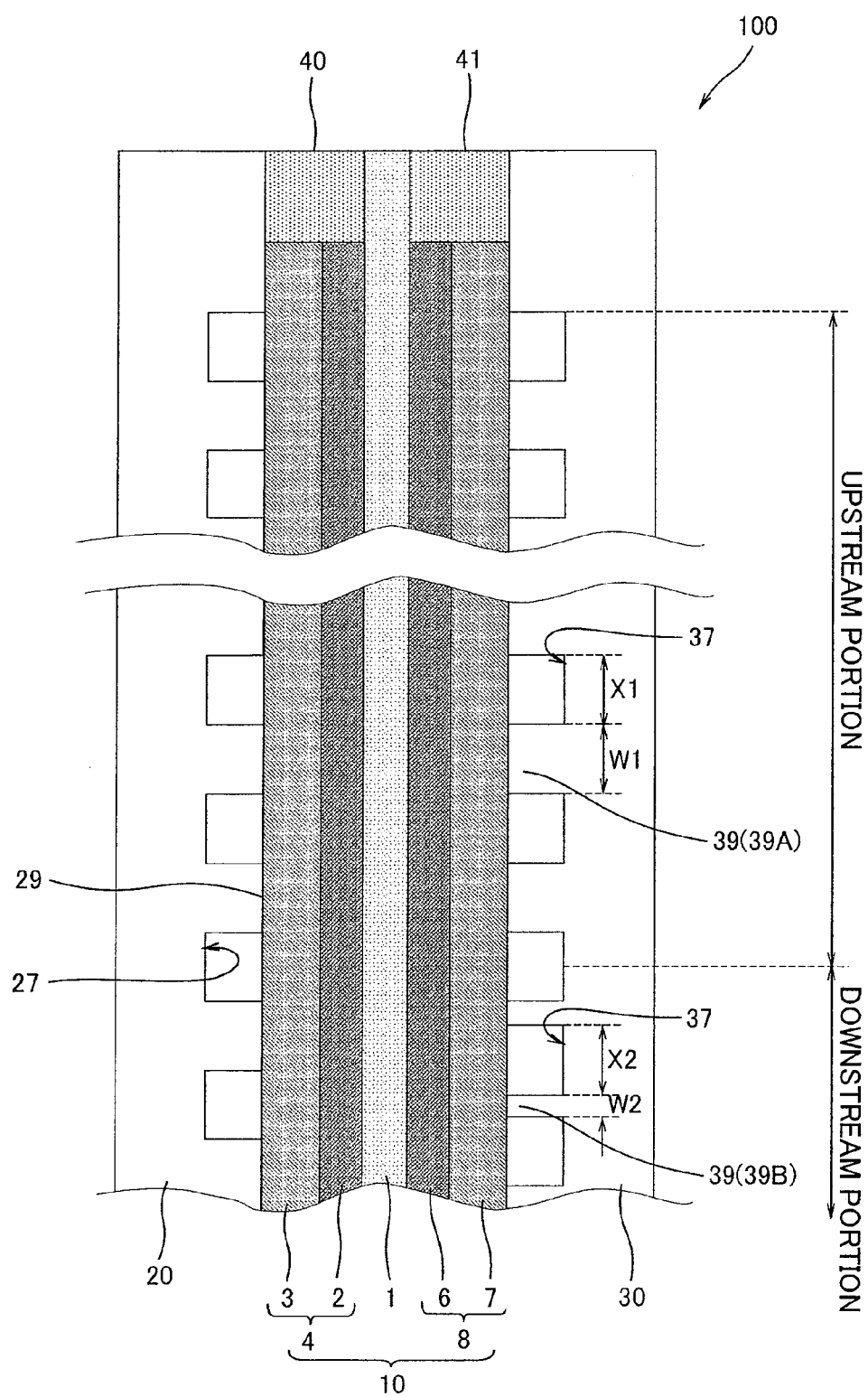
FIG. 1 is a partial cross-sectional view showing the configuration of a fuel cell of Embodiment 1 of the present invention.

EXPLANATION OF REFERENCE NUMBERS 1 polymer electrolyte membrane
2 anode catalyst layer
3 anode gas diffusion layer
4 anode (gas diffusion electrode)
4A portion
4B portion
4C uppermost stream portion (uppermost stream portion of separator)
6 cathode catalyst layer
7 cathode gas diffusion layer
8 cathode (gas diffusion electrode)
8A portion
8B portion
8C uppermost stream portion (uppermost stream portion of separator)
10 membrane-electrode assembly (polymer electrolyte layer-electrode assembly)
20 anode separator (second separator)
21 fuel gas supplying manifold hole
22 fuel gas discharging manifold hole
23 oxidizing gas supplying manifold hole
24 oxidizing gas discharging manifold hole
25 cooling fluid supplying manifold hole
26 cooling fluid discharging manifold hole
27 fuel gas channel (second reactant gas channel)
27A upstream portion (of fuel gas channel)
27B downstream portion (of fuel gas channel)
27C uppermost stream portion
27D downstream portion (remaining portion)
27E portion
28, 38 cooling fluid channel
29, 39 rib portion
29A rib portion (of upstream portion of fuel gas channel)
29B rib portion (of downstream portion of fuel gas channel)
30 cathode separator (first separator)
31 fuel gas supplying manifold hole (second reactant gas supplying manifold hole)
32 fuel gas discharging manifold hole
33 oxidizing gas supplying manifold hole (first reactant gas supplying manifold hole)
34 oxidizing gas discharging manifold hole
35 cooling fluid supplying manifold hole
36 cooling fluid discharging manifold hole
37 oxidizing gas channel (first reactant gas channel)
37A upstream portion (of oxidizing gas channel)
37B downstream portion (of oxidizing gas channel)
37C uppermost stream portion
37D downstream portion (remaining portion)
37E portion
39A rib portion (of upstream portion of oxidizing gas channel)
39B rib portion (of downstream portion of oxidizing gas channel)
40, 41 gasket
51 meeting portion
52 projection
61 fuel cell stack
62 cell stack body
63 first end plate
64 second end plate
71 central axis
100, 101 fuel cell
127A reciprocating portion
127B inverting portion 131 fuel gas supplying manifold
132 fuel gas discharging manifold
133 oxidizing gas supplying manifold
134 oxidizing gas discharging manifold
135 cooling fluid supplying manifold
136 cooling fluid discharging manifold
137A reciprocating portion
137B inverting portion
137C horizontal portion
137D vertical portion
202 electrode
202A portion
202B portion
203 reactant gas channel
204 rib portion
$D_1$ overall flow direction of oxidizing gas
$D_2$, $D_4$ overall flow direction of cooling fluid
$D_3$ overall flow direction of fuel gas

BEST MODE FOR CARRYING OUT THE INVENTION

Hereinafter, embodiments of the present invention will be explained in reference to the drawings. In the drawings, the same reference numbers are used for the same or corresponding portions, and a repetition of the same explanation may be avoided.

Embodiment 1

FIG. 1 is a partial cross-sectional view showing the configuration of a polymer electrolyte fuel cell (hereinafter referred to as "fuel cell") of Embodiment 1 of the present invention. FIG. 2 are diagrams showing the configurations of both main surfaces of a cathode separator used in the fuel cell of FIG. 1. FIG. 2(a) is a plan view showing the main surface on which an oxidizing gas channel is formed. FIG. 2(b) is a plan view showing the main surface on which a cooling fluid channel is formed. FIG. 3 are diagrams showing the configurations of both main surfaces of an anode separator used in the fuel cell of FIG. 1. FIG. 3(a) is a plan view showing the main surface on which a fuel gas channel is formed. FIG. 3(b) is a plan view showing the main surface on which a cooling fluid channel is formed. In FIG. 1, the cooling fluid channel is not shown. Hereinafter, the fuel cell of the present embodiment will be explained in reference to FIGS. 1 to 3.

As shown in FIG. 1, a fuel cell 100 of the present embodiment includes: a membrane-electrode assembly 10; a cathode separator 30 and an anode separator 20 disposed to sandwich the membrane-electrode assembly 10; and gaskets 40 and 41.

The membrane-electrode assembly 10 includes: a polymer electrolyte membrane 1; an anode catalyst layer 2 and a cathode catalyst layer 6 respectively disposed on both sides of the polymer electrolyte membrane 1; an anode gas diffusion layer 3 disposed on a main surface of the anode catalyst layer 2 which surface is opposite a main surface located on the polymer electrolyte membrane 1 side; and a cathode gas diffusion layer 7 disposed on a main surface of the cathode catalyst layer 6 which surface is opposite a main surface located on the polymer electrolyte membrane 1 side.

The polymer electrolyte membrane 1 is formed as a rectangular membrane piece. The polymer electrolyte membrane 1 has proton conductivity. It is preferable that the polymer electrolyte membrane 1 contain a sulfonic acid group, a carboxylic acid group, a phosphonic acid group, or a sulfonimide group as a positive ion exchange group. In light of the proton conductivity, it is more preferable that the polymer electrolyte membrane 1 contain the sulfonic acid group. It is especially preferable that the polymer electrolyte membrane 1 be a membrane containing, as polymer electrolyte that is a constituent material, a perfluoro carbon copolymer containing a repeating unit based on a perfluorovinyl compound expressed by $CF_2=CF-(OCF_2CFX)_m-O_p-(CF_2)_n-SO_3H$ (m is an integer from 0 to 3, n is an integer from 1 to 12, p is 0 or 1, and X is a fluorine atom or a trifluoromethyl group) and a repeating unit based on tetrafluoroethylene expressed by $CF_2=CF_2$.

The anode catalyst layer 2 and the cathode catalyst layer 6 are respectively disposed on both main surfaces of the polymer electrolyte membrane 1 so as to be opposed to each other. Each of the anode catalyst layer 2 and the cathode catalyst layer 6 may be configured to contain electrically-conductive carbon particles supporting electrode catalyst and a polymer electrolyte having positive ion (hydrogen ion) conductivity, or may be configured to further contain a water-repellent material, such as polytetrafluoroethylene. Specifically, as the polymer electrolyte, materials described above as the constituent material of the polymer electrolyte membrane 1 can be used. The polymer electrolyte may be the same as or different from the above-described constituent material of the polymer electrolyte membrane 1. The electrode catalyst is constituted by metallic particles (for example, metallic particles made of a precious metal), and is used by being supported by the electrically-conductive carbon particles (powder). The metallic particle is not especially limited, and various metals can be used. However, in light of an electrode reaction activity, it is preferable that the metallic particle be at least one metal selected from the group consisting of platinum, gold, silver, ruthenium, rhodium, palladium, osmium, iridium, chromium, iron, titanium, manganese, cobalt, nickel, molybdenum, tungsten, aluminum, silicon, zinc, and tin. Among these, platinum or an alloy of platinum is preferable, and an alloy of platinum and ruthenium is especially preferable since the activity of the catalyst becomes stable in the anode.

The anode gas diffusion layer 3 is disposed on a main surface of the anode catalyst layer 2 which surface is farther from the polymer electrolyte membrane 1. The cathode gas diffusion layer 7 is disposed on a main surface of the cathode catalyst layer 6 which surface is farther from the polymer electrolyte membrane 1. Each of the anode gas diffusion layer 3 and the cathode gas diffusion layer 7 is constituted by carbon woven fabric, carbon nonwoven fabric, carbon paper, carbon powder sheet, or the like. The anode catalyst layer 2 and the anode gas diffusion layer 3 are stacked on each other to form a flat plate shaped gas diffusion electrode (anode) 4. Moreover, the cathode catalyst layer 6 and the cathode gas diffusion layer 7 are stacked on each other to form a flat plate shaped gas diffusion electrode (cathode) 8. The anode 4 and the cathode 8 are disposed to sandwich the polymer electrolyte membrane 1 and be opposed to each other.

Next, the configuration of the cathode separator 30 will be explained in reference to FIG. 2.

As shown in FIGS. 2(a) and 2(b), the cathode separator 30 is formed to have a rectangular plate shape. An oxidizing gas supplying manifold hole 33, an oxidizing gas discharging manifold hole 34, a fuel gas supplying manifold hole 31, a fuel gas discharging manifold hole 32, a cooling fluid supplying manifold hole 35, and a cooling fluid discharging manifold hole 36 are formed at a peripheral portion of the cathode separator 30. As shown in FIG. 2(a), a groove-like oxidizing gas channel 37 for exposing the cathode 8 to an oxidizing gas is formed on one of main surfaces of the cathode separator 30. The oxidizing gas channel 37 is formed to connect the oxidizing gas supplying manifold hole 33 and the oxidizing gas discharging manifold hole 34. The oxidizing gas channel 37 is formed to have a serpentine shape.

Here, a portion sandwiched by the oxidizing gas channel 37 of the cathode separator 30 is defined as a rib portion 39. This definition is also applied to below-described Comparative Example, Modification Examples, and Embodiments. Moreover, in the present embodiment, the oxidizing gas channel 37 is constituted by an upstream portion 37A and a downstream portion 37B. The upstream portion 37A has an upstream end connected to the oxidizing gas supplying manifold hole 33, and the downstream portion 37B is a portion provided downstream of the upstream portion 37A and has a downstream end connected to the oxidizing gas discharging manifold hole 34.

The oxidizing gas channel 37 includes a plurality of portions extending in parallel with one another. To be specific, the oxidizing gas channel 37 is constituted by long channels (major portions) linearly extending in a horizontal direction and short channels linearly extending in a vertical direction, and the long channels constitute the plurality of portions extending in parallel with one another, and the short channels constitute the plurality of portions extending in parallel with one another. In the oxidizing gas channel 37, the area per unit area of a rib portion 39A formed by the upstream portion 37A is larger than the area per unit area of a rib portion 39B formed by the downstream portion 37B. In other words, as shown in FIG. 1, a ratio $W_1/X_1$ that is a ratio of a width $W_1$ of the rib portion 39A formed by the upstream portion 37A to a width $X_1$ of the oxidizing gas channel 37 is higher than a ratio $W_2/X_1$ that is a ratio of a width $W_2$ of the rib portion 39B formed by the downstream portion 37B to a width $X_2$ of the oxidizing gas channel 37. In the present embodiment, the width $X_1$ of the oxidizing gas channel 37 in the upstream portion 37A and the width $X_2$ of the oxidizing gas channel 37 in the downstream portion 37B are substantially the same as each other. Moreover, in the present embodiment, the upstream portion 37A and downstream portion 37B of the oxidizing gas channel 37 are divided at a position of about 50% of the entire length of the oxidizing gas channel 37. The upstream portion 37A and the downstream portion 37B may be divided at a position of 30% to 70% of the entire length of the oxidizing gas channel 37. Here, the position at which the upstream portion 37A and the downstream portion 37B are divided is determined in accordance with the heat conductivity of the cathode separator 30, the flow velocity of the oxidizing gas, the operating temperature of the fuel cell 100, the degree of humidification in the oxidizing gas, and the like.

As shown in FIG. 2(*b*), a groove-like cooling fluid channel 38 is formed on the other main surface of the cathode separator 30. The cooling fluid channel 38 is formed to connect the cooling fluid supplying manifold hole 35 and the cooling fluid discharging manifold hole 36. The cooling fluid channel 38 is formed to have a serpentine shape. The cooling fluid channel 38 is constituted by long channels (major portions) linearly extending in the horizontal direction and short channels linearly extending in the vertical direction. The cooling fluid channel 38 and the oxidizing gas channel 37 formed on the opposite surface are formed such that the major portions thereof extend substantially in parallel with each other. To be specific, the major portions of the cooling fluid channel 38 are formed to extend substantially in parallel with the major portions of the oxidizing gas channel 37 formed on the opposite surface.

Moreover, as shown in FIGS. 2(*a*) and 2(*b*), the oxidizing gas channel 37 and the cooling fluid channel 38 are formed such that an overall flow direction $D_1$ of the oxidizing gas flowing from upstream to downstream in the oxidizing gas channel 37 and an overall flow direction $D_2$ of the cooling fluid flowing from upstream to downstream in the cooling fluid channel 38 formed on the opposite surface substantially coincide with each other. In other words, the overall flow direction $D_1$ of the oxidizing gas flowing from upstream to downstream in the oxidizing gas channel 37 and the overall flow direction $D_2$ of the cooling fluid flowing from upstream to downstream in the cooling fluid channel 38 formed on the opposite surface form parallel flow.

The cathode separator 30 configured as above is disposed such that the main surface on which the oxidizing gas channel 37 is formed contacts the cathode 8.

Next, the configuration of the anode separator 20 will be explained.

As shown in FIGS. 3(*a*) and 3(*b*), the anode separator 20 is formed to have a rectangular plate shape. An oxidizing gas supplying manifold hole 23, an oxidizing gas discharging manifold hole 24, a fuel gas supplying manifold hole 21, a fuel gas discharging manifold hole 22, a cooling fluid supplying manifold hole 25, and a cooling fluid discharging manifold hole 26 are formed at a peripheral portion of the anode separator 20. As shown in FIG. 3(*a*), a groove-like fuel gas channel 27 for exposing the anode 4 to a fuel gas is formed on one of main surfaces of the anode separator 20. The fuel gas channel 27 is formed to connect the fuel gas supplying manifold hole 21 and the fuel gas discharging manifold hole 22. The fuel gas channel 27 is formed to have a serpentine shape.

Here, a portion sandwiched by the fuel gas channel 27 of the anode separator 20 is defined as a rib portion 29. This definition is also applied to below-described Comparative Example, Modification Examples, and Embodiments.

The fuel gas channel 27 includes a plurality of portions extending in parallel with one another. The fuel gas channel 27 is constituted by long channels (major portions) linearly extending in the horizontal direction and short channels linearly extending in the vertical direction. The fuel gas channel 27 is formed such that intervals between the long channels linearly extending in the horizontal direction are substantially the same as one another. In other words, the widths of the rib portions 29 each sandwiched by the fuel gas channel 27 are substantially the same as one another in the entire region of the fuel gas channel 27.

As shown in FIG. 3(*b*), a groove-like cooling fluid channel 28 is formed on the other main surface of the anode separator 20. The cooling fluid channel 28 is formed to connect the cooling fluid supplying manifold hole 25 and the cooling fluid discharging manifold hole 26. The cooling fluid channel 28 is formed to have a serpentine shape. The cooling fluid channel 28 is constituted by long channels (major portions) linearly extending in the horizontal direction and short channels linearly extending in the vertical direction.

The cooling fluid channel 28 and the fuel gas channel 27 formed on the opposite surface are formed such that the major portions thereof extend substantially in parallel with each other. To be specific, the major portions of the cooling fluid channel 28 are formed to extend substantially in parallel with the major portions of the fuel gas channel 27 formed on the opposite surface.

Moreover, as shown in FIGS. 3(*a*) and 3(*b*), the fuel gas channel 27 and the cooling fluid channel 28 are formed such that an overall flow direction $D_3$ of the fuel gas flowing from upstream to downstream in the fuel gas channel 27 and an overall flow direction $D_4$ of the cooling fluid flowing from upstream to downstream in the cooling fluid channel 28 formed on the opposite surface substantially coincide with each other. In other words, the overall flow direction $D_3$ of the fuel gas flowing from upstream to downstream in the fuel gas channel 27 and the overall flow direction $D_4$ of the cooling fluid flowing from upstream to downstream in the cooling fluid channel 28 formed on the opposite surface form parallel flow.

The anode separator 20 configured as above is disposed such that the main surface on which the fuel gas channel 27 is formed contacts the anode 4.

Each of the gaskets 40 and 41 is formed to have a rectangular ring shape. The gasket 40 is disposed to be located around the membrane-electrode assembly 10 and between the anode separator 20 and the polymer electrolyte membrane 1 of the membrane-electrode assembly 10. The gasket 41 is disposed to be located around the membrane-electrode assembly 10 and between the cathode separator 30 and the polymer electrolyte membrane 1 of the membrane-electrode assembly 10. The gaskets 40 and 41 are formed by an adhesive using fluorocarbon rubber, silicon rubber, natural rubber, ethylene-propylene rubber (EPDM), butyl rubber, butylchloride rubber, butylbromide rubber, butadiene rubber, styrene-butadiene copolymer, ethylene-vinyl acetate rubber, acryl rubber, polyisopropylene polymer, perfluoro carbon, thermoplastic elastomer (polystyrene-based elastomer, polyolefin-based elastomer, polyester-based elastomer, polyamide-based elastomer, or the like), or latex (isoprene rubber, butadiene rubber, or the like), a liquid adhesive (adhesive using polybutadiene, polyisoprene, polychloroprene, silicon rubber, fluorocarbon rubber, acrylonitrile-butadiene rubber, or the like), or the like.

Next, operations of the fuel cell 100 configured as above will be explained.

In FIGS. 1 to 3, in the fuel cell 100, the fuel gas is supplied to a fuel gas supplying manifold (not shown) formed by suitably connecting the fuel gas supplying manifold holes 21 and 31. The fuel gas flows through the fuel gas channels 27 of respective cells. Meanwhile, the oxidizing gas is supplied to an oxidizing gas supplying manifold (not shown) formed by suitably connecting the oxidizing gas supplying manifold holes 23 and 33. The oxidizing gas flows through the oxidizing gas channels 37 of respective cells. Moreover, cooling water is supplied to a cooling water supplying manifold (not shown) formed by suitably connecting the cooling water supplying manifold holes 25 and 35. The cooling water flows through the cooling fluid channels 28 and 38 of respective cells. Then, the fuel gas and the oxidizing gas react with each other in the anode and cathode of the membrane-electrode assembly 10 to generate electricity and heat. The generated electricity is output to outside through the anode separator 20 and the cathode separator 30. The unreacted (unconsumed) fuel gas is discharged to outside through a fuel gas discharging manifold (not shown) formed by suitably connecting the fuel gas discharging manifold holes 22 and 32. Moreover, the unreacted (unconsumed) oxidizing gas is discharged to outside through a fuel gas discharging manifold (not shown) formed by suitably connecting the oxidizing gas discharging manifold holes 24 and 34. Meanwhile, the generated heat is recovered by the cooling water flowing through the cooling fluid channels 28 and 38. The cooling water having recovered the heat is discharged to outside through a cooling water discharging manifold (not shown) formed by suitably connecting the cooling water discharging manifold holes 26 and 36.

Next, operational advantages of the present invention will be explained in detail while being compared with Comparative Example to clarify the superiority of the present invention.

Figure 4:
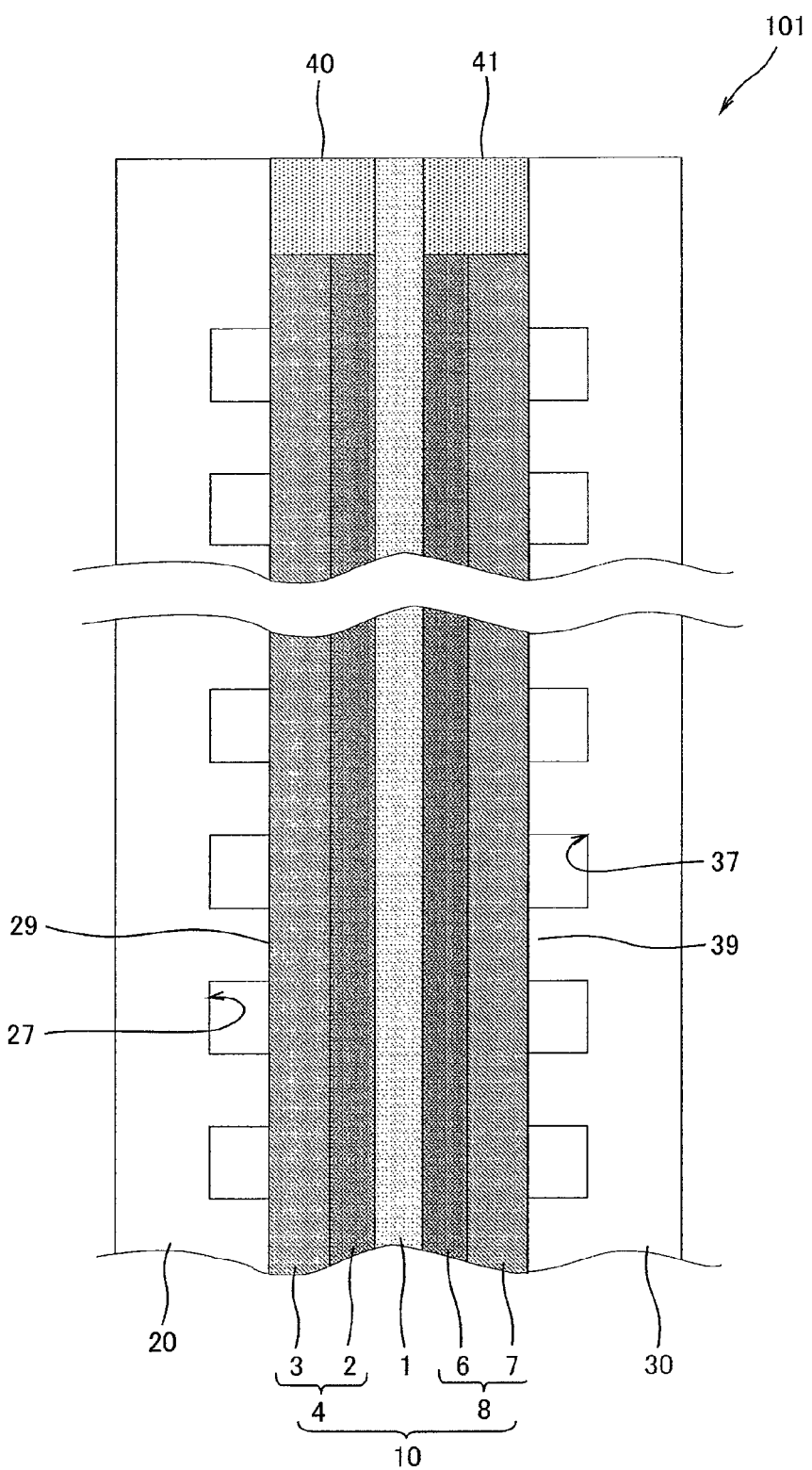
FIG. 4 is a partial cross-sectional view showing the configuration of the fuel cell of Comparative Example.
Figure 5:
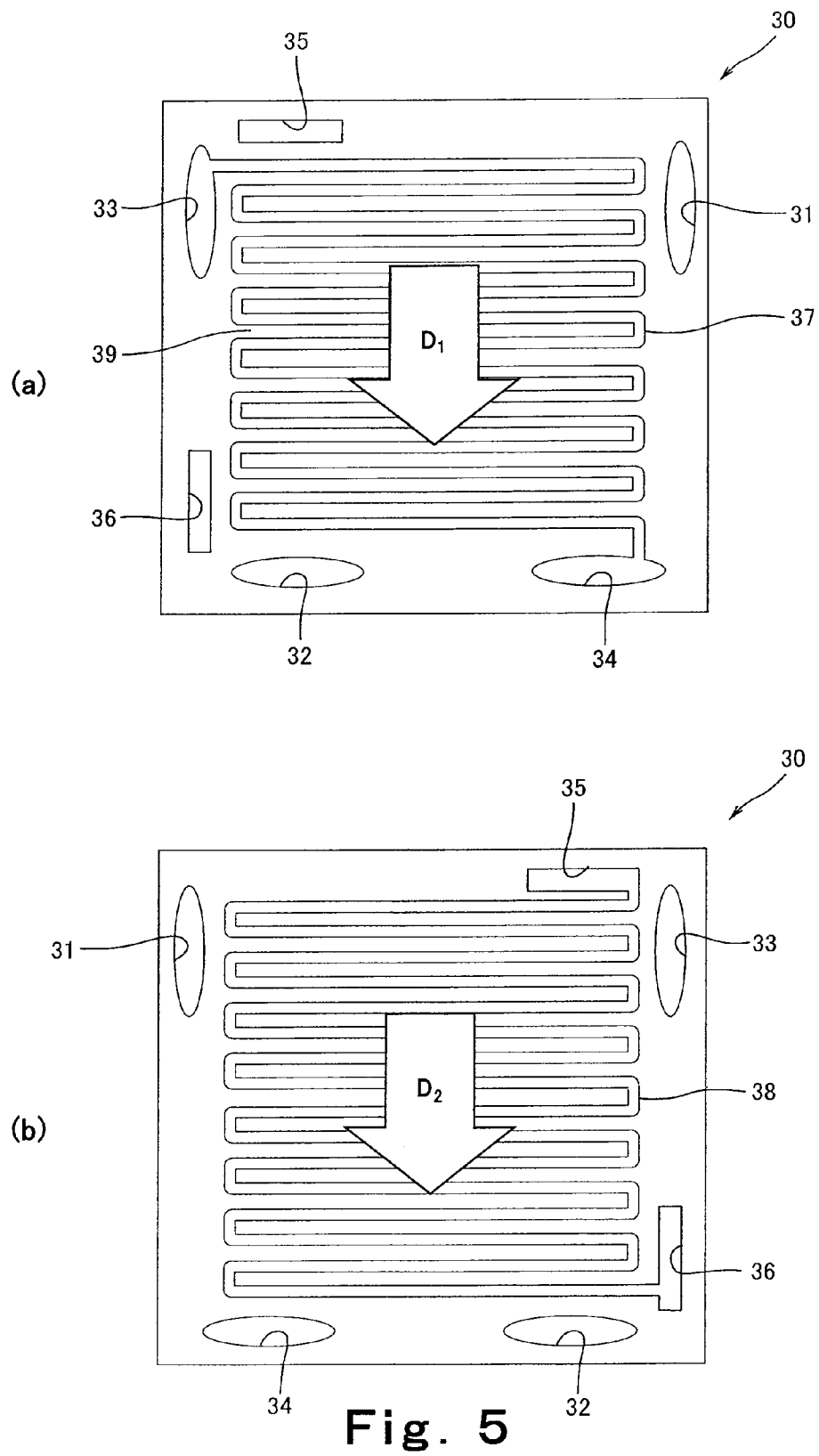
FIG. 5 are diagrams showing the configurations of both main surfaces of the cathode separator used in the fuel cell of FIG. 4.

FIG. 4 is a partial cross-sectional view showing the configuration of the fuel cell of Comparative Example. FIG. 5 are diagrams showing the configurations of both main surfaces of the cathode separator used in the fuel cell of FIG. 4. FIG. 5(a) is a plan view showing the main surface on which the cathode gas channel is formed. FIG. 5(b) is a plan view showing the main surface on which the cooling fluid channel is formed. In FIG. 4, the cooling fluid channel is not shown. Hereinafter, the fuel cell of Comparative Example will be explained in reference to FIGS. 4 and 5.

As shown in FIGS. 4 and 5, the configuration of the cathode separator 30 used in a fuel cell 101 of Comparative Example is different from the configuration of the cathode separator 30 used in the fuel cell 100 of Embodiment 1.

To be specific, in the oxidizing gas channel 37 of the cathode separator 30 used in the fuel cell 101 of Comparative Example, the widths of the portions each located between the channels (major portions) linearly extending in the horizontal direction are substantially the same as one another. In other words, the widths of the rib portions 39 each sandwiched by the oxidizing gas channel 37 are substantially the same as one another in the entire region of the oxidizing gas channel 37. The other configuration of the fuel cell 101 of Comparative Example is the same as the configuration of the fuel cell 100 of Embodiment 1.

Next, the fuel cell 100 of Embodiment 1 and the fuel cell 101 of Comparative Example are compared with each other.

Figure 6:
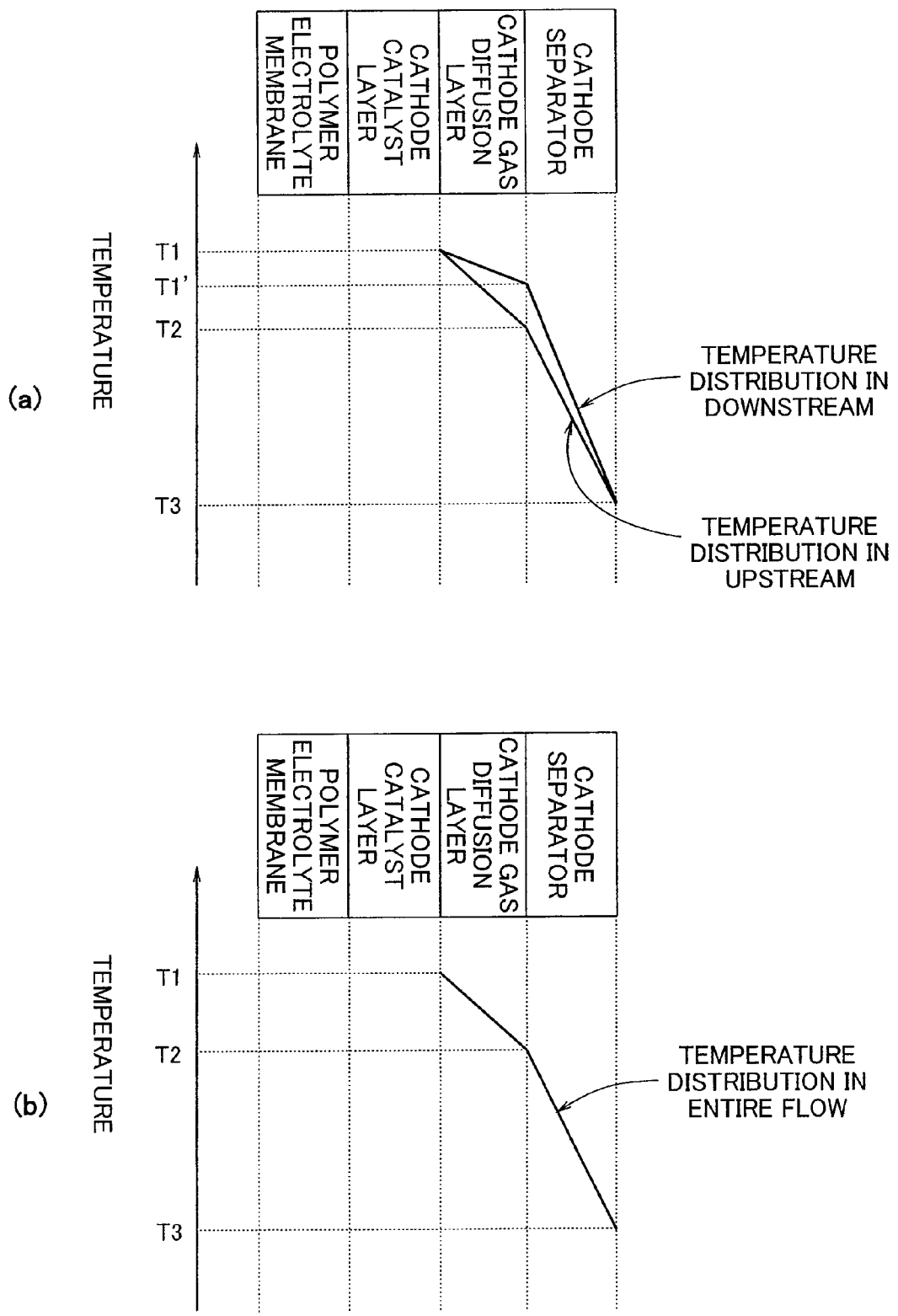
FIG. 6 are diagrams showing temperature distributions of respective portions of the fuel cell.

FIG. 6 are diagrams showing temperature distributions of respective portions of the fuel cell. FIG. 6(a) shows the temperature distributions of respective portions in the cross section of the fuel cell of Embodiment 1. FIG. 6(b) shows the temperature distributions of respective portions in the cross section of the fuel cell of Comparative Example. In FIGS. 6(a) and 6(b), a horizontal axis denotes respective portions, and a vertical axis denotes temperatures. The fuel cell of Embodiment 1 and the fuel cell of Comparative Example are compared with each other in reference to FIG. 6 to clarify the advantages of the fuel cell of the present embodiment.

As shown in FIG. 6(a), in the upstream portion 37A of the oxidizing gas channel 37 of the fuel cell 100 of Embodiment 1, the temperature of the main surface of the cathode catalyst layer 6 which surface is located on the cathode gas diffusion layer 7 side (the main surface of the cathode gas diffusion layer 7 which surface is located on the cathode catalyst layer 6 side) is a temperature $T_1$. The temperature of the main surface of the cathode gas diffusion layer 7 which surface is located on the cathode separator 30 side (the main surface of the cathode separator 30 which surface is located on the cathode gas diffusion layer 7 side) is a temperature $T_1$. The temperature of the main surface of the cathode separator 30 which surface is opposite the main surface located on the cathode gas diffusion layer 7 side is a temperature $T_3$. To be specific, the temperature decreases and the gradient of temperature decrease becomes higher in a thickness direction of the cell from the center (polymer electrolyte membrane 1) of the cell to outside of the cell, i.e., to the cathode catalyst layer 6, the cathode gas diffusion layer 7, and the cathode separator 30.

Meanwhile, in the downstream portion 37B of the oxidizing gas channel 37, the temperature of the main surface of the cathode catalyst layer 6 which surface is located on the cathode gas diffusion layer 7 side (the main surface of the cathode gas diffusion layer 7 which surface is located on the cathode catalyst layer 6 side) is the temperature $T_1$. The temperature of the main surface of the cathode gas diffusion layer 7 which surface is located on the cathode separator 30 side (the main surface of the cathode separator 30 which surface is located on the cathode gas diffusion layer 7 side) is a temperature ($T_1'$) between the temperatures $T_1$ and $T_2$. The temperature of the main surface of the cathode separator 30 which surface is opposite the main surface located on the cathode gas diffusion layer 7 side is the temperature $T_3$. To be specific, the temperature decreases in the thickness direction of the cell from the center (polymer electrolyte membrane 1) of the cell to outside of the cell, i.e., to the cathode catalyst layer 6, the cathode gas diffusion layer 7, and the cathode separator 30, and the gradient of temperature decrease of the downstream portion 37B is lower than the gradient of temperature decrease of the upstream portion 37A.

Meanwhile, as shown in FIG. 6(*b*), in the fuel cell 101 of Comparative Example, the temperature of the main surface of the cathode catalyst layer 6 which surface is located on the cathode gas diffusion layer 7 side (the main surface of the cathode gas diffusion layer 7 which surface is located on the cathode catalyst layer 6 side) is the temperature $T_1$. The temperature of the main surface of the cathode gas diffusion layer 7 which surface is located on the cathode separator 30 side (the main surface of the cathode separator 30 which surface is located on the cathode gas diffusion layer 7 side) is the temperature $T_2$. The temperature of the main surface of the cathode separator 30 which surface is opposite the main surface located on the cathode gas diffusion layer 7 side is the temperature $T_3$. To be specific, in the entire flow region of the fuel cell 101 of Comparative Example, the temperature decreases and the gradient of temperature decrease becomes higher in the thickness direction of the cell from the center (polymer electrolyte membrane 1) of the cell to outside of the cell, i.e., to the cathode catalyst layer 6, the cathode gas diffusion layer 7, and the cathode separator 30, as with the upstream portion 37A of the fuel cell 100 of Embodiment 1.

In accordance with the above, the temperature of the cathode gas diffusion layer 7 corresponding to the downstream portion 37B in the fuel cell 100 of Embodiment 1 is higher than the temperature of the entire flow region of the fuel cell 101 of Comparative Example.

As above, in the fuel cell 100 of the present embodiment, a contact area between the rib portion 39B formed by the downstream portion 37B of the oxidizing gas channel 37 and the cathode gas diffusion layer 7 is smaller than that in Comparative Example. Therefore, the amount of heat transferred from the cathode catalyst layer 6 to the cathode separator 30 is small, and the temperature of the cathode gas diffusion layer 7 corresponding to the downstream portion 37B of the oxidizing gas channel 37 becomes high. With this, the dew condensation of the water generated by the electric power generating reaction is less likely to occur, and the occurrence of the flooding is suppressed in not only the oxidizing gas channel 37 but also the cathode gas diffusion layer 7.

Meanwhile, in the upstream portion 37A of the oxidizing gas channel 37, current concentration may occur since the amount of the reactant gas related to a battery reaction is large, and a battery voltage may decrease due to the increase in a contact resistance. However, as in the fuel cell 100 of the present embodiment, by increasing the contact area between the rib portion 39A and the cathode 8 in the upstream portion 37A of the oxidizing gas channel 37, the contact resistance is reduced, and the decrease in the battery voltage is suppressed.

Moreover, in the fuel cell 100 of the present embodiment, the cooling fluid channels 28 and 38, the fuel gas channel 27, and the oxidizing gas channel 37 are formed such that the major portions thereof are substantially in parallel with one another. Further, in the fuel cell 100 of the present embodiment, the cooling fluid channels 38 and 28, the oxidizing gas channel 37, and the fuel gas channel 27 are formed such that the cooling fluid and the oxidizing gas forms the parallel flow and the cooling fluid and the fuel gas forms the parallel flow. Therefore, the cooling fluid which has not yet recovered the heat and is low in temperature flows through the cooling fluid channel 38 formed on the surface opposite the surface on which the upstream portion 37A where the electric power generation concentrates is located, so that a cooling efficiency improves. In contrast, the cooling fluid which has recovered the heat and is high in temperature flows through the cooling fluid channel 38 formed on the surface opposite the surface on which the downstream portion 37B of the oxidizing gas channel 37 is located, so that the temperature of the downstream portion 37B increases. With this, in the downstream portion 37B of the oxidizing gas channel 37, the dew condensation of the generated water is even less likely to occur, and the occurrence of the flooding is further suppressed.

In the cathode separator 30 of the fuel cell 100 of the present invention, since the oxidizing gas channel 37 is large in length, the resistance in the channel is high. Therefore, if the configuration of the channel groove is the same between the upstream portion 37A and the downstream portion 37B, the pressure loss increases, and the flow rate decreases. On this account, it is preferable that the oxidizing gas channel 37 be formed such that the pressure loss does not change between the upstream portion 37A and the downstream portion 37B by forming a deeper channel groove of the downstream portion 37B of the oxidizing gas channel 37, forming the downstream portion 37B by a plurality of channel grooves, or changing the ratio of the rib portions between the upstream portion 37A and the downstream portion 37B.

Modification Example 1

Figure 7:
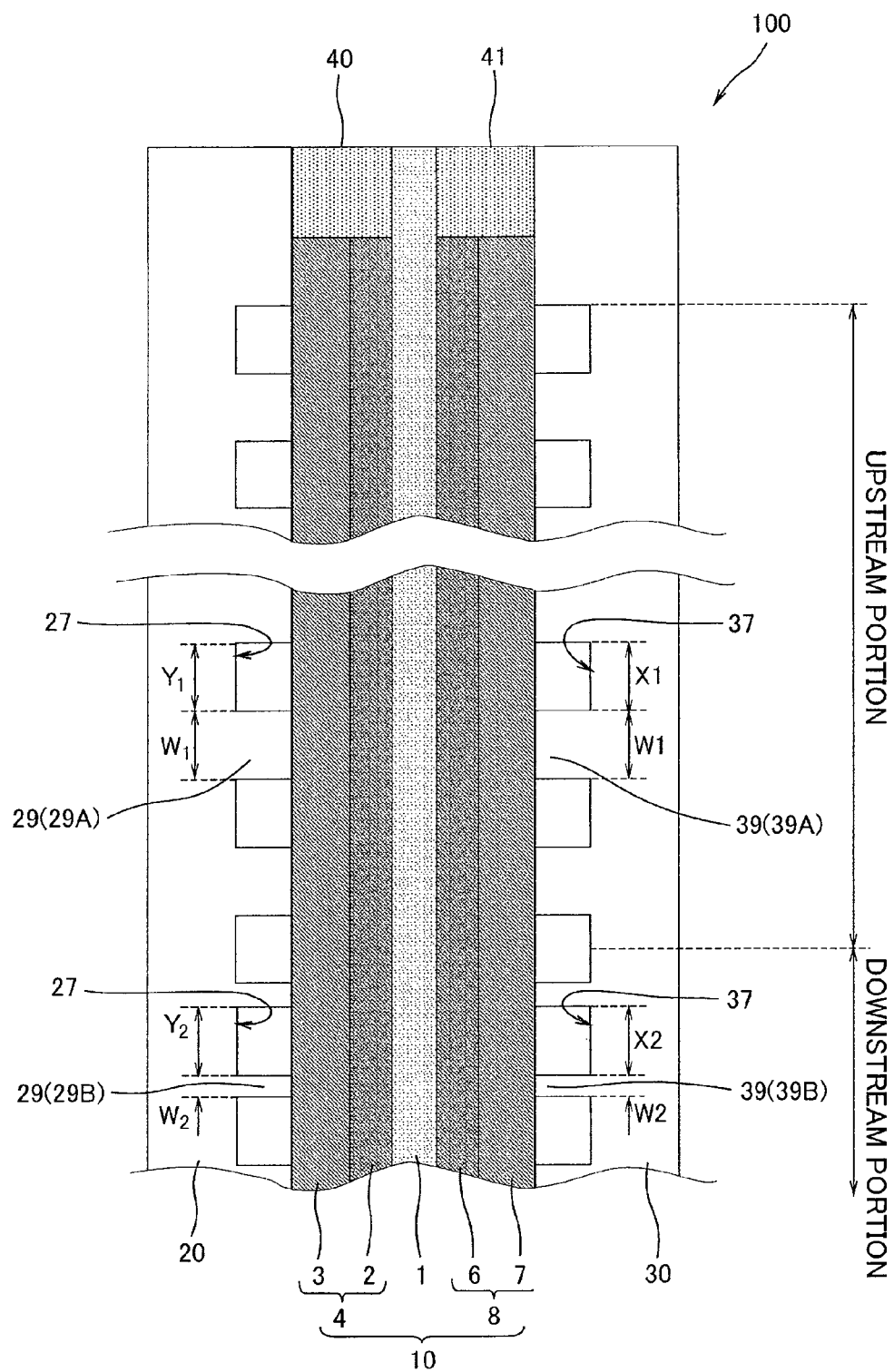
FIG. 7 is a partial cross-sectional view showing the configuration of the fuel cell of Modification Example 1 of the present invention.

FIG. 7 is a partial cross-sectional view showing Modification Example 1 of the fuel cell of Embodiment 1. FIG. 8 are diagrams showing the configurations of both main surfaces of the anode separator used in the fuel cell of FIG. 7. FIG. 8(*a*) is a plan view showing the main surface on which the fuel gas channel is formed. FIG. 8(*b*) is a plan view showing the main surface on which the cooling fluid channel is formed. In FIG. 7, the cooling fluid channel is not shown. Hereinafter, the fuel cell of Modification Example 1 will be explained in reference to FIGS. 7 and 8.

The configuration of the anode separator 20 in the fuel cell 100 of Modification Example 1 is different from the configuration of the anode separator 20 in the fuel cell of Embodiment 1. To be specific, as shown in FIGS. 7 and 8, in Modification Example 1, the fuel gas channel 27 is constituted by an upstream portion 27A and a downstream portion 27B. The upstream portion 27A has an upstream end connected to the fuel gas supplying manifold hole 21, and the downstream portion 27B is a portion provided downstream of the upstream portion 27A and has a downstream end connected to the fuel gas discharging manifold hole 22.

The fuel gas channel 27 includes a plurality of portions extending in parallel with one another. To be specific, the fuel gas channel 27 is constituted by long channels (major portions) linearly extending in the horizontal direction and short channels linearly extending in the vertical direction, and the long channels constitute the plurality of portions extending in parallel with one another, and the short channels constitute the plurality of portions extending in parallel with one another. In the fuel gas channel 27, the area per unit area of a rib portion 29A formed by the upstream portion 27A is larger than the area per unit area of a rib portion 29B formed by the downstream portion 27B. In other words, as shown in FIG. 7, a ratio $W_1/Y_1$ that is a ratio of the width $W_1$ of the rib portion 29A formed by the upstream portion 27A to a width $Y_1$ of the fuel gas channel 27 is higher than a ratio $W_2/Y_2$ that is a ratio of the width $W_2$ of the rib portion 29B formed by the downstream portion 27B to a width $Y_2$ of the fuel gas channel 27. In the present embodiment, the width $Y_1$ of the fuel gas channel 27 in the upstream portion 27A and the width $Y_2$ of the fuel gas channel 27 in the downstream portion 27B are substantially the same as each other. Moreover, in the present embodiment, the upstream portion 27A and the downstream portion 27B are divided at a position of about 50% of the entire length of the fuel gas channel 27. The upstream portion 27A and the downstream portion 27B may be divided at a position of 30% to 70% of the entire length of the fuel gas channel 27. Here, the position at which the upstream portion 27A and the downstream portion 27B are divided is determined in accordance with the heat conductivity of the anode separator 20, the flow velocity of the fuel gas, the operating temperature of the fuel cell 100, the degree of humidification in the fuel gas, and the like. The other configuration of the fuel cell 100 of Modification Example 1 is the same as the configuration of the fuel cell 100 of Embodiment 1.

With this configuration, in the fuel cell 100 of Embodiment 1, the fuel gas channel 27 can obtain the same effects as the oxidizing gas channel 37.

Moreover, a contact area between the rib portion 29B formed by the downstream portion 27B of the fuel gas channel 27 and the anode gas diffusion layer 3 is smaller than that in Comparative Example. Therefore, the amount of heat transferred from the anode catalyst layer 2 to the anode separator 20 is small, and the temperature of the anode gas diffusion layer 3 corresponding to the downstream portion 27B of the fuel gas channel 27 becomes high. With this, the dew condensation of the generated water (generated water having diffused from the cathode 8 to the anode 4) generated by the electric power generating reaction is less likely to occur, and the occurrence of the flooding is suppressed in not only the fuel gas channel 27 but also the anode gas diffusion layer 3.

Meanwhile, in the upstream portion 37A of the oxidizing gas channel 37 and the upstream portion 27A of the fuel gas channel 27, the current concentration may occur since the amount of the reactant gas related to the battery reaction is large, and the battery voltage may decrease due to the increase in the contact resistance. However, as in the fuel cell 100 of Modification Example 1, by increasing the contact area between the rib portion 39A and the cathode 8 in the upstream portion 37A of the oxidizing gas channel 37 and increasing the contact area between the rib portion 29A and the anode 4 in the upstream portion 27A of the fuel gas channel 27, the contact resistance is further reduced, and the decrease in the battery voltage is further suppressed.

Modification Example 2

Figure 9:
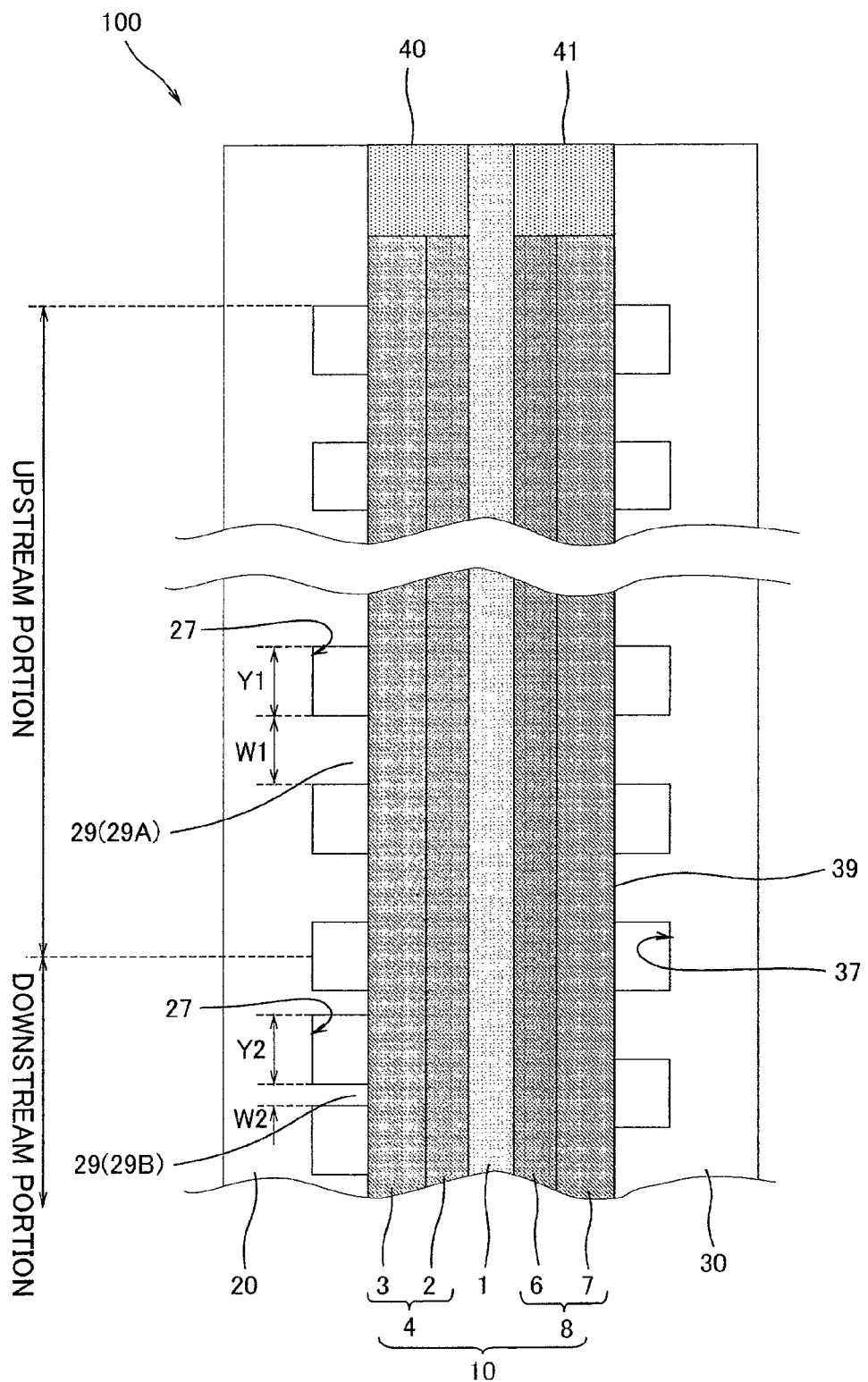
FIG. 9 is a partial cross-sectional view showing the configuration of the fuel cell of Modification Example 2 of the present invention.

FIG. 9 is a partial cross-sectional view showing Modification Example 2 of the fuel cell of Embodiment 1. In FIG. 9, the cooling fluid channel is not shown. Hereinafter, the fuel cell of Modification Example 2 will be explained in reference to FIG. 9.

In the fuel cell 100 of Modification Example 2, the separator shown in FIG. 5 is used as the cathode separator 30, and the separator shown in FIG. 8 is used as the anode separator 20. The other configuration of the fuel cell 100 of Modification Example 2 is the same as the configuration of the fuel cell of Modification Example 1.

With this configuration, the dew condensation of the generated water (generated water having diffused from the cathode 8 to the anode 4) generated by the electric power generating reaction is less likely to occur, and the occurrence of the flooding is suppressed in not only the fuel gas channel 27 but also the anode gas diffusion layer 3.

Embodiment 2

Figure 10:
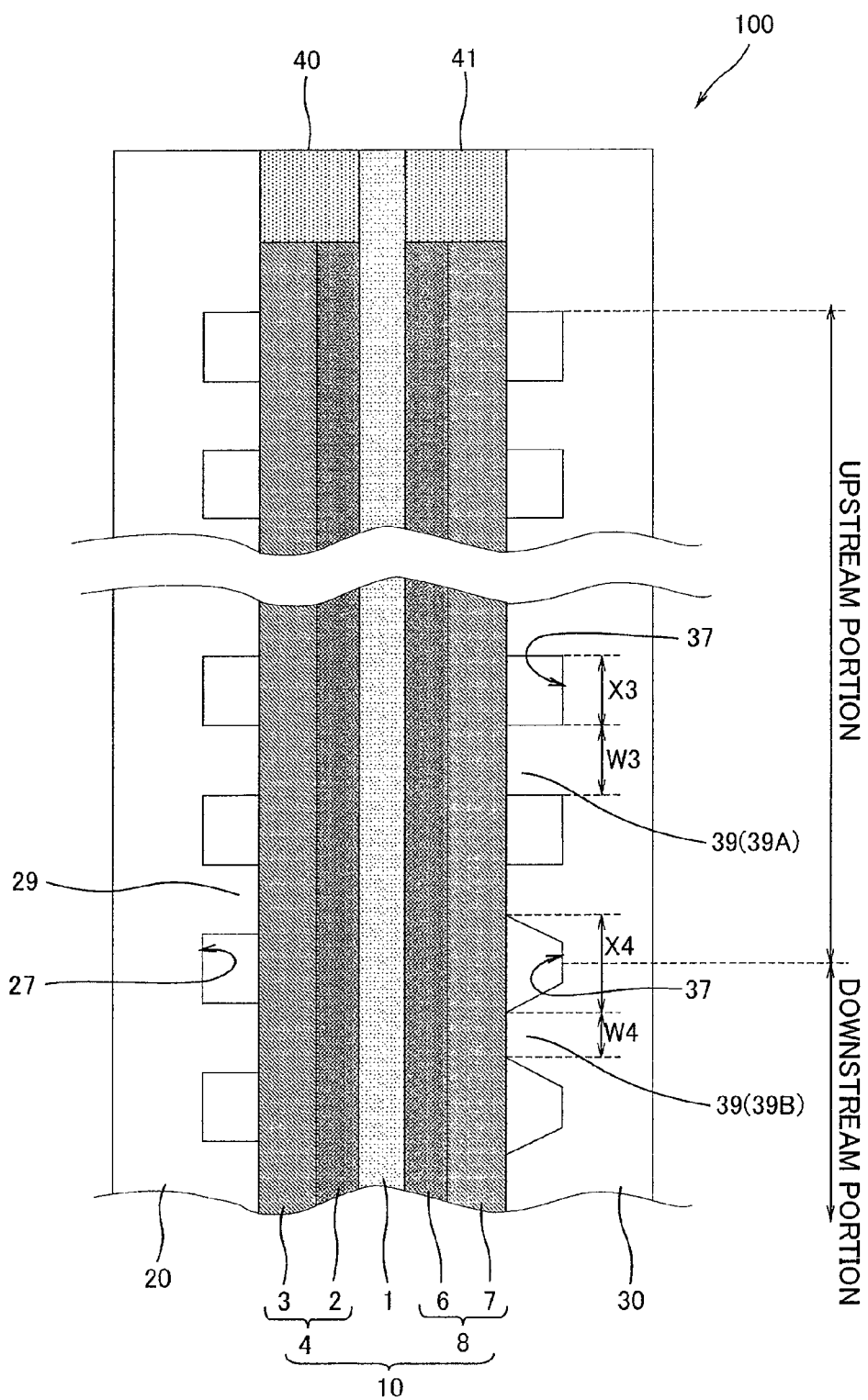
FIG. 10 is a partial cross-sectional view showing the configuration of the fuel cell of Embodiment 2 of the present invention.

FIG. 10 is a partial cross-sectional view showing the configuration of the fuel cell of Embodiment 2 of the present invention. FIG. 11 are diagrams showing the configurations of both main surfaces of the cathode separator used in the fuel cell of FIG. 10. FIG. 11(a) is a plan view showing the main surface on which the oxidizing gas channel is formed. FIG. 11(b) is a plan view showing the main surface on which the cooling fluid channel is formed. In FIG. 10, the cooling fluid channel is not shown. Hereinafter, the fuel cell of the present embodiment will be explained in reference to FIGS. 10 and 11.

The configuration of the cathode separator 30 used in the fuel cell 100 of the present embodiment is different from that of Embodiment 1. To be specific, as shown in FIG. 10, in the cathode separator 30 constituting the fuel cell 100 of the present embodiment, the channel groove of the downstream portion 37B of the oxidizing gas channel 37 is formed such that a width thereof becomes wider in a direction from a bottom thereof toward an opening thereof, and a side wall thereof has a tapered shape. Thus, as shown in FIG. 11, in the oxidizing gas channel 37, the area per unit area of the rib portion 39A formed by the upstream portion 37A is larger than the area per unit area of the rib portion 39B formed by the downstream portion 37B. In other words, as shown in FIG. 10, a ratio $W_3/X_3$ that is a ratio of a width $W_3$ of the rib portion 39A formed by the upstream portion 37A to a width $X_3$ of the oxidizing gas channel 37 is higher than a ratio $W_4/X_4$ that is a ratio of a width $W_4$ of the rib portion 39B formed by the downstream portion 37B to a width $X_4$ of the opening of the oxidizing gas channel 37. The other configuration of the cathode separator 30 used in the fuel cell 100 of the present embodiment is the same as the configuration of the cathode separator used in the fuel cell of Embodiment 1.

Even with this configuration, the contact area between the rib portion 39B formed by the downstream portion 37B of the oxidizing gas channel 37 and the cathode gas diffusion layer 7 becomes smaller than that in Comparative Example. Therefore, the fuel cell of Embodiment 2 can obtain the same effects as the fuel cell of Embodiment 1.

Moreover, since the width of the opening of the downstream portion 37B of the oxidizing gas channel 37 is increased by forming the tapered-shape side wall, the cross-sectional area of the channel groove of the oxidizing gas channel 37 is not increased so much (see FIG. 10), so that the flow velocity of the oxidizing gas flowing through the oxidizing gas channel 37 does not decrease so much. With this, the occurrence of the flooding due to the decrease in the flow velocity can also be suppressed.

Embodiment 3

Figure 12:
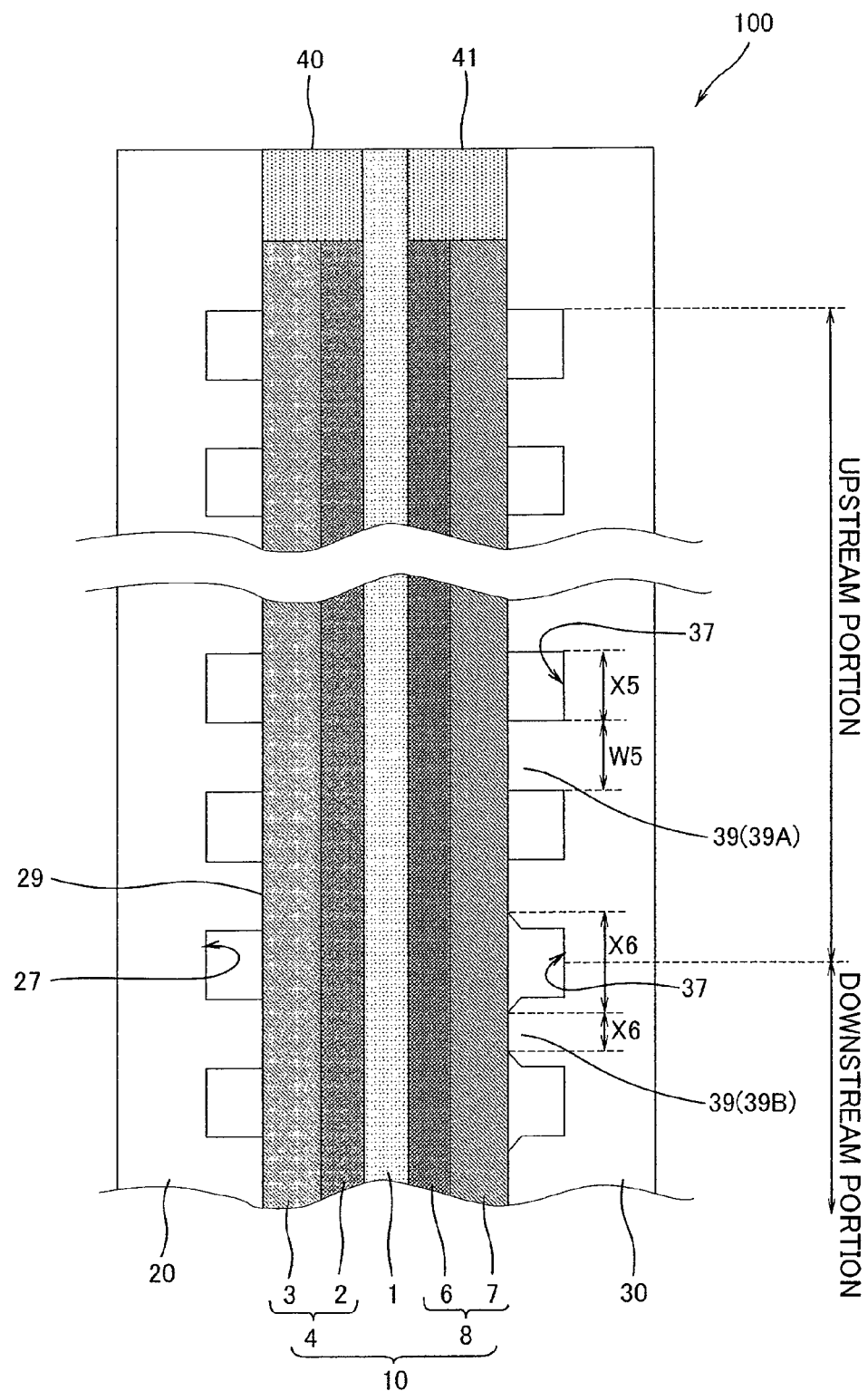
FIG. 12 is a partial cross-sectional view showing the configuration of the fuel cell of Embodiment 3 of the present invention.
Figure 15:
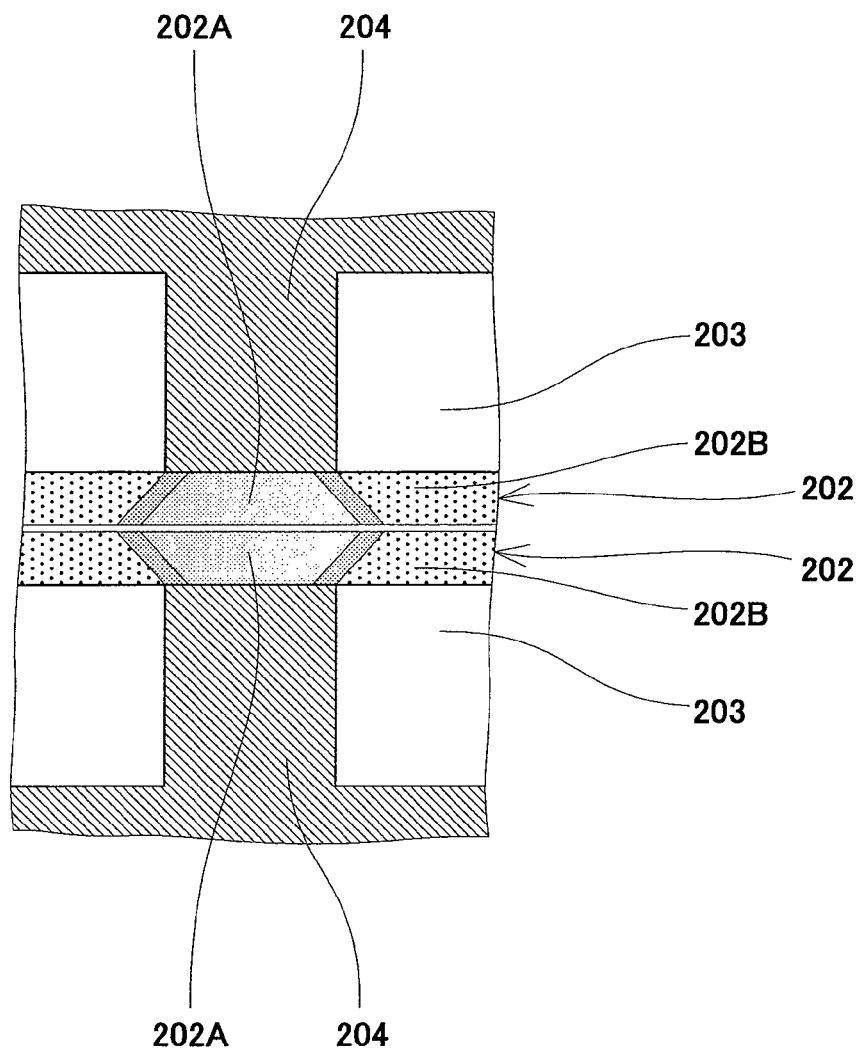
FIG. 15 is a schematic diagram showing the water content of the electrode during the operation of the fuel cell.

FIG. 12 is a partial cross-sectional view showing the configuration of the fuel cell of Embodiment 3 of the present invention. FIG. 13 are diagrams showing the configurations of both main surfaces of the cathode separator used in the fuel cell of FIG. 12. FIG. 13(a) is a plan view showing the main surface on which the oxidizing gas channel is formed. FIG. 13(b) is a plan view showing the main surface on which the cooling fluid channel is formed. In FIG. 12, the cooling fluid channel is not shown. Hereinafter, the fuel cell of the present embodiment will be explained in reference to FIGS. 12 and 13.

The configuration of the cathode separator 30 used in the fuel cell 100 of the present embodiment is different from that of Embodiment 1. To be specific, as shown in FIG. 12, in the cathode separator 30 constituting the fuel cell 100 of the present embodiment, the channel groove of the downstream portion 37B of the oxidizing gas channel 37 is formed such that a corner portion of an opening edge of the side wall thereof is linearly chamfered (cut). Thus, as shown in FIG. 13, in the oxidizing gas channel 37, the area per unit area of the rib portion 39A formed by the upstream portion 37A is larger than the area per unit area of the rib portion 39B formed by the downstream portion 37B. In other words, as shown in FIG. 12, a ratio $W_5/X_5$ that is a ratio of a width Ws of the rib portion 39A formed by the upstream portion 37A to a width $X_5$ of the oxidizing gas channel 37 is higher than a ratio $W_6/X_6$ that is a ratio of a width $W_6$ of the rib portion 39B formed by the downstream portion 37B to a width $X_6$ of the opening of the oxidizing gas channel 37. The other configuration of the cathode separator 30 used in the fuel cell 100 of the present embodiment is the same as the configuration of the cathode separator used in the fuel cell of Embodiment 1.

Even with this configuration, the contact area between the rib portion 39B formed by the downstream portion 37B of the oxidizing gas channel 37 and the cathode gas diffusion layer 7 becomes smaller than that in Comparative Example. Therefore, the fuel cell 100 of Embodiment 3 can obtain the same effects as the fuel cell of Embodiment 1.

Moreover, since the width of the opening of the downstream portion 37B of the oxidizing gas channel 37 is increased by chamfering the corner portion of the opening edge of the side wall, the cross-sectional area of the channel groove of the oxidizing gas channel 37 is not increased so much (see FIG. 12), so that the flow velocity of the oxidizing gas flowing through the oxidizing gas channel 37 does not decrease so much. With this, the occurrence of the flooding due to the decrease in the flow velocity can also be suppressed.

Embodiment 4

FIG. 14 are diagrams showing the configurations of both main surfaces of the cathode separator used in the fuel cell of Embodiment 4 of the present invention. FIG. 14(a) is a plan view showing the main surface on which the oxidizing gas channel is formed. FIG. 14(b) is a plan view showing the main surface on which the cooling fluid channel is formed. Hereinafter, the fuel cell of the present embodiment will be explained in reference to FIG. 14.

The configuration of the cathode separator 30 used in the fuel cell of the present embodiment is different from that in Embodiment 1. To be specific, as shown in FIG. 14, in the fuel cell of the present embodiment, the oxidizing gas channel 37 of the cathode separator 30 is constituted by a plurality of channel grooves. Herein, the number of channel grooves is three. Each of the channel grooves is formed to connect the oxidizing gas supplying manifold hole 33 and the oxidizing gas discharging manifold hole 34. Then, a meeting portion 51 where the channel grooves meet is formed at a portion of the oxidizing gas channel 37. The meeting portion 51 is formed at a connection portion where the upstream portion 37A and downstream portion 37B of the oxidizing gas channel 37 are connected to each other. In the present embodiment, the upstream portion 37A and downstream portion 37B of the oxidizing gas channel 37 are divided at a position of about 30% of the entire length of the oxidizing gas channel 37. The upstream portion 37A and the downstream portion 37B may be divided at a position of 30% to 70% of the entire length of the oxidizing gas channel 37. Moreover, the number of channels provided downstream of the meeting portion 51 may be reduced. The meeting portion 51 is constituted by a substantially triangular recess and a plurality of (six in the present embodiment) columnar projections 52 formed in the recess. The other configuration of the cathode separator 30 used in the fuel cell of the present embodiment is the same as the configuration of the cathode separator used in the fuel cell of Embodiment 1.

Even with this configuration, the fuel cell of Embodiment 4 can obtain the same effects as the fuel cell of Embodiment 1. Moreover, in the meeting portion 51, only the projections 52 and the cathode gas diffusion layer 7 contact each other, so that the contact area between the cathode separator 30 and the cathode gas diffusion layer 7 becomes small. With this, the temperature decrease is prevented at not only the downstream portion 37B of the oxidizing gas channel 37 but also the meeting portion 51.

Further, with this configuration, after the oxidizing gas is adequately mixed in the meeting portion 51, it flows from the upstream portion 37A to the downstream portion 37B in the oxidizing gas channel 37.

Needless to say, the fuel gas channel 27 of each of Modification Examples 1 and 2 of Embodiment 1 may be configured in the same manner as the oxidizing gas channel 37 of any one of Embodiments 2 to 4. Moreover, needless to say, the fuel gas channel 27 of each of Embodiments 1 to 4 may be configured in the same manner as the oxidizing gas channel 37 of any one of Embodiments 2 to 4.

Moreover, in the above embodiments, each of the oxidizing gas channel 37 and the fuel gas channel 27 is formed to have a serpentine shape or a serpentine shape including the meeting portion 51. However, the shape of each of the oxidizing gas channel 37 and the fuel gas channel 27 is not limited to this. Each of the oxidizing gas channel 37 and the fuel gas channel 27 may have any shape as long as each of the rib portions 39 and 29 is formed by being sandwiched between different portions of each of the oxidizing gas channel 37 and the fuel gas channel 27. For example, each of the oxidizing gas channel 37 and the fuel gas channel 27 may be constituted by a plurality of channel grooves extending in parallel with one another, or may be configured such that a plurality of minor channel grooves extending in parallel with one another connect a pair of major channel grooves.

Further, in the embodiments and Modification Examples, the oxidizing gas channel 37 is constituted by two portions that are the upstream portion 37A and the downstream portion 37B, and the fuel gas channel 27 is constituted by two portions that are the upstream portion 27A and the downstream portion 27B. However, each of the oxidizing gas channel 37 and the fuel gas channel 27 may have a midstream portion having an area which is intermediate between the area of the rib portion 39A, 29A per unit area of the upstream portion 37A, 27A and the area of the rib portion 39B, 29B per unit area of the downstream portion 37B, 27B. Moreover, the area of each of the rib portions 39 and 29 per unit area may be gradually changed (reduced) from the upstream portion 37A, 27A to the downstream portion 37B, 27B.

Embodiment 5

Configuration of Fuel Cell Stack

Figure 16:
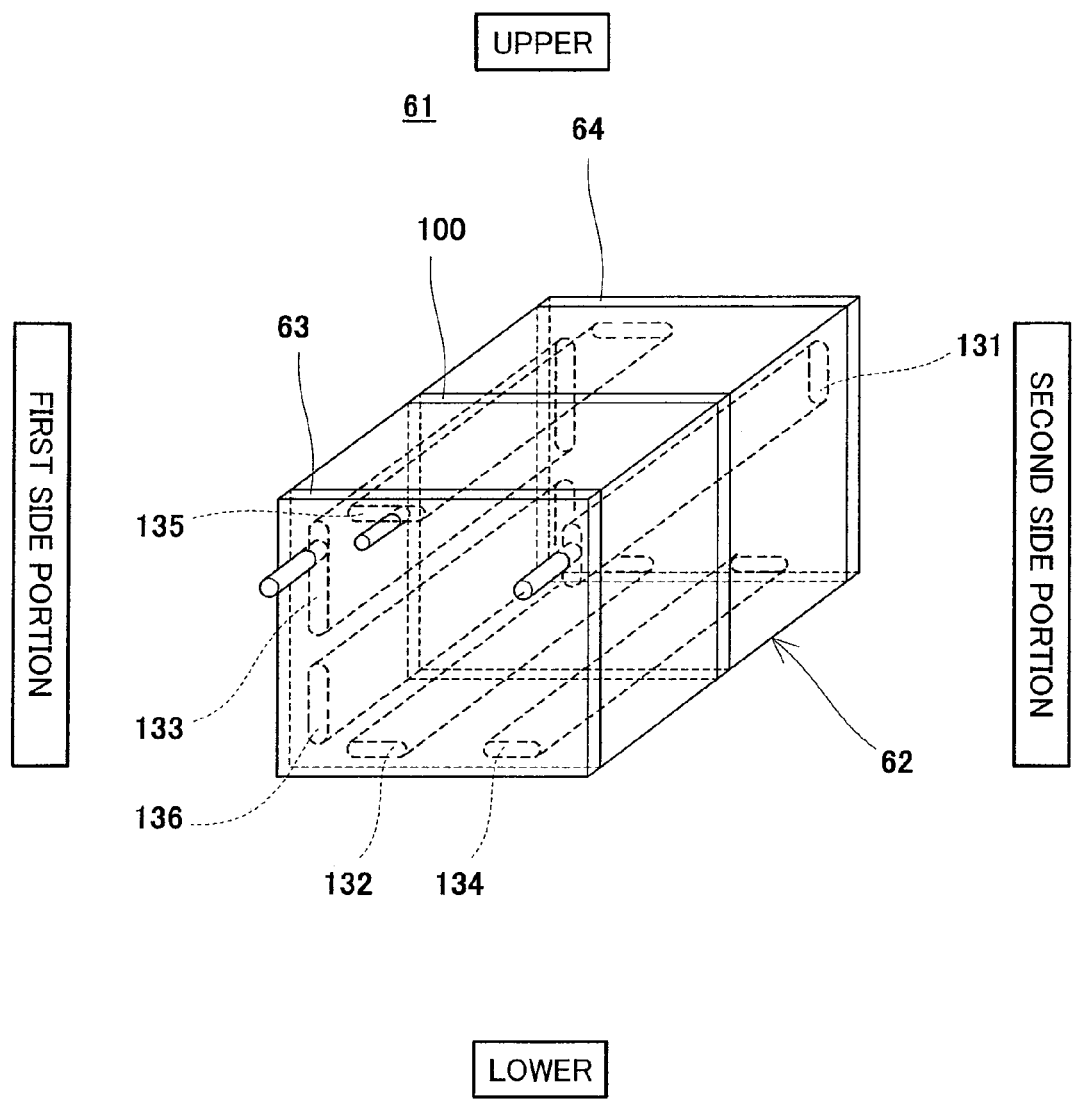
FIG. 16 is a perspective view schematically showing a schematic configuration of a fuel cell stack according to Embodiment 5 of the present invention.

FIG. 16 is a perspective view schematically showing a schematic configuration of a fuel cell stack according to Embodiment 5 of the present invention. In FIG. 16, a vertical direction of the fuel cell stack is shown as a vertical direction of the drawing.

As shown in FIG. 16, a fuel cell stack 61 according to Embodiment 5 of the present invention includes a cell stack body 62, first and second end plates 63 and 64, and fastening members, not shown. The cell stack body 62 is formed by stacking plate-shaped polymer electrolyte fuel cells (hereinafter simply referred to as "fuel cells") 100 in its thickness direction. The first and second end plates 63 and 64 are respectively disposed on both ends of the cell stack body 62. The fastening members fasten the cell stack body 62 and the first and second end plates 63 and 64 in a stack direction of the fuel cells 100. Although not shown, a current collector and an insulating plate are disposed on each of the first and second end plates 63 and 64. The plate-shaped fuel cell 100 extends in parallel with a vertical surface, and the stack direction of the fuel cells 100 is a horizontal direction.

An oxidizing gas supplying manifold hole 133 is formed at an upper portion of one side portion (side portion shown on the left side in the drawing; hereinafter referred to as "first side portion") of the cell stack body 62 so as to penetrate the cell stack body 62 in the stack direction of the fuel cells 100 of the cell stack body 62. A cooling fluid discharging manifold 136 is formed below the oxidizing gas supplying manifold 133. Moreover, a cooling fluid supplying manifold 135 is formed on an upper inner side of the oxidizing gas supplying manifold 133 of the first side portion of the cell stack body 62 so as to penetrate the cell stack body 62 in the stack direction of the fuel cells 100 of the cell stack body 62. Similarly, a fuel gas discharging manifold 132 is formed on a lower inner side of the cooling fluid discharging manifold 136 so as to penetrate the cell stack body 62 in the stack direction of the fuel cells 100 of the cell stack body 62. Further, a fuel gas supplying manifold 131 is formed at an upper portion of the other side portion (side portion shown on the right side in the drawing; hereinafter referred to as "second side portion") of the cell stack body 62 so as to penetrate the cell stack body 62 in the stack direction of the fuel cells 100 of the cell stack body 62. An oxidizing gas discharging manifold 134 is formed below the fuel gas supplying manifold 131 so as to penetrate the cell stack body 62 in the stack direction of the fuel cells 100 of the cell stack body 62.

Then, suitable pipes are provided for respective manifolds. With this, the fuel gas, the oxidizing gas, and the cooling fluid are supplied to and discharged from the fuel cell stack 61 through the suitable pipes.

Configuration of Polymer Electrolyte Fuel Cell

Next, the configuration of the polymer electrolyte fuel cell according to Embodiment 5 of the present invention will be explained in reference to FIG. 17.

Figure 17:
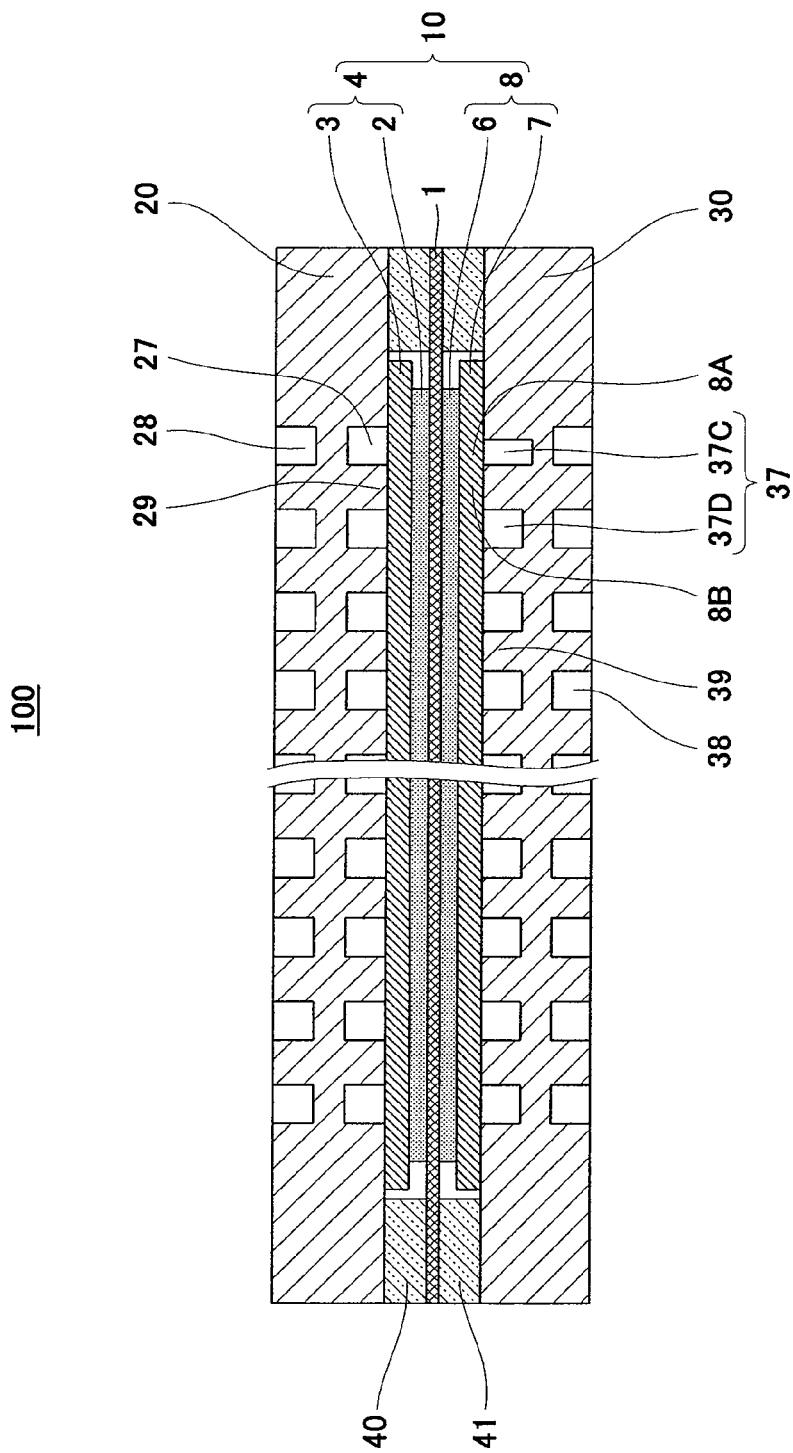
FIG. 17 is a cross-sectional view schematically showing a schematic configuration of the fuel cell in the fuel cell stack shown in FIG. 16.

FIG. 17 is a cross-sectional view schematically showing a schematic configuration of the fuel cell 100 of the fuel cell stack 61 shown in FIG. 16. In FIG. 17, a part of the fuel cell 100 is omitted.

As shown in FIG. 17, the polymer electrolyte fuel cell 100 according to Embodiment 5 includes the MEA (membrane-electrode assembly) 10, the gaskets 40 and 41, the anode separator (second separator) 20, and the cathode separator (first separator) 30.

The MEA 10 includes a polymer electrolyte membrane (for example, Nafion (Product Name) produced by DuPont in the U.S.) 1 which selectively transports hydrogen ions, the anode 4, and the cathode 8

The polymer electrolyte membrane 1 has a substantially quadrangular (herein, rectangular) shape. The anode 4 and the cathode 8 (each of which is referred to as "(gas diffusion) electrode") are respectively disposed on both surfaces of the polymer electrolyte membrane 1 so as to be located inwardly of a peripheral portion of the polymer electrolyte membrane 1. Below-described manifold holes (not shown), such as the fuel gas supplying manifold hole, are formed at the peripheral portion of the polymer electrolyte membrane 1 so as to penetrate the polymer electrolyte membrane 1 in the thickness direction.

The anode 4 is disposed on one of main surfaces of the polymer electrolyte membrane 1, and includes the anode catalyst layer 2 and the anode gas diffusion layer 3. The anode catalyst layer 2 is made of a mixture of electrically-conductive carbon particles supporting electrode catalyst (for example, a precious metal, such as platinum) and a polymer electrolyte having hydrogen ion conductivity. The anode gas diffusion layer 3 is disposed on one main surface of the anode catalyst layer 2, and has both gas permeability and electrical conductivity. Similarly, the cathode 8 is disposed on the other main surface of the polymer electrolyte membrane 1, and includes the cathode catalyst layer 6 and the cathode gas diffusion layer 7. The cathode catalyst layer 6 is made of a mixture of electrically-conductive carbon particles supporting electrode catalyst (for example, a precious metal, such as platinum) and a polymer electrolyte having hydrogen ion conductivity. The cathode gas diffusion layer 7 is disposed on one main surface of the cathode catalyst layer 6, and has both gas permeability and electrical conductivity.

The anode catalyst layer 2 and the cathode catalyst layer 6 can be formed by a method known in the art using catalyst layer forming ink containing electrically-conductive carbon particles supporting electrode catalyst made of a precious metal, a polymer electrolyte, and a dispersion medium. Moreover, a material constituting the anode gas diffusion layer 3 and the cathode gas diffusion layer 7 is not especially limited, and a material known in the art can be used. For example, electrically-conductive porous base materials, such as carbon cloth and carbon paper, can be used. Moreover, the electrically-conductive porous base material may be subjected to water repellent finish by a conventionally known method.

Moreover, a pair of ring-shaped, substantially rectangular, fluorocarbon-rubber gaskets 40 and 41 are respectively disposed around the anode 4 and cathode 8 of the MEA 10 so as to sandwich the polymer electrolyte membrane 1. With this, the leakage of the fuel gas, air, and the oxidizing gas to outside of the cell is suppressed, and the mixing of these gases in the fuel cell 100 is suppressed. Below-described manifold holes (not shown), such as the fuel gas supplying manifold hole, are formed at the peripheral portions of the gaskets 40 and 41 so as to penetrate the gaskets 40 and 41 in the thickness direction.

Moreover, the electrically-conductive, plate-shaped anode separator 20 and cathode separator 30 are disposed to sandwich the MEA 10 and the gaskets 40 and 41. With this, the MEA 10 is mechanically fixed. When a plurality of fuel cells 100 are stacked in the thickness direction, the MEAs 10 are electrically connected to one another. As the separators 20 and 30, a metal having excellent heat conductivity and electrical conductivity, a graphite, or a mixture of graphite and resin may be used. For example, a separator produced by injection molding using a mixture of carbon powder and binder (solvent) may be used, or a titanium plate whose surface is subjected to gold plating or a stainless steel plate whose surface is subjected to gold plating may be used.

The groove-like fuel gas channel (second reactant gas channel) 27 through which the fuel gas flows is formed on one main surface (hereinafter referred to as "inner surface") of the anode separator 20 which surface contacts the anode 4. Moreover, the groove-like cooling fluid channel 28 through which the cooling fluid flows is formed on the other main surface (hereinafter referred to as "outer surface") of the anode separator 20. Similarly, the groove-like oxidizing gas channel (first reactant gas channel) 37 through which the oxidizing gas flows is formed on one main surface (hereinafter referred to as "inner surface") of the cathode separator 30 which surface contacts the cathode 8. Moreover, the groove-like cooling fluid channel 38 through which the cooling fluid flows is formed on the other main surface (hereinafter referred to as "outer surface") of the cathode separator 30.

With this, the fuel gas and the oxidizing gas are respectively supplied to the anode 4 and the cathode 8, and these gases react with each other to generate electricity and heat. Moreover, the cooling fluid, such as the cooling water, is caused to flow through the cooling fluid channels 28 and 38 to recover the generated heat.

The fuel cell 100 configured as above may be used as a unit cell (cell), or a plurality of fuel cells 100 may be used as the fuel cell stack 61 by stacking the fuel cells 100. Moreover, in the case of stacking the fuel cells 100, the cooling fluid channels 28 and 38 may be formed for every two or three unit cells. Further, in the case of not forming the cooling fluid channels 28 and 38 between the unit cells, a separator which is sandwiched between two MEAs 10 and in which the fuel gas channel 27 is formed on one main surface thereof and the oxidizing gas channel 37 is formed on the other main surface thereof may be used as a separator serving as both the anode separator 20 and the cathode separator 30. Moreover, herein, the first separator is the cathode separator 30, the second separator is the anode separator 20, the first reactant gas channel is the oxidizing gas channel 37, and the second reactant gas channel is the fuel gas channel 27. However, the present embodiment is not limited to this. The first separator may be the anode separator 20, the second separator may be the cathode separator 30, the first reactant gas channel may be the fuel gas channel 27, and the second reactant gas channel may be the oxidizing gas channel 37.

Configuration of Separator

Next, the anode separator 20 and the cathode separator 30 will be explained in detail in reference to FIGS. 17 to 19.

Figure 18:
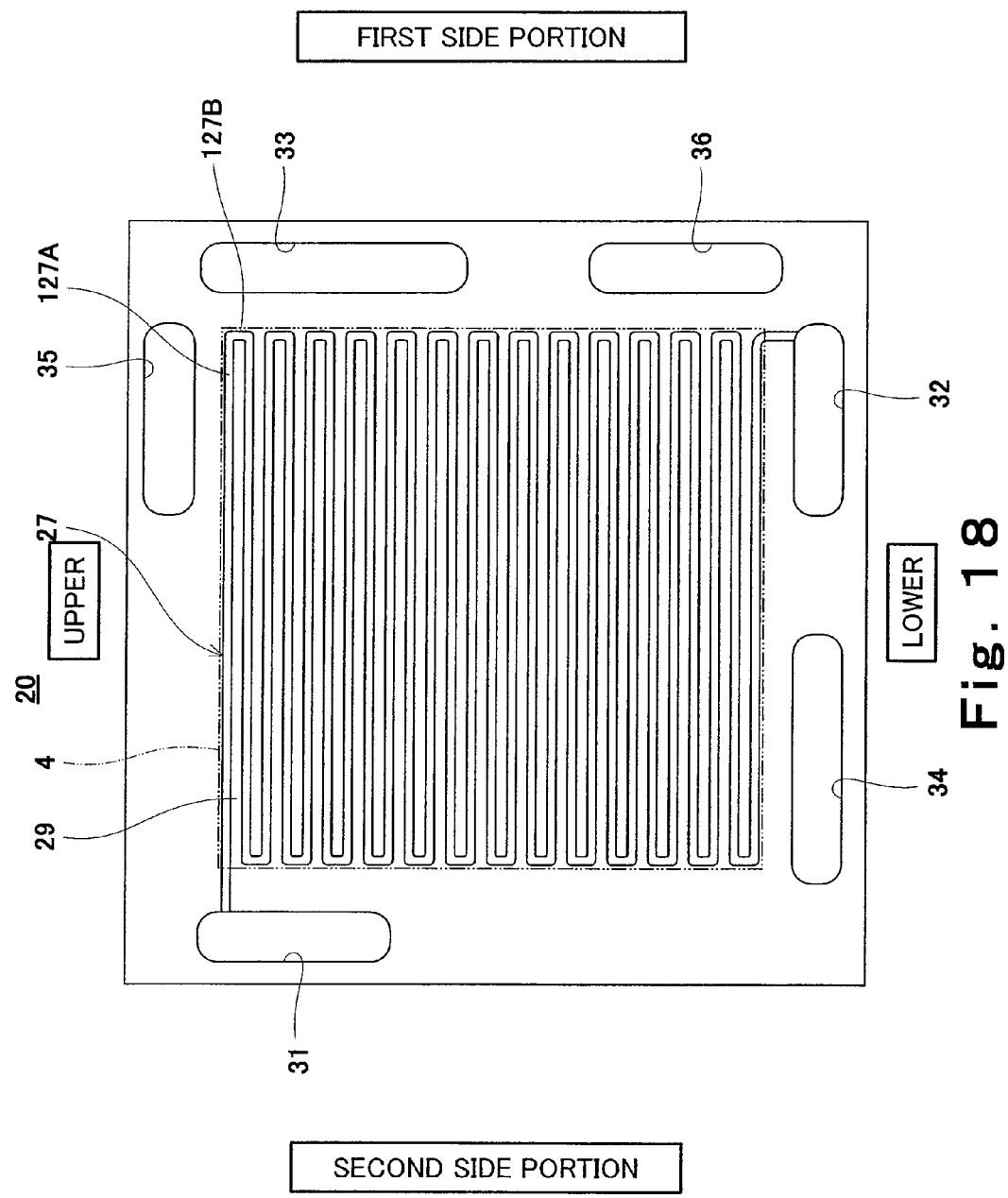
FIG. 18 is a schematic diagram showing a schematic configuration of the anode separator of the fuel cell shown in FIG. 17.

FIG. 18 is a schematic diagram showing a schematic configuration of the anode separator 20 of the fuel cell 100 shown in FIG. 17. FIG. 19 is a schematic diagram showing a schematic configuration of the cathode separator 30 of the fuel cell 100 shown in FIG. 17. In FIGS. 18 and 19, a vertical direction of each of the anode separator 20 and the cathode separator 30 is shown as a vertical direction of the drawing.

First, the configuration of the anode separator 20 will be explained in detail in reference to FIGS. 17 and 18.

As shown in FIG. 18, the anode separator 20 is formed to have a plate shape and a substantially quadrangular (herein, rectangular) shape. Respective manifold holes, such as the fuel gas supplying manifold hole 31, are formed at a peripheral portion of the anode separator 20 to penetrate the anode separator 20 in the thickness direction. Specifically, the oxidizing gas supplying manifold hole (first reactant gas supplying manifold hole) 33 is formed at an upper portion of one side portion (hereinafter referred to as "first side portion") of the anode separator 20, and the cooling fluid discharging manifold hole 36 is formed below the oxidizing gas supplying manifold hole 33. Moreover, the cooling fluid supplying manifold hole 35 is formed on an upper inner side of the oxidizing gas supplying manifold hole 33 of the first side portion. Similarly, the fuel gas discharging manifold hole 32 is formed on a lower inner side of the cooling fluid discharging manifold hole 36. Further, the fuel gas supplying manifold hole (second reactant gas supplying manifold hole) 31 is formed at an upper portion of the other side portion (hereinafter referred to as "second side portion") of the anode separator 20, and the oxidizing gas discharging manifold hole 34 is formed below the fuel gas supplying manifold hole 31.

The fuel gas supplying manifold hole 31 and the oxidizing gas supplying manifold hole 33 are formed to sandwich a central portion of the anode separator 20 and be opposed to each other. Here, the central portion of the anode separator 20 denotes a center portion with respect to an outer peripheral portion of the anode separator 20.

Then, as shown in FIG. 18, the groove-like fuel gas channel 27 is formed in a serpentine shape on the inner surface of the anode separator 20 so as to connect the fuel gas supplying manifold hole 31 and the fuel gas discharging manifold hole 32. Herein, the fuel gas channel 27 is constituted by one groove, and this groove is essentially constituted by reciprocating portions 127A and inverting portions 127B.

Specifically, the groove constituting the fuel gas channel 27 extends in the horizontal direction from the fuel gas supplying manifold hole 31 toward the first side portion by a certain distance, extends downward therefrom by a certain distance, extends therefrom in the horizontal direction toward the second side portion by a certain distance, and extends downward therefrom by a certain distance. This pattern is repeated twelve times, and the groove further extends therefrom in the horizontal direction toward the first side portion by a certain distance, and extends downward therefrom to reach the fuel gas discharging manifold hole 32. Thus, portions of the fuel gas channel 27 which portions extend in the horizontal direction constitute the reciprocating portions 127A, and portions of the fuel gas channel 27 which portions extend downward constitute the inverting portions 127B.

As shown in FIGS. 17 and 18, a portion between the grooves constituting the fuel gas channel 27 forms the rib portion 29 contacting the anode 4.

Next, the configuration of the cathode separator 30 will be explained in detail in reference to FIGS. 17 and 19.

Figure 19:
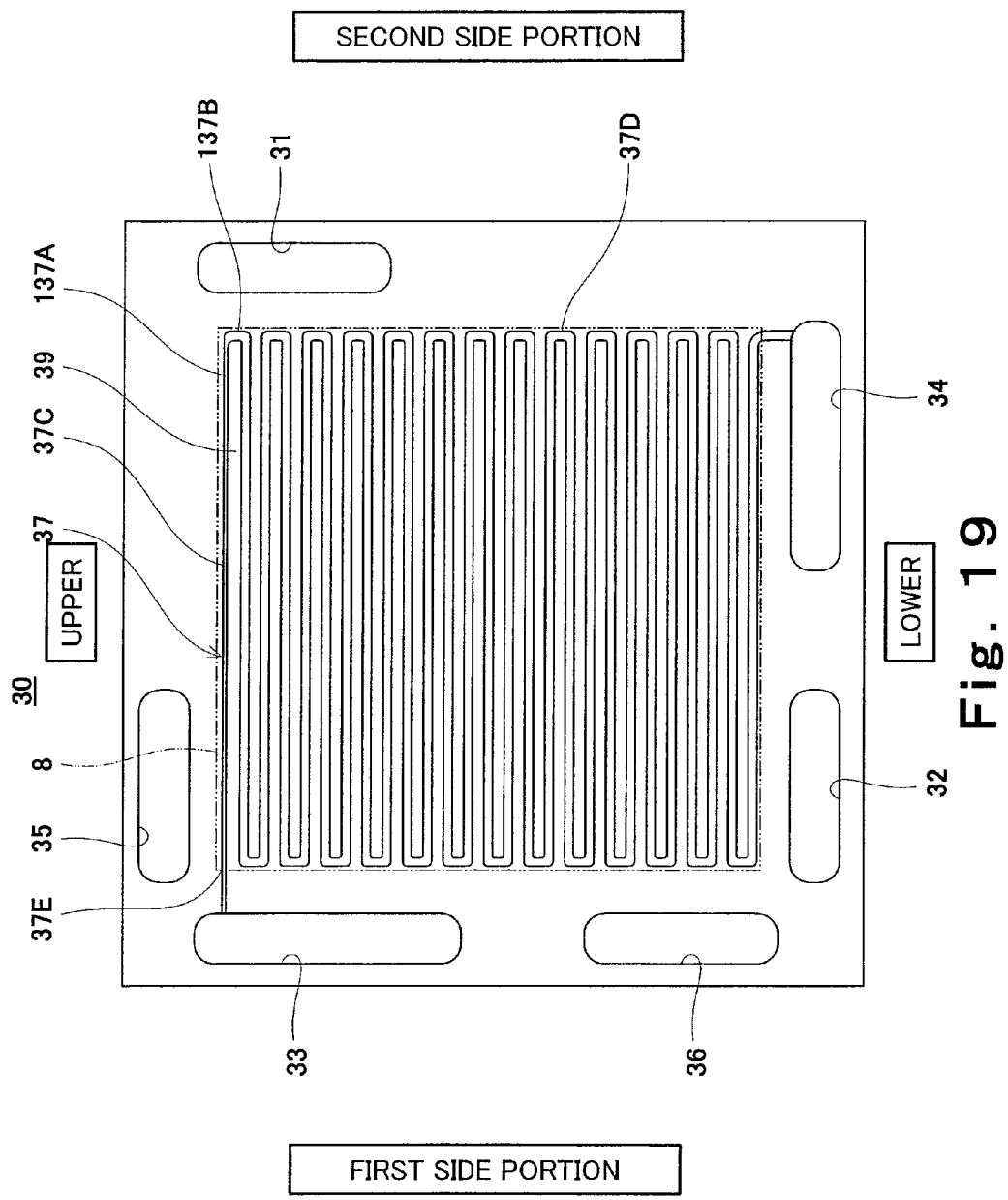
FIG. 19 is a schematic diagram showing a schematic configuration of the cathode separator of the fuel cell shown in FIG. 17.

As shown in FIG. 19, the cathode separator 30 is formed to have a plate shape and a substantially quadrangular (herein, rectangular) shape. Respective manifold holes, such as the fuel gas supplying manifold hole 31, are formed at a peripheral portion of the cathode separator 30 to penetrate the cathode separator 30 in the thickness direction. The arrangement of the manifold holes of the cathode separator 30 is the same as that of the anode separator 20, so that a detailed explanation thereof is omitted.

As shown in FIG. 19, the groove-like oxidizing gas channel 37 is formed in a serpentine shape on the inner surface of the cathode separator 30 so as to connect the oxidizing gas supplying manifold hole 33 and the oxidizing gas discharging manifold hole 34. The oxidizing gas channel 37 and the fuel gas channel 27 are configured to form so-called parallel flow. Here, the parallel flow will be explained in reference to FIG. 20.

Figure 20:
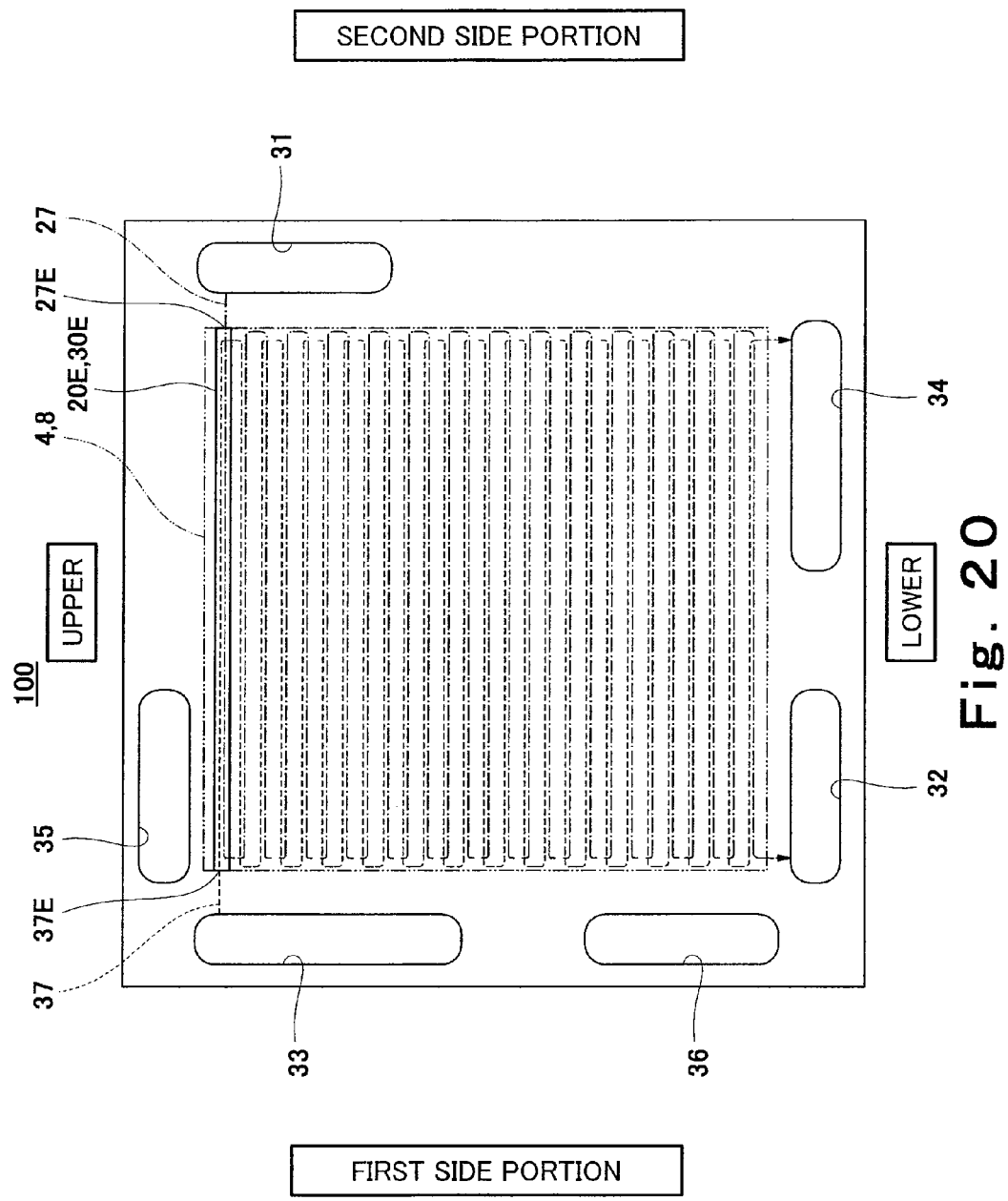
FIG. 20 is a schematic diagram showing the configurations of the anode separator and cathode separator of the fuel cell shown in FIG. 17.

FIG. 20 is a schematic diagram showing the configurations of the anode separator 20 and cathode separator 30 of the fuel cell 100 shown in FIG. 17. FIG. 20 transparently shows the anode separator 20 and the cathode separator 30 when viewed from the thickness direction of the fuel cell 100. Moreover, in FIG. 20, each of the groove of the fuel gas channel 27 of the anode separator 20 and the groove of the oxidizing gas channel 37 of the cathode separator 30 is typically shown by a single line, and a vertical direction of each of the separators 20 and 30 is shown as a vertical direction of the drawing. Further, in FIG. 20, the positions of the fuel gas channel 27 and the oxidizing gas channel 37 are displaced each other in the vertical direction to facilitate visualization of these channels 27 and 37.

As shown in FIG. 20, the fuel gas channel 27 and the oxidizing gas channel 37 partially have a portion where the oxidizing gas and the fuel gas flow in opposite directions. However, a configuration in which the overall flow direction of the oxidizing gas flowing from upstream to downstream and the overall flow direction of the fuel gas flowing from upstream to downstream macroscopically (wholly) coincide with each other when viewed from the thickness direction of the fuel cell 100 is called "parallel flow".

Moreover, as shown in FIG. 19, the oxidizing gas channel 37 is constituted by a single groove, and the groove is essentially constituted by reciprocating portions 137C and inverting portions 137B. Specifically, the groove constituting the oxidizing gas channel 37 extends in the horizontal direction from the oxidizing gas supplying manifold hole 33 toward the second side portion by a certain distance, extends downward therefrom by a certain distance, extends therefrom in the horizontal direction toward the first side portion by a certain distance, and extends downward therefrom by a certain distance. This pattern is repeated thirteen times, and the groove further extends in the horizontal direction toward the second side portion by a certain distance, and extends downward therefrom to reach the oxidizing gas discharging manifold hole 34. Thus, portions of the oxidizing gas channel 37 which portions extend in the horizontal direction constitute the reciprocating portions 137C, and portions of the oxidizing gas channel 37 which portions extend downward constitute the inverting portions 137B. A portion between the grooves constituting the oxidizing gas channel 37 forms the rib portion 39 contacting the cathode 8.

Further, as shown in FIGS. 17, 19, and 20, the oxidizing gas channel 37 includes an uppermost stream portion 37C and a downstream portion 37D. The uppermost stream portion 37C is constituted by a channel formed at an uppermost stream portion 30E of the cathode separator 30. The uppermost stream portion 30E is located between a portion 37E and a portion 27E when viewed from the thickness direction of the cathode separator 30. The portion 37E is a portion where the oxidizing gas channel 37 extending from its upstream end first contacts the cathode 8. The portion 27E is a portion where the fuel gas channel 27 extending from its upstream end first contacts the anode 4. In other words, the uppermost stream portion 37C is a portion extending from the portion 37E of the oxidizing gas channel 37 to a portion where the oxidizing gas channel 37 overlapping the fuel gas channel 27 first separates from the fuel gas channel 27. Herein, the uppermost stream portion 37C is a portion extending from the portion 37E of the oxidizing gas channel 37 to a point where the oxidizing gas channel 37 extending toward the second side portion in the horizontal direction has reached (to be specific, a portion extending from the portion 37E of the oxidizing gas channel 37 to a downstream end of the first reciprocating portion 137A). Moreover, the downstream portion 37D is a portion provided downstream of the uppermost stream portion 37C of the oxidizing gas channel 37.

Then, the width of the entire uppermost stream portion 37C is constant, the width of the entire downstream portion 37D is also constant, and the width of the entire uppermost stream portion 37C is smaller than the width of the downstream portion 37D. Moreover, the depth of the uppermost stream portion 37C is larger than the depth of the downstream portion 37D, and the cross-sectional area (hereinafter simply referred to as "channel cross-sectional area") of the groove of the uppermost stream portion 37C in a direction perpendicular to the flow of the oxidizing gas is substantially the same as the channel cross-sectional area of the downstream portion 37D. With this, the pressure loss in the uppermost stream portion 37C of the oxidizing gas channel 37 and the pressure loss in the downstream portion 37D of the oxidizing gas channel 37 become the same as each other, so that the flow rate of the oxidizing gas flowing through the uppermost stream portion 37C and the flow rate of the oxidizing gas flowing through the downstream portion 37D become essentially the same as each other.

Herein, the width of the portion extending from the upstream end of the oxidizing gas channel 37 to the portion 37E is set to be the same as the width of the uppermost stream portion 37C. However, the present invention is not limited to this, and the width of the portion extending from the upstream end of the oxidizing gas channel 37 to the portion 37E may be set to be the same as the width of the downstream portion 37D or may be set to be different from the width of the uppermost stream portion 37C or the downstream portion 37D.

Next, operational advantages of the polymer electrolyte fuel cell 100 according to Embodiment 5 will be explained in reference to FIGS. 17 to 20.

Operational Advantages of Polymer Electrolyte Fuel Cell

As described above, the water content of a portion of the cathode 8 which portion faces the oxidizing gas channel 37 becomes lower than the water content of a portion of the cathode 8 which portion contacts the rib portion 39. Especially when the fuel cell 100 is driven at high temperature and low humidity, the water content of a portion 8A of the cathode 8 which portion faces the uppermost stream portion 37C of the oxidizing gas channel 37 is low. On this account, a portion of the polymer electrolyte membrane 1 (hereinafter referred to as "uppermost stream portion of the polymer electrolyte membrane 1") which portion is opposed to the uppermost stream portion 37C of the oxidizing gas channel 37 tends to dry, so that the polymer electrolyte membrane 1 may deteriorate.

However, in the fuel cell 100 according to Embodiment 5, since the width of the uppermost stream portion 37C of the oxidizing gas channel 37 is smaller than the width of the downstream portion 37D of the oxidizing gas channel 37, the portion 8A whose water content is low is small in size. On this account, the drying of the uppermost stream portion of the polymer electrolyte membrane 1 can be suppressed, so that the deterioration of the polymer electrolyte membrane 1 can be suppressed.

Meanwhile, since the width of the downstream portion 37D of the oxidizing gas channel 37 is larger than the width of the uppermost stream portion 37C of the oxidizing gas channel 37, the water content of a portion of the cathode 8 which portion faces the downstream portion 37D becomes low. With this, especially when the fuel cell 100 according to Embodiment 5 is driven at high temperature and high humidity, the flooding of the portion of the cathode 8 which portion faces the downstream portion 37D can be suppressed.

Moreover, in the fuel cell 100 according to Embodiment 5, since the cross-sectional area of the uppermost stream portion 37C of the oxidizing gas channel 37 is substantially the same as the cross-sectional area of the downstream portion 37D of the oxidizing gas channel 37, the pressure loss in the uppermost stream portion 37C of the oxidizing gas channel 37 and the pressure loss in the downstream portion 37D of the oxidizing gas channel 37 become the same as each other. On this account, the flow rate of the oxidizing gas flowing through the uppermost stream portion 37C of the oxidizing gas channel 37 and the flow rate of the oxidizing gas flowing through the downstream portion 37D of the oxidizing gas channel 37 can be set to be essentially the same as each other.

Embodiment 6

Figure 21:
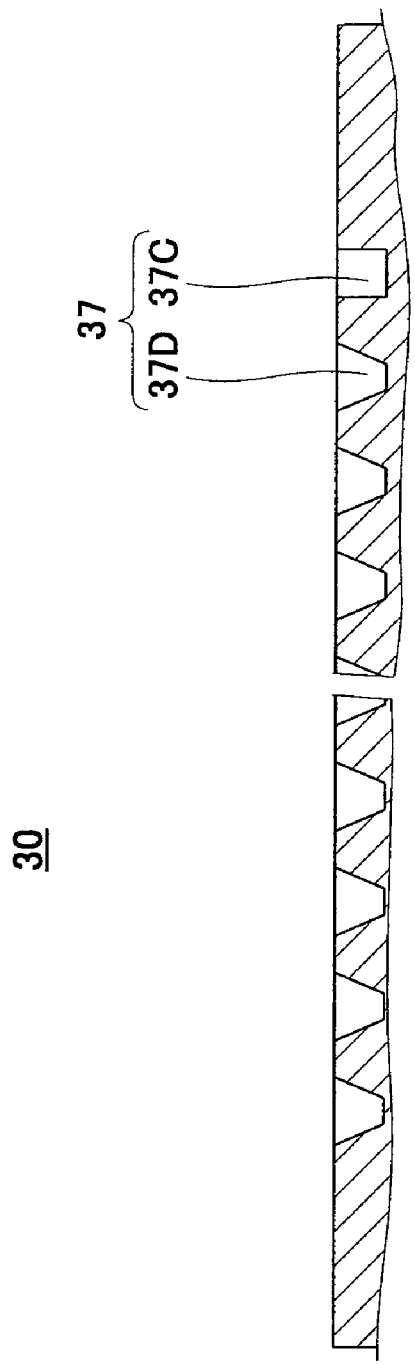
FIG. 21 is a cross-sectional view schematically showing a schematic configuration of the cathode separator of the fuel cell according to Embodiment 6 of the present invention.

FIG. 21 is a cross-sectional view schematically showing a schematic configuration of the cathode separator of the fuel cell according to Embodiment 6 of the present invention. In FIG. 21, a part of the cathode separator is omitted.

As shown in FIG. 21, the fuel cell according to Embodiment 6 of the present invention is the same in basic configuration as the fuel cell 100 according to Embodiment 5, but the configuration of the oxidizing gas channel 37 of the cathode separator 30 is different as below.

To be specific, the downstream portion 37D of the oxidizing gas channel 37 of the cathode separator 30 of the fuel cell according to Embodiment 6 is formed such that the cross section thereof in a direction perpendicular to the flow of the oxidizing gas has a substantially trapezoidal shape, and an opening area thereof is larger than the opening area of the uppermost stream portion 37C. With this, the cross-sectional area of the channel of the uppermost stream portion 37C and the cross-sectional area of the channel of the downstream portion 37D can be set to be essentially the same as each other without setting the depth of the uppermost stream portion 37C to be larger than the depth of the downstream portion 37D. The cross-sectional area of the uppermost stream portion 37C and the cross-sectional area of the downstream portion 37D being essentially the same as each other denotes that the pressure loss of the oxidizing gas flowing through the uppermost stream portion 37C and the pressure loss of the oxidizing gas flowing through the downstream portion 37D are essentially the same as each other.

Even with this configuration, the fuel cell according to Embodiment 6 obtains the same operational advantages as the fuel cell 100 according to Embodiment 5.

Embodiment 7

Figure 22:
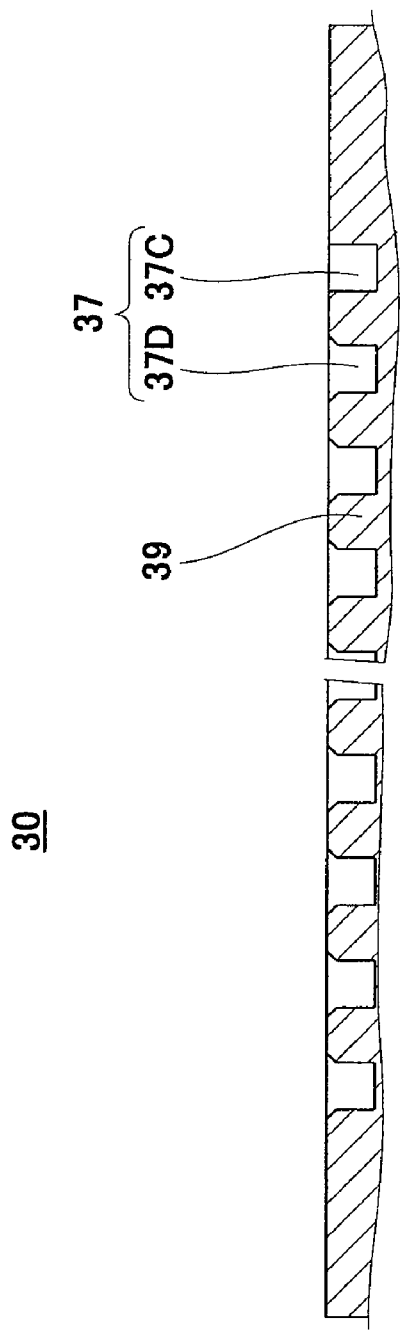
FIG. 22 is a cross-sectional view schematically showing a schematic configuration of the cathode separator of the fuel cell according to Embodiment 7 of the present invention.

FIG. 22 is a cross-sectional view schematically showing a schematic configuration of the cathode separator of the fuel cell according to Embodiment 7 of the present invention. In FIG. 22, a part of the cathode separator is omitted.

As shown in FIG. 22, the fuel cell according to Embodiment 7 of the present invention is the same in basic configuration as the fuel cell 100 according to Embodiment 5, but the configuration of the oxidizing gas channel 37 of the cathode separator 30 is different as below.

To be specific, the downstream portion 37D of the oxidizing gas channel 37 of the cathode separator 30 of the fuel cell according to Embodiment 7 is formed such that a peripheral surface of the groove thereof has a step shape so as to spread outward, and the opening area thereof is larger than the opening area of the uppermost stream portion 37C. In other words, the edge portion of the rib portion 39 formed by the downstream portion 37D is chamfered.

With this, the cross-sectional area of the uppermost stream portion 37C and the cross-sectional area of the downstream portion 37D can be set to be essentially the same as each other without setting the depth of the uppermost stream portion 37C to be larger than the depth of the downstream portion 37D.

Even with this configuration, the fuel cell according to Embodiment 7 obtains the same operational advantages as the fuel cell 100 according to Embodiment 5.

Embodiment 8

Figure 23:
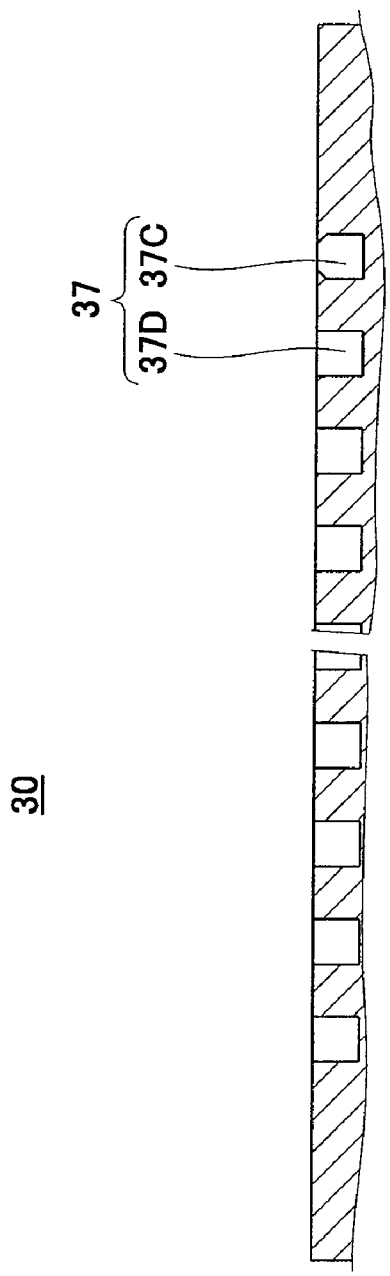
FIG. 23 is a cross-sectional view schematically showing a schematic configuration of the cathode separator of the fuel cell according to Embodiment 8 of the present invention.

FIG. 23 is a cross-sectional view schematically showing a schematic configuration of the cathode separator of the fuel cell according to Embodiment 8 of the present invention. In FIG. 23, a part of the cathode separator is omitted.

As shown in FIG. 23, the fuel cell according to Embodiment 8 of the present invention is the same in basic configuration as the fuel cell 100 according to Embodiment 5, but the configuration of the oxidizing gas channel 37 of the cathode separator 30 is different as below.

To be specific, the uppermost stream portion 37C of the oxidizing gas channel 37 of the cathode separator 30 of the fuel cell according to Embodiment 8 is formed such that a peripheral surface of the groove thereof has a step shape, an opening portion of the groove thereof concaves inwardly, and the opening area thereof is larger than the opening area of the downstream portion 37D. With this, the cross-sectional area of the uppermost stream portion 37C and the cross-sectional area of the downstream portion 37D can be set to be essentially the same as each other without setting the depth of the uppermost stream portion 37C to be larger than the depth of the downstream portion 37D.

Even with this configuration, the fuel cell according to Embodiment 8 obtains the same operational advantages as the fuel cell 100 according to Embodiment 5.

Embodiment 9

Figure 24:
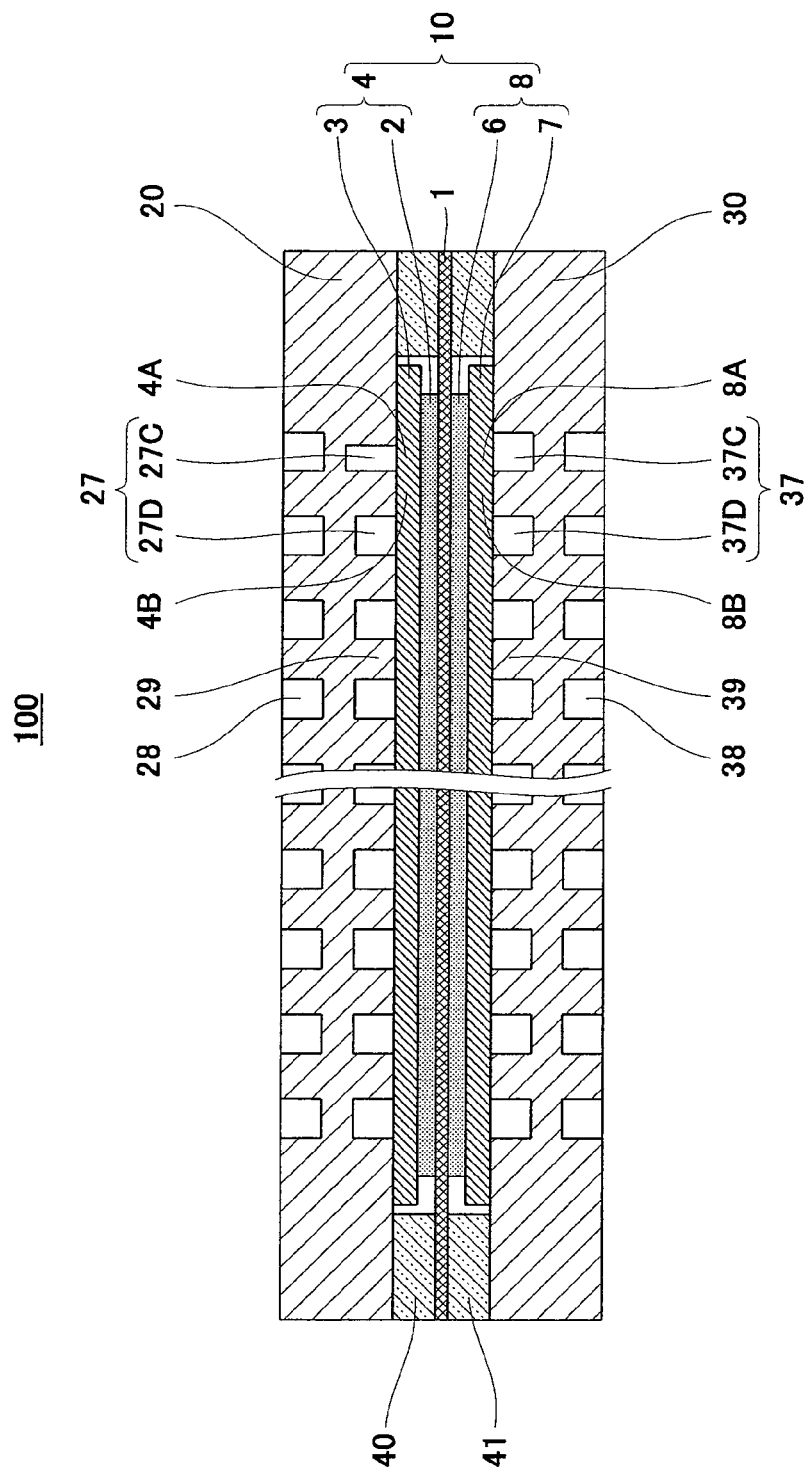
FIG. 24 is a cross-sectional view schematically showing a schematic configuration of the fuel cell according to Embodiment 9 of the present invention.
Figure 25:
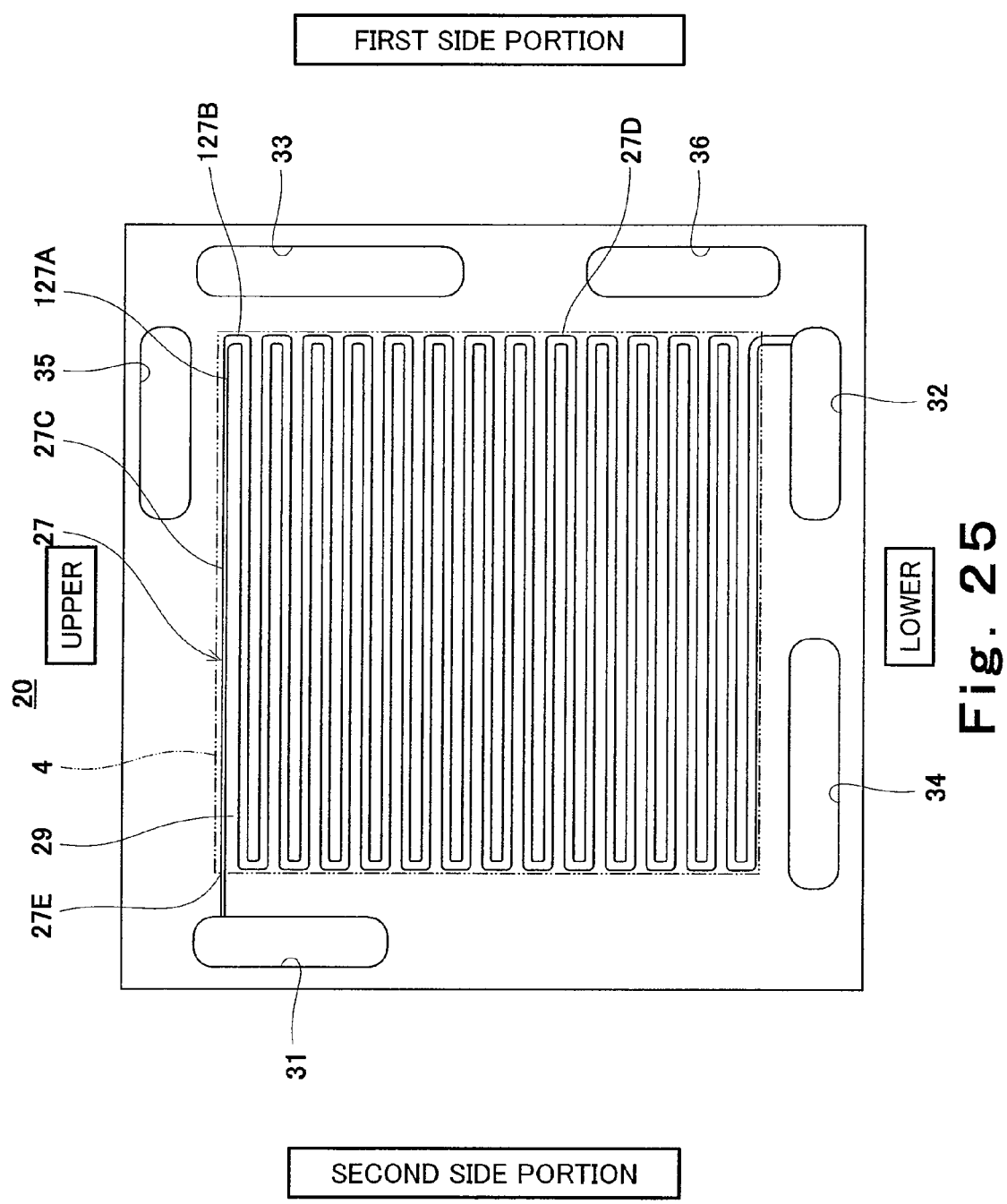
FIG. 25 is a schematic diagram showing a schematic configuration of the anode separator of the fuel cell shown in FIG. 24.

FIG. 24 is a cross-sectional view schematically showing a schematic configuration of the fuel cell according to Embodiment 9 of the present invention. FIG. 25 is a schematic diagram showing a schematic configuration of the anode separator of the fuel cell shown in FIG. 24. In FIG. 24, a part of the fuel cell is omitted. In FIG. 25, a vertical direction of the anode separator is shown as a vertical direction of the drawing.

As shown in FIGS. 24 and 25, the fuel cell 100 according to Embodiment 9 and the fuel cell 100 according to Embodiment 5 are the same in basic configuration as each other, but are different from each other in that the width of the uppermost stream portion 37C of the oxidizing gas channel 37 of the cathode separator 30 and the width of the downstream portion 37D of the oxidizing gas channel 37 of the cathode separator 30 are substantially the same as each other, and the depth of the uppermost stream portion 37C and the depth of the downstream portion 37D are substantially the same as each other. In addition, the configuration of the fuel gas channel 27 of the anode separator 20 is different.

Specifically, as shown in FIG. 25, the fuel gas channel 27 includes an uppermost stream portion 27C and a downstream portion 27D. The uppermost stream portion 27C is constituted by a channel formed at an uppermost stream portion 20E (see FIG. 20) of the anode separator 20. The uppermost stream portion 20E (see FIG. 20) of the anode separator 20 is located between the portion 27E and the portion 37E when viewed from the thickness direction of the anode separator 20. The portion 27E is a portion where the fuel gas channel 27 extending from its upstream end first contacts the anode 4. The portion 37E is a portion where the oxidizing gas channel 37 extending from its upstream end first contacts the cathode 8. In other words, the uppermost stream portion 27C is a portion extending from the portion 27E of the fuel gas channel 27 to a portion where the fuel gas channel 27 overlapping the oxidizing gas channel 37 first separates from the oxidizing gas channel 37. Herein, the uppermost stream portion 27C is a portion extending from the upstream end of the fuel gas channel 27 to a portion where the fuel gas channel 27 extending toward the second side portion in the horizontal direction has reached (to be specific, a portion extending from the portion 27E of the fuel gas channel 27 to a downstream end of the first reciprocating portion 127A). Moreover, the downstream portion (remaining portion) 27D is a portion provided downstream of the uppermost stream portion 27C of the fuel gas channel 27.

Then, the width of the entire uppermost stream portion 27C is constant, the width of the entire downstream portion 27D is also constant, and the width of the uppermost stream portion 27C is smaller than the width of the downstream portion 27D. Moreover, the depth of the uppermost stream portion 27C is larger than the depth of the downstream portion 27D, and the cross-sectional area (hereinafter simply referred to as "channel cross-sectional area") of the groove of the uppermost stream portion 27C in the direction perpendicular to the flow of the fuel gas is substantially the same as the channel cross-sectional area of the downstream portion 27D. With this, the pressure loss in the uppermost stream portion 27C of the fuel gas channel 27 and the pressure loss in the downstream portion 27D of the fuel gas channel 27 become the same as each other, so that the flow rate of the fuel gas flowing through the uppermost stream portion 27C and the flow rate of the fuel gas flowing through the downstream portion 27D become essentially the same as each other.

In the fuel cell 100 according to Embodiment 9 configured as above, since the width of the uppermost stream portion 27C of the fuel gas channel 27 is narrower than the width of the downstream portion 27D of the fuel gas channel 27, a portion 4A, whose water content is low, of the anode 4 is small in size. On this account, the drying of a portion of the polymer electrolyte membrane 1 which portion is opposed to the uppermost stream portion 27C of the fuel gas channel 27 can be suppressed, so that the deterioration of the polymer electrolyte membrane 1 can be suppressed.

Meanwhile, since the width of the downstream portion 27D of the fuel gas channel 27 is larger than the width of the uppermost stream portion 27C of the fuel gas channel 27, the water content of a portion of the anode 4 which portion faces the downstream portion 27D becomes low. With this, especially when the fuel cell 100 according to Embodiment 9 is driven at high temperature and high humidity, the flooding of the portion of the anode 4 which portion faces the downstream portion 27D can be suppressed.

Moreover, in the fuel cell 100 according to Embodiment 9, since the cross-sectional area of the uppermost stream portion 27C of the fuel gas channel 27 is substantially the same as the cross-sectional area of the downstream portion 27D of the fuel gas channel 27, the pressure loss in the uppermost stream portion 27C of the fuel gas channel 27 and the pressure loss in the downstream portion 27D of the fuel gas channel 27 become the same as each other. On this account, the flow rate of the fuel gas flowing through the uppermost stream portion 27C of the fuel gas channel 27 and the flow rate of the fuel gas flowing through the downstream portion 27D of the fuel gas channel 27 can be set to be essentially the same as each other.

The fuel gas channel 27 may be formed in the same shape as the oxidizing gas channel 37 of Embodiments 6 to 8.

Embodiment 10

Figure 26:
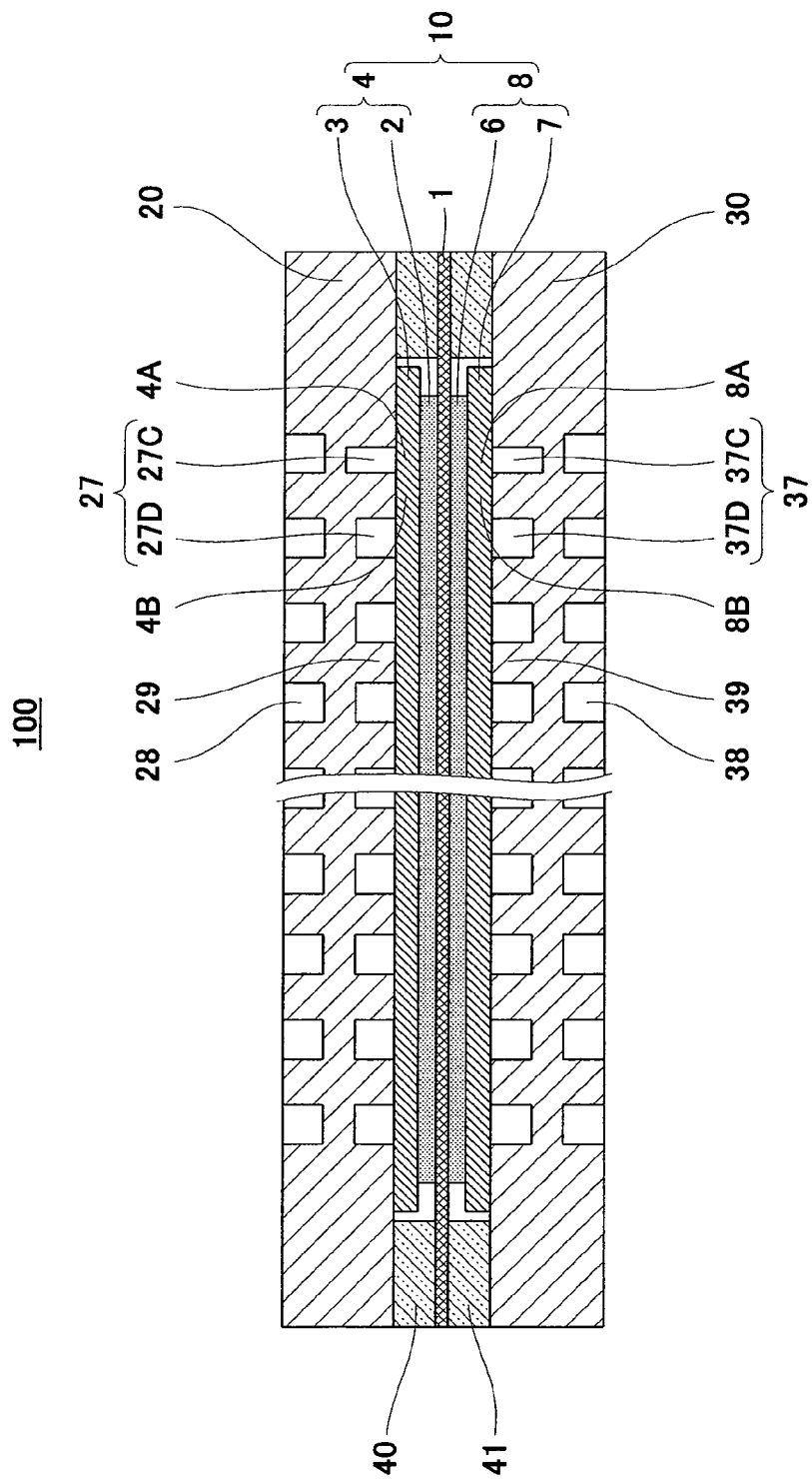
FIG. 26 is a cross-sectional view schematically showing a schematic configuration of the fuel cell according to Embodiment 10 of the present invention.

FIG. 26 is a cross-sectional view schematically showing a schematic configuration of the fuel cell according to Embodiment 10 of the present invention. In FIG. 26, a part of the fuel cell is omitted.

As shown in FIG. 26, the fuel cell 100 according to Embodiment 10 of the present invention and the fuel cell 100 according to Embodiment 5 are the same in basic configuration as each other, but are different from each other in that the fuel gas channel 27 of the anode separator 20 is configured in the same manner as the fuel gas channel 27 of the anode separator 20 of the fuel cell 100 according to Embodiment 9.

With this configuration, the fuel cell 100 according to Embodiment 10 of the present invention obtains the same operational advantages as the fuel cell 100 according to Embodiment 5 and obtains the same operational advantages as the fuel cell 100 according to Embodiment 9.

Embodiment 11

Figure 27:
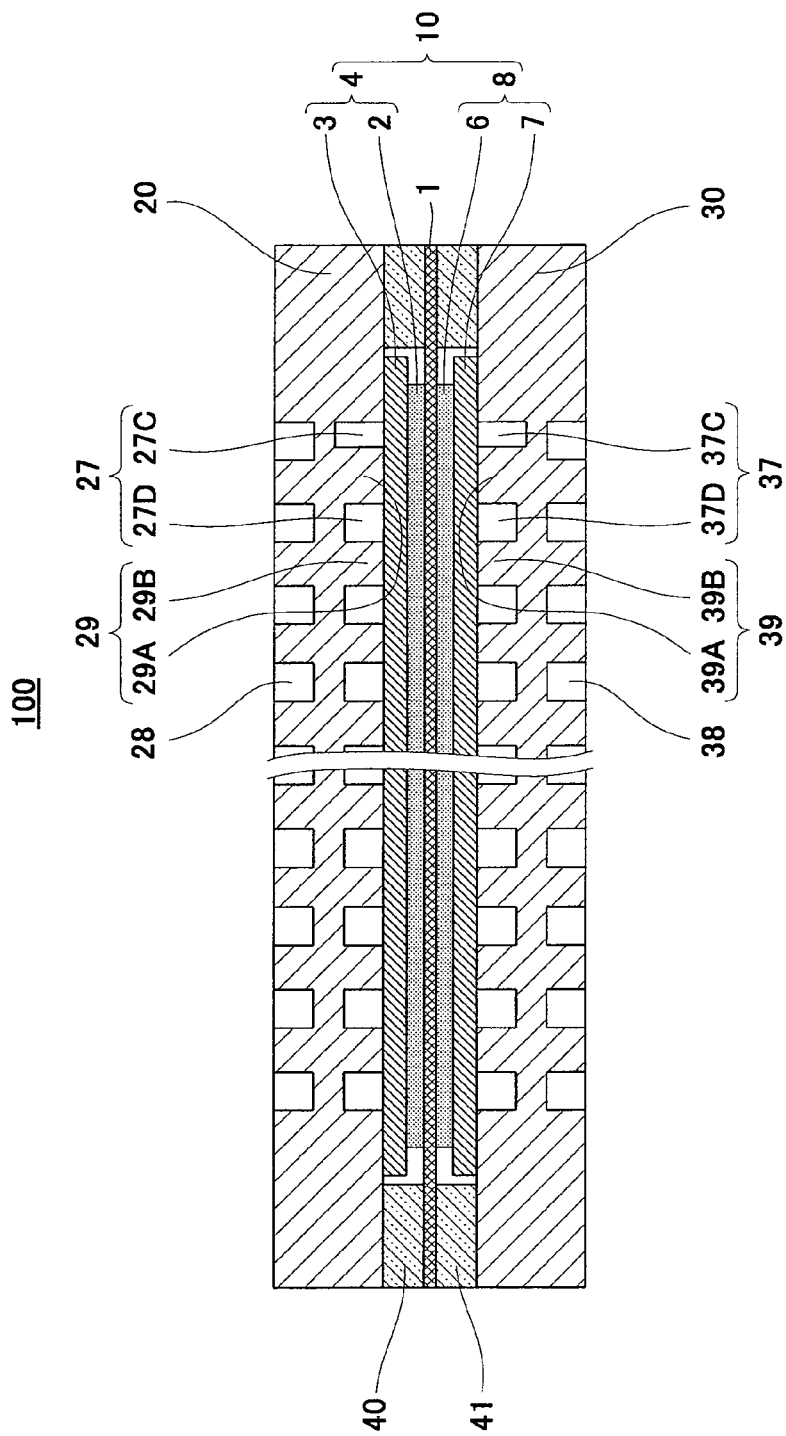
FIG. 27 is a cross-sectional view schematically showing a schematic configuration of the fuel cell according to Embodiment 11 of the present invention.

FIG. 27 is a cross-sectional view schematically showing a schematic configuration of the fuel cell according to Embodiment 11 of the present invention. In FIG. 27, a part of the fuel cell is omitted.

As shown in FIG. 27, the fuel cell 100 according to Embodiment 11 of the present invention is the same in basic configuration as the fuel cell 100 according to Embodiment 10, but the rib portion 37 formed by the oxidizing gas channel 37 and the rib portion 27 formed by the fuel gas channel 27 are different as below.

To be specific, the width of the rib portion 39A formed between the groove constituting the uppermost stream portion 37C of the oxidizing gas channel 37 and the groove constituting the downstream portion 37D of the oxidizing gas channel 37 is larger than the width of the rib portion 39B formed by only the groove constituting the downstream portion 37D. Similarly, the width of the rib portion 29A formed between the groove constituting the uppermost stream portion 27C of the fuel gas channel 27 and the groove constituting the downstream portion 27D of the fuel gas channel 27 is larger than the width of the rib portion 29B formed by only the groove constituting the downstream portion 27D.

With this configuration, the fuel cell 100 according to Embodiment 11 of the present invention obtains the same operational advantages as the fuel cell 100 according to Embodiment 10.

Further, in the fuel cell 100 according to Embodiment 11, since the contact area between the rib portion 39B of the cathode separator 30 and the cathode 8 (to be precise, the cathode gas diffusion layer 7) is smaller than the contact area between the rib portion 39A and the cathode 8, the amount of heat transferred from the cathode 8 (to be precise, the cathode catalyst layer 6 (see FIG. 6)) to the cathode separator 30 becomes small, so that the cathode gas diffusion layer 7 opposed to the downstream portion 37D of the oxidizing gas channel 37 becomes high in temperature. On this account, the dew condensation of the water generated by the electric power generating reaction is less likely to occur, and the occurrence of the flooding in the downstream portion 37D of the oxidizing gas channel 37 is suppressed. In addition, the occurrence of the flooding in the cathode gas diffusion layer 7 is also suppressed. Similarly, since the contact area between the rib portion 29B of the anode separator 20 and the anode 4 (to be precise, the anode gas diffusion layer 3) is smaller than the contact area between the rib portion 29A and the anode 4, the occurrence of the flooding in the downstream portion 27D of the fuel gas channel 27 is suppressed, and the occurrence of the flooding in the anode gas diffusion layer 3 is also suppressed.

Meanwhile, in the uppermost stream portion 37C of the oxidizing gas channel 37, by increasing the contact area between the rib portion 39A and the cathode 8, the contact resistance is reduced, and the decrease in the battery voltage is suppressed. Similarly, in the uppermost stream portion 27C of the fuel gas channel 27, by increasing the contact area between the rib portion 29A and the anode 4, the contact resistance is reduced, and the decrease in the battery voltage is suppressed.

In the present embodiment, the width of the rib portion 29A is set to be larger than the width of the rib portion 29B, and the width of the rib portion 39A is set to be larger than the width of the rib portion 39B. However, the present embodiment is not limited to this, and only the width of the rib portion 29A may be set to be larger than the width of the other rib portion, or only the width of the rib portion 39A may be set to be larger than the width of the other rib portion.

Embodiment 12

Figure 28:
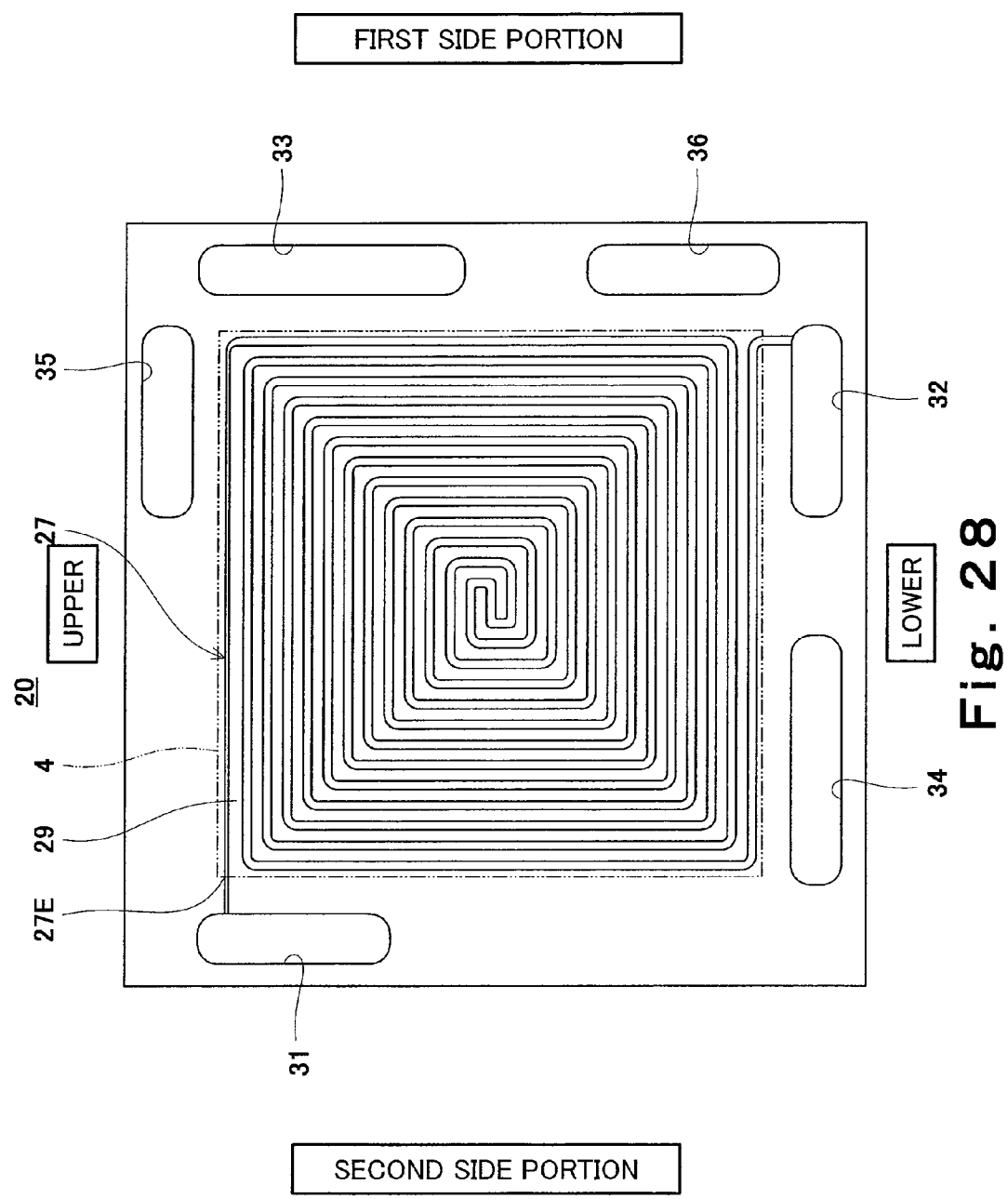
FIG. 28 is a schematic diagram showing a schematic configuration of the anode separator of the fuel cell according to Embodiment 12 of the present invention.
Figure 29:
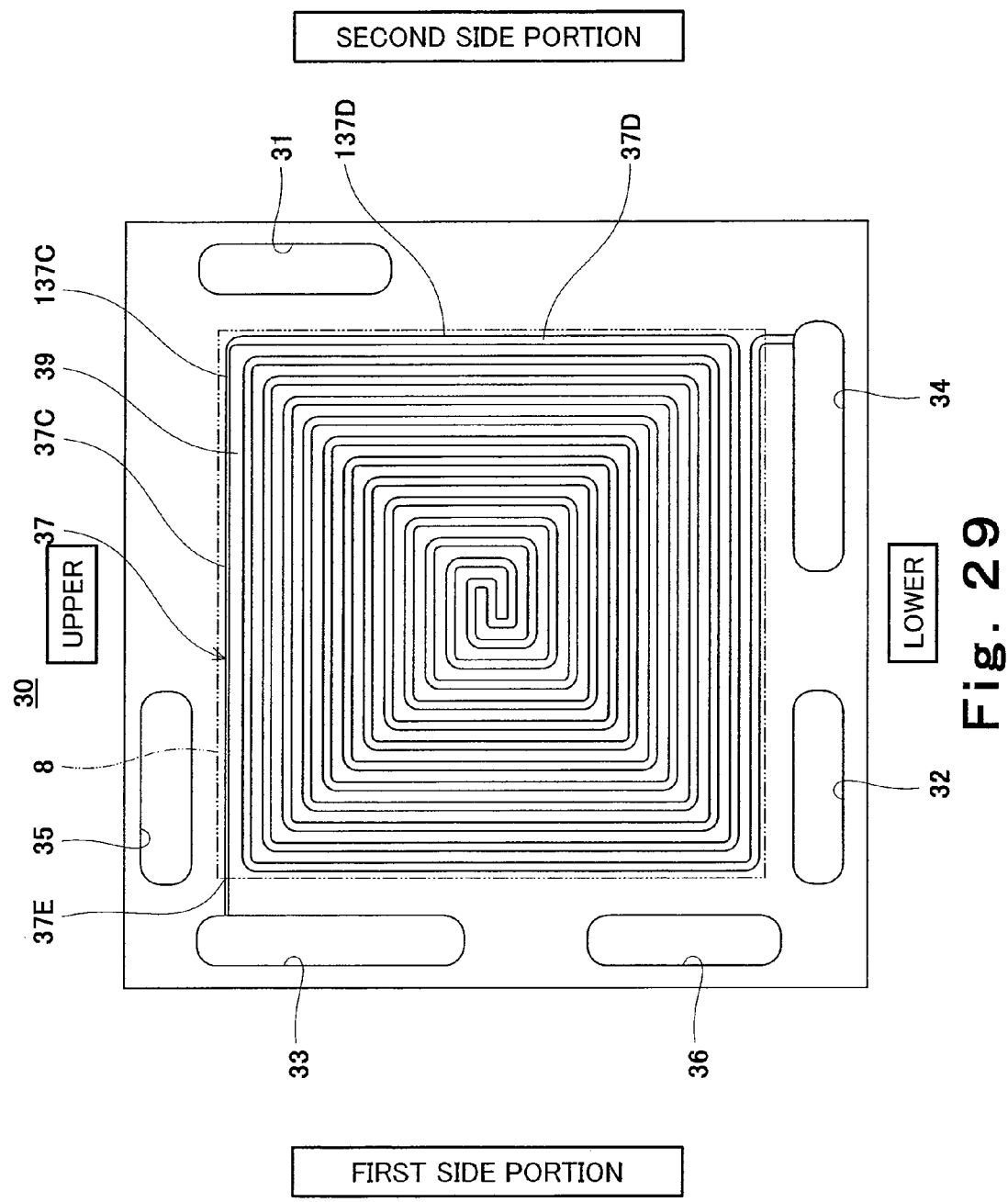
FIG. 29 is a schematic diagram showing a schematic configuration of the cathode separator of the fuel cell according to Embodiment 12 of the present invention.

FIG. 28 is a schematic diagram showing a schematic configuration of the anode separator of the fuel cell according to Embodiment 12 of the present invention. FIG. 29 is a schematic diagram showing a schematic configuration of the cathode separator of the fuel cell according to Embodiment 12 of the present invention. In FIGS. 28 and 29, a vertical direction of each of the anode separator and the cathode separator is shown as a vertical direction of the drawing.

As shown in FIGS. 28 and 29, the fuel cell according to Embodiment 12 of the present invention and the fuel cell 100 according to Embodiment 10 are the same in basic configuration as each other, but are different from each other in that each of the fuel gas channel 27 of the anode separator 20 and the oxidizing gas channel 37 of the cathode separator 30 is formed to have a spiral shape. Since the fuel gas channel 27 is configured in the same manner as the oxidizing gas channel 37, the following will explain the oxidizing gas channel 37.

Specifically, as shown in FIG. 29, the oxidizing gas channel 37 is essentially constituted by horizontal portions 137C formed to extend in the horizontal direction and vertical portions 137B formed to extend in the vertical direction. The oxidizing gas channel 37 extends so as to converge from the peripheral portion to the central portion of the cathode separator 30 in a clockwise direction, turn round at the central portion of the cathode separator 30, and spread toward the peripheral portion of the cathode separator 30 in a counter-clockwise direction.

Herein, the uppermost stream portion 37C of the oxidizing gas channel 37 is constituted by a channel extending between the portion 37E where the oxidizing gas channel 37 extending from its upstream end first contacts the cathode 8 and a portion where the oxidizing gas channel 37 extending toward the second side portion in the horizontal direction has reached (in other words, the uppermost stream portion 37C is a portion extending from the portion 37E of the oxidizing gas channel 37 to a downstream end of the first horizontal portion 137C). Moreover, the width of the entire uppermost stream portion 37C of the oxidizing gas channel 37 is constant, the width of the entire downstream portion 37D is constant, and the width of the uppermost stream portion 37C is smaller than the width of the downstream portion 37D.

Even with this configuration, the fuel cell according to Embodiment 12 of the present invention obtains the same operational advantages as the fuel cell 100 according to Embodiment 10.

In the present embodiment, each of the fuel gas channel 27 and the oxidizing gas channel 37 is formed to have a spiral shape. However, the present embodiment is not limited to this, and only the fuel gas channel 27 may be formed to have a spiral shape, or only the oxidizing gas channel 37 may be formed to have a spiral shape.

Embodiment 13

Figure 30:
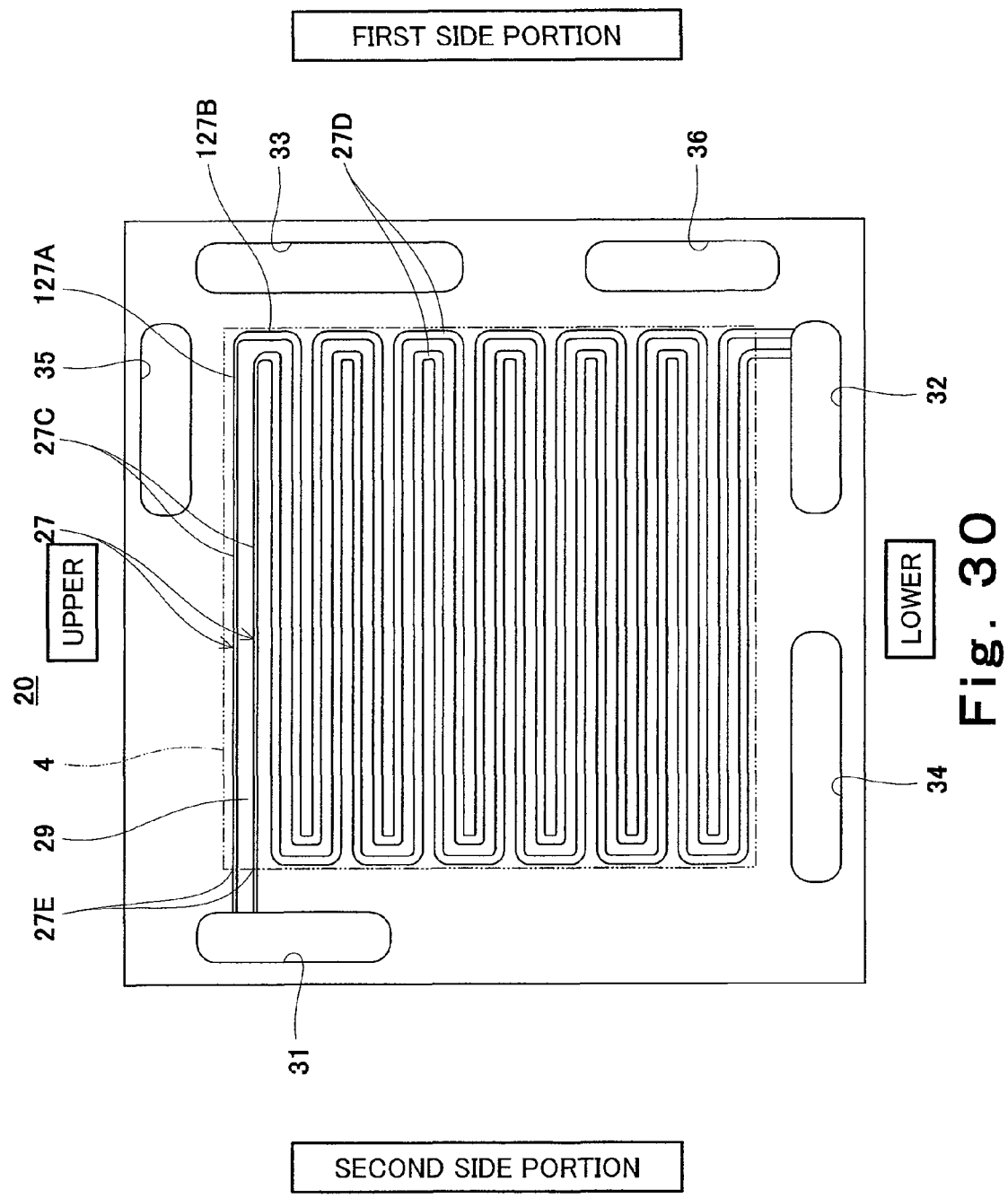
FIG. 30 is a schematic diagram of a schematic configuration of the anode separator of the fuel cell according to Embodiment 13 of the present invention.
Figure 31:
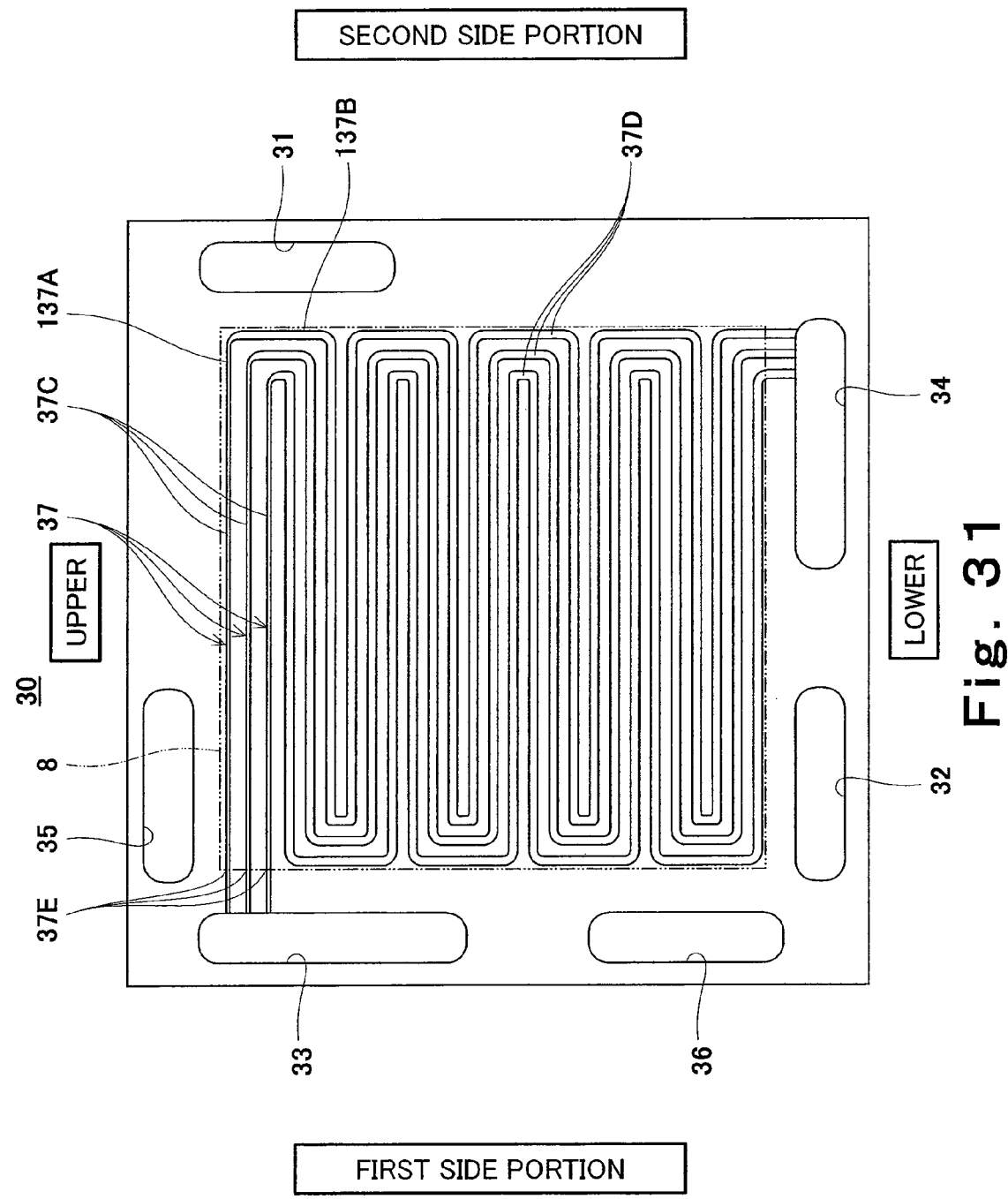
FIG. 31 is a schematic diagram showing a schematic configuration of the cathode separator of the fuel cell according to Embodiment 13 of the present invention.

FIG. 30 is a schematic diagram showing a schematic configuration of the anode separator of the fuel cell according to Embodiment 13 of the present invention. FIG. 31 is a schematic diagram showing a schematic configuration of the cathode separator of the fuel cell according to Embodiment 13 of the present invention. In FIGS. 30 and 31, a vertical direction of each of the anode separator and the cathode separator is shown as a vertical direction of the drawing.

The fuel cell according to Embodiment 13 of the present invention and the fuel cell 100 according to Embodiment 10 are the same in basic configuration as each other, but are different from each other in that as shown in FIGS. 30 and 31, each of the fuel gas channel 27 and the oxidizing gas channel 37 is constituted by a plurality of grooves (herein, the fuel gas channel 27 is constituted by two grooves, and the oxidizing gas channel 37 is constituted by three grooves). Moreover, the fuel cell according to Embodiment 13 of the present invention is different from the fuel cell 100 according to Embodiment 10 in that: the uppermost stream portion 27C of the fuel gas channel 27 is constituted by a channel extending between the portion 27E where the fuel gas channel 27 extending from its upstream end first contacts the anode 4 and a point where the fuel gas channel 27 extending toward the first side portion in the horizontal direction has reached (in other words, a portion extending from the portion 27E of the fuel gas channel 27 to the downstream end of the first reciprocating portion 127A); and the uppermost stream portion 37C of the oxidizing gas channel 37 is constituted by a channel extending between the portion 37E where the oxidizing gas channel 37 extending from its upstream end first contacts the cathode 8 and a point where the oxidizing gas channel 37 extending toward the second side portion in the horizontal direction has reached (in other words, a portion extending from the portion 37E of the oxidizing gas channel 37 to the downstream end of the first reciprocating portion 137C).

Even with this configuration, the fuel cell according to Embodiment 13 obtains the same operational advantages as the fuel cell 100 according to Embodiment 10.

Embodiment 14

Figure 32:
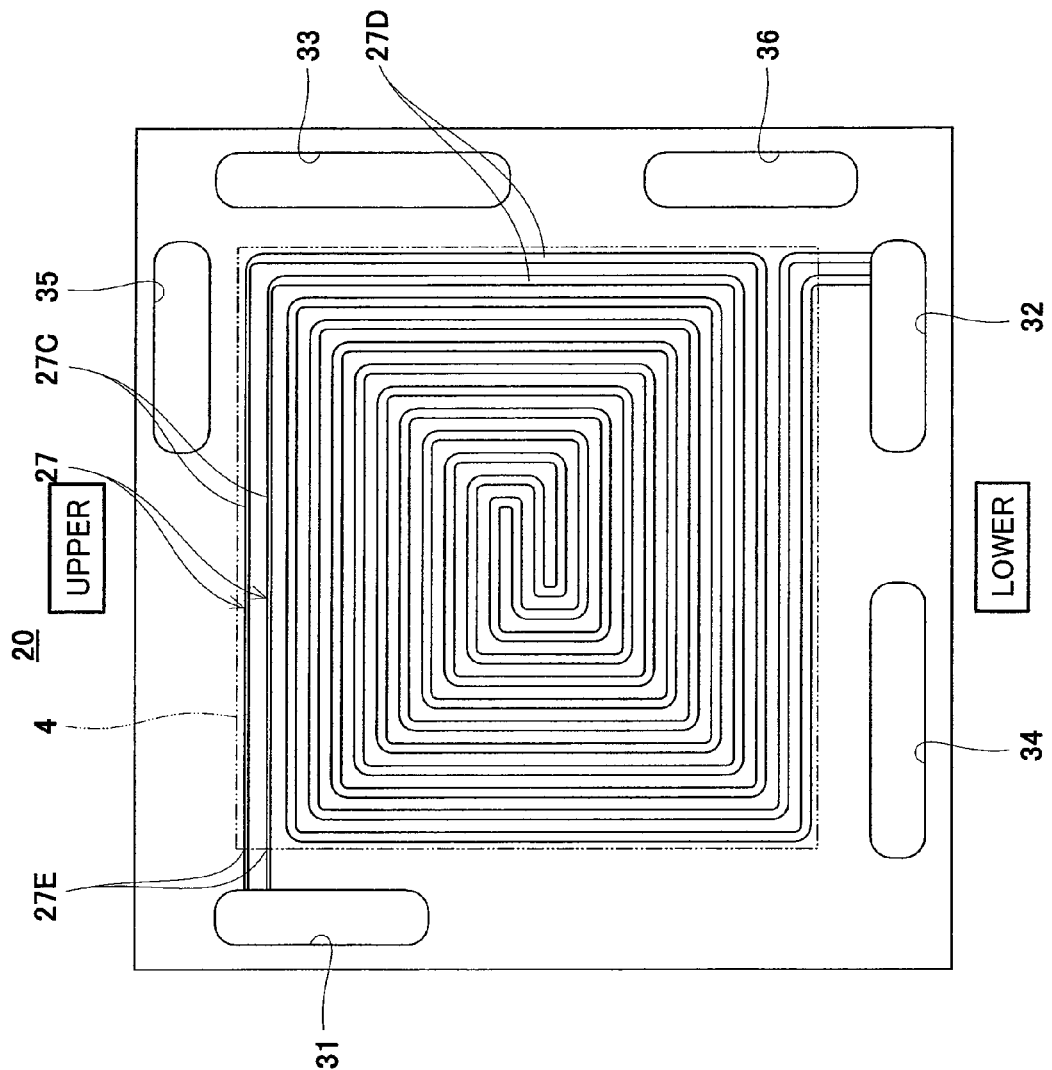
FIG. 32 is a schematic diagram showing a schematic configuration of the anode separator of the fuel cell according to Embodiment 14 of the present invention.
Figure 33:
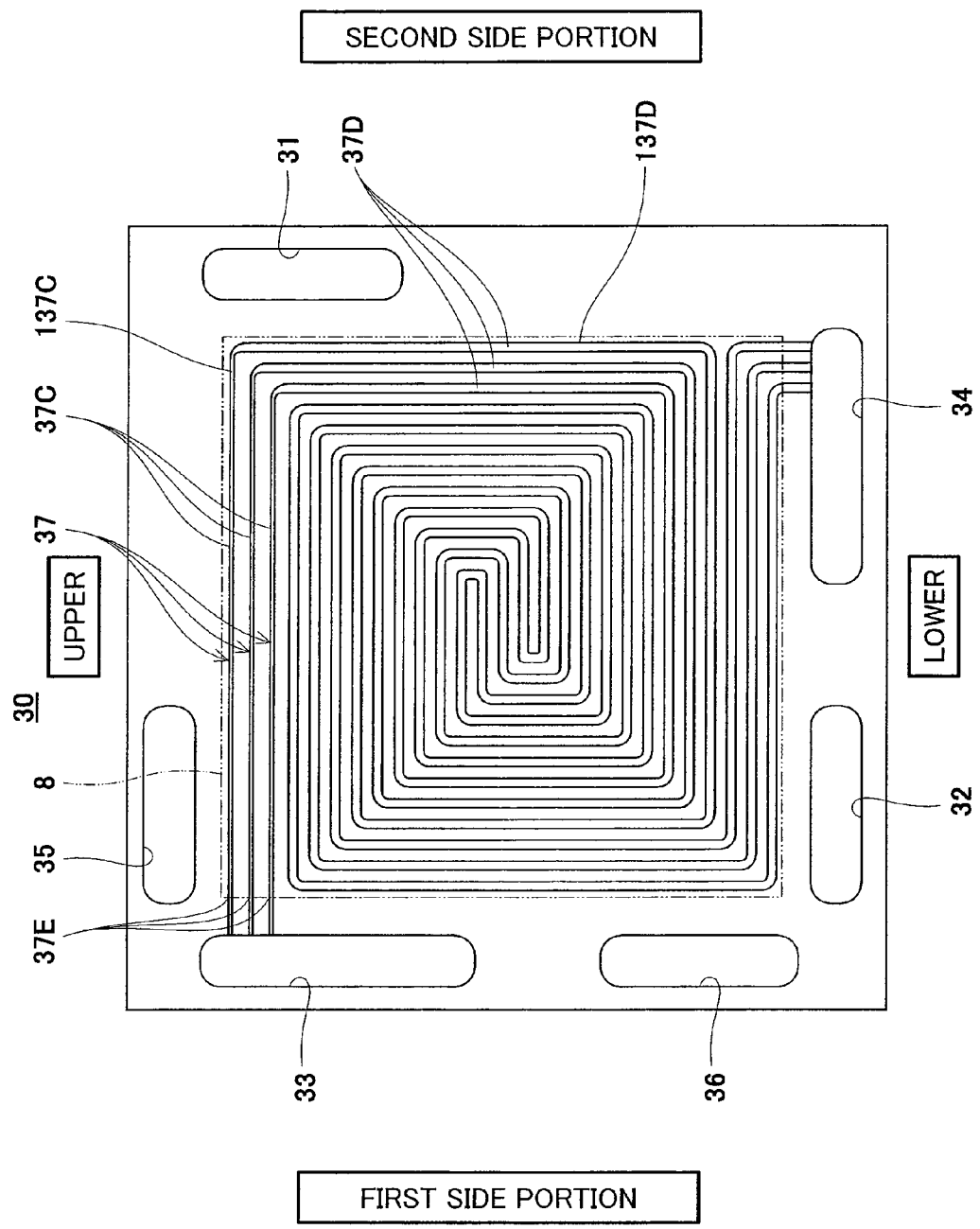
FIG. 33 is a schematic diagram showing a schematic configuration of the cathode separator of the fuel cell according to Embodiment 14 of the present invention.

FIG. 32 is a schematic diagram showing a schematic configuration of the anode separator of the fuel cell according to Embodiment 14 of the present invention. FIG. 33 is a schematic diagram showing a schematic configuration of the cathode separator of the fuel cell according to Embodiment 14 of the present invention. In FIGS. 32 and 33, a vertical direction of each of the anode separator and the cathode separator is shown as a vertical direction of the drawing.

The fuel cell according to Embodiment 14 of the present invention and the fuel cell according to Embodiment 13 are the same in basic configuration as each other, but are different from each other in that as shown in FIGS. 32 and 33, each of the fuel gas channel 27 and the oxidizing gas channel 37 is formed to have a spiral shape. Moreover, the fuel cell according to Embodiment 14 and the fuel cell according to Embodiment 13 are different from each other in that each of the uppermost stream portion 27C of the fuel gas channel 27 and the uppermost stream portion 37C of the oxidizing gas channel 37 is constituted by a channel extending from the upstream end of the fuel gas channel 27 or the oxidizing gas channel 37 to a portion where the fuel gas channel 27 or the oxidizing gas channel 37 extending toward the second side portion in the horizontal direction has reached (in other words, the uppermost stream portion 27C or 37C is a portion extending from the upstream end of the fuel gas channel 27 or the oxidizing gas channel 37 to the downstream end of the first horizontal portion).

Even with this configuration, the fuel cell according to Embodiment 14 of the present invention obtains the same operational advantages as the fuel cell according to Embodiment 13.

Embodiment 15

Figure 34:
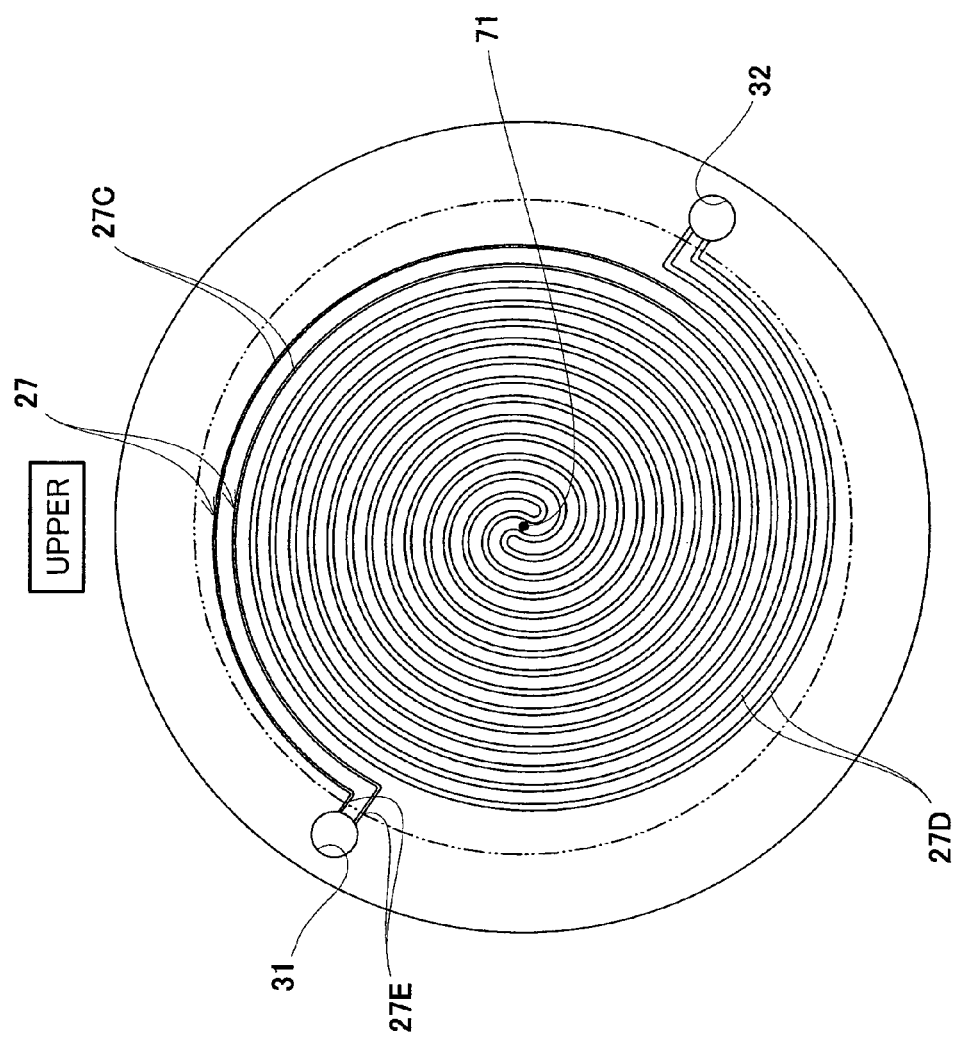
FIG. 34 is a schematic diagram showing a schematic configuration of the anode separator of the fuel cell according to Embodiment 15 of the present invention.
Figure 35:
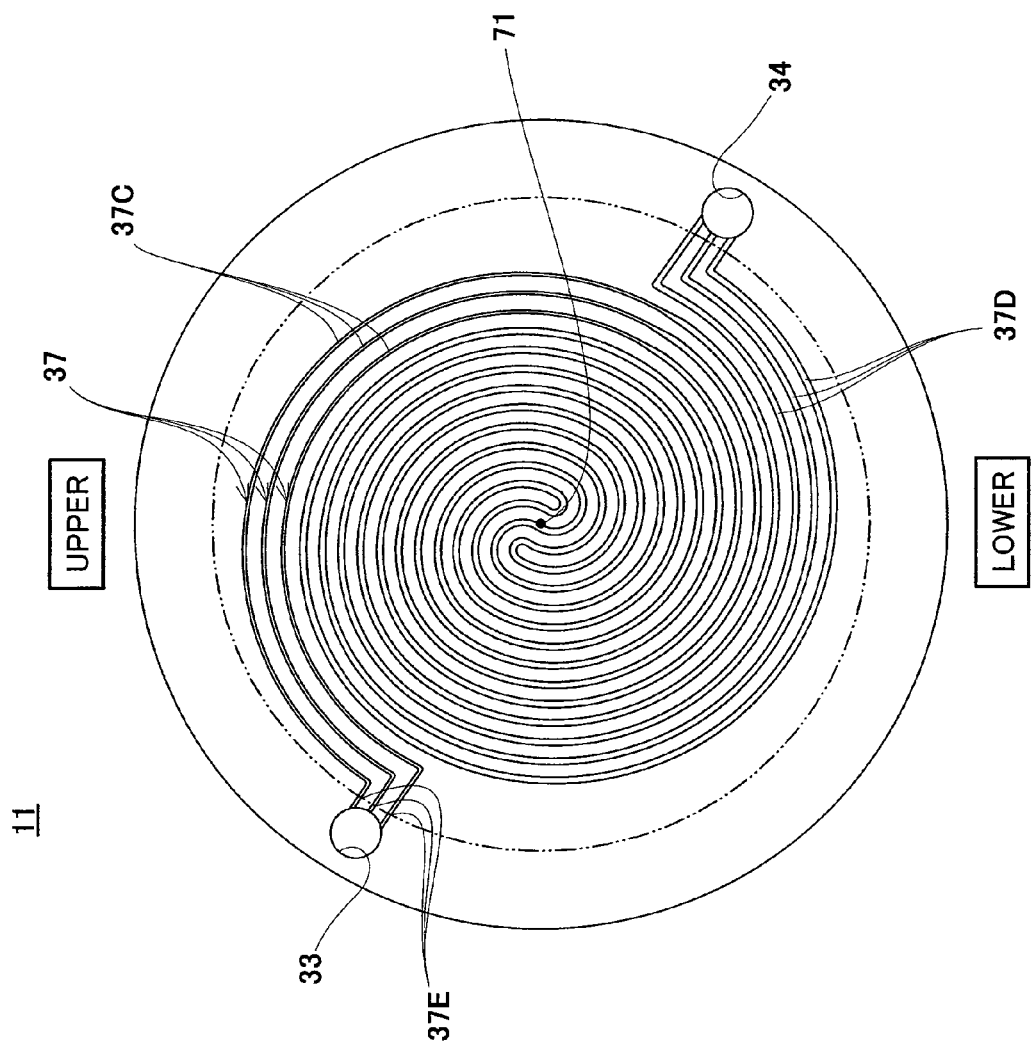
FIG. 35 is a schematic diagram showing a schematic configuration of the cathode separator of the fuel cell according to Embodiment 15 of the present invention.

FIG. 34 is a schematic diagram showing a schematic configuration of the anode separator of the fuel cell according to Embodiment 15 of the present invention. FIG. 35 is a schematic diagram showing a schematic configuration of the cathode separator of the fuel cell according to Embodiment 15 of the present invention. In FIGS. 34 and 35, a vertical direction of each of the anode separator and the cathode separator is shown as a vertical direction of the drawing. In FIG. 34, only the fuel gas supplying manifold hole 31 and the fuel gas discharging manifold hole 32 are shown, and the other manifold holes are not shown. In FIG. 35, only the oxidizing gas supplying manifold hole 33 and the oxidizing gas discharging manifold hole 34 are shown, and the other manifold holes are not shown.

The fuel cell according to Embodiment 15 of the present invention and the fuel cell according to Embodiment 14 are the same in basic configuration as each other, but are different from each other in that as shown in FIGS. 32 and 33, each of the anode separator 20 and the cathode separator 30 is formed to have a circular plate shape. Moreover, the fuel cell according to Embodiment 15 and the fuel cell according to Embodiment 14 are different from each other in that the fuel gas supplying manifold hole 31 and the fuel gas discharging manifold hole 32 are formed to sandwich a central portion (central axis 71) of the anode separator 20 and be opposed to each other, and similarly, the oxidizing gas supplying manifold hole 32 and the oxidizing gas discharging manifold hole 33 are formed to sandwich a central portion (central axis 71) of the cathode separator 30 and be opposed to each other.

Moreover, the fuel gas channel 27 of the fuel cell according to Embodiment 15 extends so as to converge in an arc from an upstream end thereof to the central portion of the anode separator 20 in a clockwise direction, turn round at the central portion of the anode separator 20, and spread in an arc toward the peripheral portion of the anode separator 20 in a counterclockwise direction. Similarly, the oxidizing gas channel 37 extends so as to converge in an arc from an upstream end thereof to the central portion of the cathode separator 30 in a clockwise direction, turn round at the central portion of the cathode separator 30, and spread in an arc toward the peripheral portion of the cathode separator 30 in a counterclockwise direction.

Further, the fuel cell according to Embodiment 15 is different from the fuel cell according to Embodiment 14 in that: the uppermost stream portion 27C of the fuel gas channel 27 is constituted by a channel extending between the portion 27E where the fuel gas channel 27 extending from its upstream end first contacts the anode 4 to a portion where the fuel gas channel 27 extending half round from its upstream end has reached; and the uppermost stream portion 37C of the oxidizing gas channel 37 is constituted by a channel extending between the portion 37E where the oxidizing gas channel 37 extending from its upstream end first contacts the cathode 8 and a portion where the oxidizing gas channel 37 extending half round from its upstream end has reached.

Even with this configuration, the fuel cell according to Embodiment 15 obtains the same operational advantages as the fuel cell according to Embodiment 14.

In the above embodiments, a so-called inner manifold type in which respective manifold holes are formed on the separator is adopted as the fuel cell stack. However, the present embodiments are not limited to this, and an outer manifold type may be adopted as the fuel cell stack.

Moreover, in the above embodiments, the fuel gas supplying manifold hole 31 and the oxidizing gas supplying manifold hole 33 are formed to be opposed to each other. However, the present embodiments are not limited to this, and the fuel gas supplying manifold hole 31 and the oxidizing gas supplying manifold hole 33 may be formed to be adjacent to each other.

Further, in the above embodiments, each of the width of the entire uppermost stream portion 27C of the fuel gas channel 27, the width of the entire uppermost stream portion 37C of the oxidizing gas channel 37, the width of the entire downstream portion 27D of the fuel gas channel 27, and the width of the entire downstream portion 37D of the oxidizing gas channel 37 is constant. However, the present embodiments are not limited to this. As long as the operational advantages of the present invention can be obtained, the width of a part of the uppermost stream portion 27C, 37C and/or the width of a part of the downstream portion 27D, 37D may be changed, the width of a part of the uppermost stream portion 27C, 37C may be larger than the width of a part of the downstream portion 27D, 37D, or the width of a part of the downstream portion 27D, 37D may be smaller than the width of a part of the uppermost stream portion 27C, 37C.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The polymer electrolyte fuel cell and fuel cell stack of the present invention are useful as a polymer electrolyte fuel cell and fuel cell stack capable of adequately suppressing the flooding. Moreover, the polymer electrolyte fuel cell and fuel cell stack of the present invention are useful as a polymer electrolyte fuel cell and fuel cell stack capable of suppressing the drying of the polymer electrolyte membrane, and therefore, suppressing the deterioration of the polymer electrolyte membrane when the polymer electrolyte fuel cell is driven at high temperature and low humidity.

The invention claimed is:

1. A polymer electrolyte fuel cell comprising:
  a membrane-electrode assembly including a polymer electrolyte membrane and a pair of electrodes sandwiching a portion of the polymer electrolyte membrane, the portion being located inwardly of a peripheral portion of the polymer electrolyte membrane;
  an electrically-conductive first separator having a plate shape, disposed on a first face of the membrane-electrode assembly, and including a groove-like first reactant gas channel having a serpentine configuration and formed on one main surface of the first separator so as to contact one of the electrode; and
  an electrically-conductive second separator having a plate shape, disposed on a second face of the membrane-electrode assembly, and including a groove-like second reactant gas channel having a serpentine configuration and formed on one main surface of the second separator so as to contact the other one of the electrodes so as to bend, wherein:
  the first reactant gas channel includes an uppermost stream portion which is a part of the first reactant gas channel between at least a first portion where the first reactant gas channel extending from a first gas inlet first contacts the electrode and a second portion where the first reactant gas channel overlapping the second reactant gas channel first separates from the second reactant gas channel so as not to overlap the second reactant gas channel, when viewed from a thickness direction of the first separator, a width of the uppermost stream portion is smaller than a width of a portion of the first reactant gas channel which is a part of the first reactant gas channel other than the uppermost stream portion of the first reactant gas channel, and a cross-sectional area of the uppermost stream portion of the first reactant gas channel is substantially the same as a cross-sectional area of the part other than the uppermost stream portion of the first reactant gas channel.

2. The polymer electrolyte fuel cell according to claim 1, wherein:

the second reactant gas channel includes an uppermost stream portion of the second channel which is a part of the second reactant gas channel between a third portion where the second reactant gas channel extending from a second gas inlet first contacts the electrode and a fourth portion where the first reactant gas channel extending from the upstream end thereof first contacts the electrode, and when viewed from a thickness direction of the second separator, a width of the uppermost stream portion of the second gas channel is smaller than a width of a portion of the second reactant gas channel which is a part of the second reactant gas channel other than the uppermost stream portion of the second separator.

3. The polymer electrolyte fuel cell according to claim 1, wherein:

the second reactant gas channel includes an uppermost stream portion of the second channel which is a part of the second reactant gas channel between a third portion where the second reactant gas channel extending from a second gas inlet first contacts the electrode and a fourth portion where the second reactant gas channel overlapping the first reactant gas channel first separates from the first reactant gas channel so as not to overlap the first reactant gas channel, and when viewed from a thickness direction of the second separator, a width of the uppermost stream portion of the second gas channel is smaller than a width of a portion of the second reactant gas channel which is a part of the second reactant gas channel other than the uppermost stream portion of the second reactant gas channel.

4. The polymer electrolyte fuel cell according to claim 1, wherein a depth of the uppermost stream portion of the first reactant gas channel is larger than a depth of the part other than the uppermost stream portion of the first reactant gas channel.

5. The polymer electrolyte fuel cell according to claim 2, wherein a depth of the uppermost stream portion of the second reactant gas channel is larger than a depth of the part of the second reactant gas channel other than the uppermost stream portion of the second reactant gas channel.

6. The polymer electrolyte fuel cell according to claim 2, wherein a cross-sectional area of the uppermost stream portion of the second reactant gas channel is substantially the same as a cross-sectional area of the part of the second reactant gas channel other than the uppermost stream portion of the second reactant gas channel.

7. The polymer electrolyte fuel cell according to claim 1, wherein:

rib portions are formed between adjacent portions of the first reactant gas channel, respectively, and among the rib portions, a rib portion formed by the uppermost stream portion has a width larger than a width of the other rib portion.

8. The polymer electrolyte fuel cell according to claim 2, wherein:

rib portions are formed between adjacent portions of the second reactant gas channel, respectively, and among the rib portions, a rib portion formed by the uppermost stream portion has a width larger than a width of the other rib portion.

9. The polymer electrolyte fuel cell according to claim 1, wherein:

a groove-like cooling fluid channel is formed on at least one of the other main surface of the first separator and the other main surface of the second separator; and the polymer electrolyte fuel cell is configured such that each of a dew point of a first reactant gas flowing through the first reactant gas channel and a dew point of a second reactant gas flowing through the second reactant gas channel is lower than a temperature of a cooling fluid flowing through the cooling fluid channel.

10. The polymer electrolyte fuel cell according to claim 1, wherein each of the first separator and the second separator is provided with a first reactant gas supplying manifold hole and a second reactant gas supplying manifold hole which are formed to penetrate separators in a thickness direction and be opposed to each other.

11. The polymer electrolyte fuel cell according to claim 1, wherein the first reactant gas channel and the second reactant gas channel are formed to realize parallel flow.

12. The polymer electrolyte fuel cell according to claim 1, wherein at least one of the first reactant gas channel and the second reactant gas channel is formed in a serpentine shape.

13. The polymer electrolyte fuel cell according to claim 1, wherein at least one of the first reactant gas channel and the second reactant gas channel is formed in a spiral shape.

14. The polymer electrolyte fuel cell according to claim 1, wherein the width of the entire uppermost stream portion of the first reactant gas channel is smaller than the width of the part other than the uppermost stream portion of the first reactant gas channel.

15. The polymer electrolyte fuel cell according to claim 14, wherein the width of the entire part other than the uppermost stream portion of the first reactant gas channel is constant.

16. The polymer electrolyte fuel cell according to claim 14, wherein the width of the entire uppermost stream portion of the first reactant gas channel is constant.

17. The polymer electrolyte fuel cell according to claim 3, wherein the width of the entire uppermost stream portion of the second reactant gas channel is smaller than the width of the entire part of the second reactant gas channel other than the uppermost stream portion of the second reactant gas channel.

18. The polymer electrolyte fuel cell according to claim 17, wherein the width of the entire part of the second reactant gas channel other than the uppermost stream portion of the second reactant gas channel is constant.

19. The polymer electrolyte fuel cell according to claim 17, wherein the width of the entire uppermost stream portion of the second reactant gas channel is constant.

20. A fuel cell stack configured such that a plurality of the polymer electrolyte fuel cells according to claim 1 are stacked and fastened.

* * * * *